Sept. 14, 1965 R. C. AVERY ET AL 3,206,552

TELEPHONE CALL CHARGE RATE COMPUTER

Filed Aug. 2, 1960 76 Sheets-Sheet 1

INVENTORS: R. C. AVERY
O. MYERS

BY Donald M Duft

ATTORNEY

Sept. 14, 1965 R. C. AVERY ETAL 3,206,552

TELEPHONE CALL CHARGE RATE COMPUTER

Filed Aug. 2, 1960 76 Sheets-Sheet 2

INVENTORS: R. C. AVERY
O. MYERS

BY Donald M. Duft

ATTORNEY

INVENTORS: R. C. AVERY
O. MYERS
BY Donald M. Duft
ATTORNEY

CALL CLASSIFICATION

INVENTORS: R. C. AVERY
O. MYERS
BY
ATTORNEY

TELEPHONE CALL CHARGE RATE COMPUTER

Filed Aug. 2, 1960 76 Sheets-Sheet 5

INVENTORS: R. C. AVERY
O. MYERS

BY Donald M Duft

ATTORNEY

INVENTORS: R. C. AVERY
O. MYERS
BY Donald M Duft
ATTORNEY

INVENTORS: R. C. AVERY
O. MYERS
BY Donald M Duft
ATTORNEY

TELEPHONE CALL CHARGE RATE COMPUTER

INVENTORS: R. C. AVERY
O. MYERS

BY Donald M. Duft

ATTORNEY

INVENTORS: R.C. AVERY
O. MYERS
BY Donald M Duft
ATTORNEY

INVENTORS: R. C. AVERY
O. MYERS
BY Donald M Duft
ATTORNEY

INVENTORS: R. C. AVERY
O. MYERS
BY Donald M Duft
ATTORNEY

Sept. 14, 1965 R. C. AVERY ETAL 3,206,552

TELEPHONE CALL CHARGE RATE COMPUTER

Filed Aug. 2, 1960 76 Sheets-Sheet 12

INVENTORS: R. C. AVERY
O. MYERS

BY Donald M Duft

ATTORNEY

INVENTORS: R. C. AVERY
O. MYERS
BY Donald M Duft
ATTORNEY

INVENTORS: R. C. AVERY
O. MYERS

BY Donald M Duft

ATTORNEY

Sept. 14, 1965 R. C. AVERY ET AL 3,206,552

TELEPHONE CALL CHARGE RATE COMPUTER

Filed Aug. 2, 1960 76 Sheets-Sheet 15

INVENTORS: R.C. AVERY
O. MYERS
BY Donald M. Duft
ATTORNEY

INVENTORS: R. C. AVERY
O. MYERS
BY Donald M Duft
ATTORNEY

Sept. 14, 1965 R. C. AVERY ETAL 3,206,552

TELEPHONE CALL CHARGE RATE COMPUTER

Filed Aug. 2, 1960 76 Sheets-Sheet 17

INVENTORS: R. C. AVERY
O. MYERS

BY Donald M Duft

ATTORNEY

INVENTORS: R. C. AVERY
O. MYERS
BY Donald M. Duft
ATTORNEY

Sept. 14, 1965 R. C. AVERY ETAL 3,206,552

TELEPHONE CALL CHARGE RATE COMPUTER

Filed Aug. 2, 1960 76 Sheets-Sheet 19

INVENTORS: R. C. AVERY
O. MYERS

BY Donald M. Duft

ATTORNEY

INVENTORS: R.C. AVERY
O. MYERS
BY Donald M Luft
ATTORNEY

INVENTORS: R. C. AVERY
O. MYERS
BY Donald M Duft
ATTORNEY

TELEPHONE CALL CHARGE RATE COMPUTER

Filed Aug. 2, 1960 76 Sheets-Sheet 22

INVENTORS: R. C. AVERY
O. MYERS

BY Donald M. Duft

ATTORNEY

TELEPHONE CALL CHARGE RATE COMPUTER

Filed Aug. 2, 1960 76 Sheets-Sheet 23

INVENTORS: R. C. AVERY
O. MYERS

BY Donald M Duft

ATTORNEY

TELEPHONE CALL CHARGE RATE COMPUTER

INVENTORS: R. C. AVERY
O. MYERS
BY Donald M. Duft
ATTORNEY

Sept. 14, 1965 R. C. AVERY ETAL 3,206,552

TELEPHONE CALL CHARGE RATE COMPUTER

Filed Aug. 2, 1960 76 Sheets-Sheet 25

INVENTORS: R. C. AVERY
O. MYERS

BY Donald M Duft

ATTORNEY

INVENTORS: R. C. AVERY
O. MYERS
BY Donald M. Duft
ATTORNEY

Sept. 14, 1965 R. C. AVERY ETAL 3,206,552

TELEPHONE CALL CHARGE RATE COMPUTER

Filed Aug. 2, 1960 76 Sheets-Sheet 27

INVENTORS: R. C. AVERY
O. MYERS
BY Donald M Duft
ATTORNEY

INVENTORS: R.C. AVERY
O. MYERS
BY Donald M Duft
ATTORNEY

INVENTORS: R.C. AVERY
O. MYERS
BY Donald M Duft
ATTORNEY

Sept. 14, 1965 R. C. AVERY ETAL 3,206,552

TELEPHONE CALL CHARGE RATE COMPUTER

Filed Aug. 2, 1960 76 Sheets-Sheet 30

INVENTORS: R. C. AVERY
O. MYERS

BY Donald M. Duft

ATTORNEY

INVENTORS: R. C. AVERY
O. MYERS
BY Donald M. Duft
ATTORNEY

Sept. 14, 1965 R. C. AVERY ETAL 3,206,552

TELEPHONE CALL CHARGE RATE COMPUTER

Filed Aug. 2, 1960 76 Sheets-Sheet 32

INVENTORS: R. C. AVERY
O. MYERS
BY Donald M. Duft
ATTORNEY

Sept. 14, 1965 R. C. AVERY ET AL 3,206,552

TELEPHONE CALL CHARGE RATE COMPUTER

Filed Aug. 2, 1960 76 Sheets-Sheet 33

INVENTORS: R. C. AVERY
O. MYERS

BY Donald M Duft

ATTORNEY

INVENTORS: R.C. AVERY
O. MYERS
BY Donald M Duft
ATTORNEY

INVENTORS: R. C. AVERY
O. MYERS
BY Donald M. Duft
ATTORNEY

INVENTORS: R. C. AVERY
O. MYERS
BY Donald M. Duft
ATTORNEY

INVENTORS: R. C. AVERY
O. MYERS
BY Donald M. Duft
ATTORNEY

INVENTORS: R. C. AVERY
O. MYERS
BY Donald M Duft
ATTORNEY

INVENTORS: R. C. AVERY
O. MYERS
BY
Donald M. Duft
ATTORNEY

Sept. 14, 1965 R. C. AVERY ETAL 3,206,552

TELEPHONE CALL CHARGE RATE COMPUTER

Filed Aug. 2, 1960 76 Sheets-Sheet 40

INVENTORS: R.C. AVERY
O. MYERS
BY Donald M. Duft
ATTORNEY

Sept. 14, 1965 R. C. AVERY ETAL 3,206,552

TELEPHONE CALL CHARGE RATE COMPUTER

Filed Aug. 2, 1960 76 Sheets-Sheet 41

INVENTORS: R. C. AVERY
O. MYERS
BY Donald M. Duft
ATTORNEY

Sept. 14, 1965 R. C. AVERY ETAL 3,206,552

TELEPHONE CALL CHARGE RATE COMPUTER

Filed Aug. 2, 1960 76 Sheets-Sheet 42

TERMINATING RATE TREATMENT TRANSLATOR

INVENTORS: R. C. AVERY
O. MYERS

BY Donald M. Duft

ATTORNEY

Sept. 14, 1965 R. C. AVERY ETAL 3,206,552

TELEPHONE CALL CHARGE RATE COMPUTER

Filed Aug. 2, 1960 76 Sheets-Sheet 43

INVENTORS: R.C. AVERY
O. MYERS

BY Donald M Duft

ATTORNEY

TELEPHONE CALL CHARGE RATE COMPUTER

INVENTORS: R. C. AVERY
O. MYERS
BY Donald M. Duft
ATTORNEY

TERMINATING OFFICE CODE TRANSLATOR FOR CLASS B CALLS

INVENTORS: R.C. AVERY
O. MYERS
BY Donald M Duft
ATTORNEY

INVENTORS: R. C. AVERY
O. MYERS
BY Donald M Duft
ATTORNEY

INVENTORS: R. C. AVERY
O. MYERS
BY Donald M. Duft
ATTORNEY

INVENTORS: R. C. AVERY
O. MYERS
BY Donald M. Duft
ATTORNEY

Sept. 14, 1965 R. C. AVERY ETAL 3,206,552

TELEPHONE CALL CHARGE RATE COMPUTER

Filed Aug. 2, 1960 76 Sheets-Sheet 49

INVENTORS R. C. AVERY
O. MYERS
BY Donald M Duft
ATTORNEY

INVENTORS R. C. AVERY
O. MYERS
BY Donald M. Duft
ATTORNEY

INVENTORS: R.C. AVERY
O. MYERS
BY Donald M Duft
ATTORNEY

TELEPHONE CALL CHARGE RATE COMPUTER

Filed Aug. 2, 1960 76 Sheets-Sheet 52

INVENTORS: R. C. AVERY
O. MYERS
BY Donald M. Duft
ATTORNEY

Sept. 14, 1965 R. C. AVERY ETAL 3,206,552

TELEPHONE CALL CHARGE RATE COMPUTER

Filed Aug. 2, 1960 76 Sheets-Sheet 53

INVENTORS: R. C. AVERY
O. MYERS

BY Donald M. Duft

ATTORNEY

INVENTORS: R. C. AVERY
O. MYERS
BY Donald M. Duft
ATTORNEY

TELEPHONE CALL CHARGE RATE COMPUTER

INVENTORS: R.C. AVERY
O. MYERS
BY Donald M. Duft
ATTORNEY

INVENTORS: R. C. AVERY
O. MYERS
BY Donald M. Duft
ATTORNEY

Sept. 14, 1965 R. C. AVERY ETAL 3,206,552

TELEPHONE CALL CHARGE RATE COMPUTER

Filed Aug. 2, 1960 76 Sheets-Sheet 57

INVENTORS: R. C. AVERY
O. MYERS
BY Donald M Duft
ATTORNEY

TELEPHONE CALL CHARGE RATE COMPUTER

Filed Aug. 2, 1960 76 Sheets-Sheet 58

INVENTORS: R.C. AVERY
O. MYERS
BY Donald M. Duft
ATTORNEY

INVENTORS: R. C. AVERY
O. MYERS
BY Donald M Duft
ATTORNEY

Sept. 14, 1965 R. C. AVERY ETAL 3,206,552

TELEPHONE CALL CHARGE RATE COMPUTER

Filed Aug. 2, 1960 76 Sheets-Sheet 60

INVENTORS: R. C. AVERY
O. MYERS

BY Donald M. Duft

ATTORNEY

INVENTORS: R. C. AVERY
O. MYERS
BY Donald M. Duft
ATTORNEY

TELEPHONE CALL CHARGE RATE COMPUTER

Filed Aug. 2, 1960 76 Sheets-Sheet 62

INVENTORS: R. C. AVERY
O. MYERS
BY
ATTORNEY

INVENTORS: R. C. AVERY
O. MYERS
BY Donald M. Duft
ATTORNEY

INVENTORS: R.C. AVERY
O. MYERS
BY Donald M Duft
ATTORNEY

INVENTORS: R.C. AVERY
O. MYERS
BY Donald M. Duft
ATTORNEY

INVENTORS: R. C. AVERY
O. MYERS
BY Donald M. Duft
ATTORNEY

INVENTORS: R. C. AVERY
O. MYERS
BY Donald M. Duft
ATTORNEY

Sept. 14, 1965 R. C. AVERY ET AL 3,206,552

TELEPHONE CALL CHARGE RATE COMPUTER

Filed Aug. 2, 1960 76 Sheets-Sheet 68

FIG. 68

CLASS A CALLS

THIS CLASSIFICATION INCLUDES THE AREA IN WHICH THE TANDEM OFFICE IS LOCATED, AND A MAXIMUM OF TWO OTHER ADJACENT OR NEARBY AREAS IN WHICH APPRECIABLE BACKHAUL IS ENCOUNTERED.
ORIGINATING OFFICES MAY BE SERVED IN ONE, TWO OR ALL THREE OF THESE AREAS.

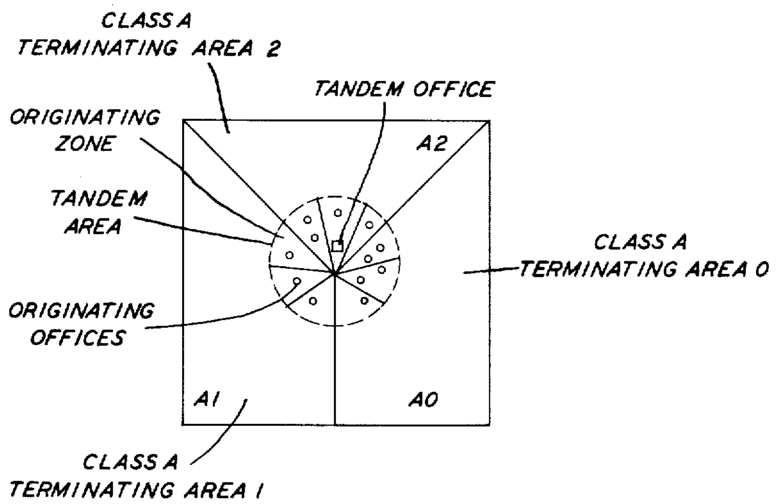

INVENTORS: R.C. AVERY
O. MYERS
BY Donald M. Duft
ATTORNEY

FIG. 69

CLASS B CALLS

DIFFERENT CHARGING RATES APPLY FOR VARIOUS GROUPS OF TERMINATING OFFICES AND/OR FOR VARIOUS GROUPS OF ORIGINATING ZONES. THE CHARGING RATES ARE DETERMINED BY ADDING A BASIC MINIMUM CHARGE, A TERMINATING INCREMENT, AND AN ORIGINATING INCREMENT, AS REQUIRED. EACH TANDEM AREA MAY HAVE A MAXIMUM OF 50 ORIGINATING ZONES.

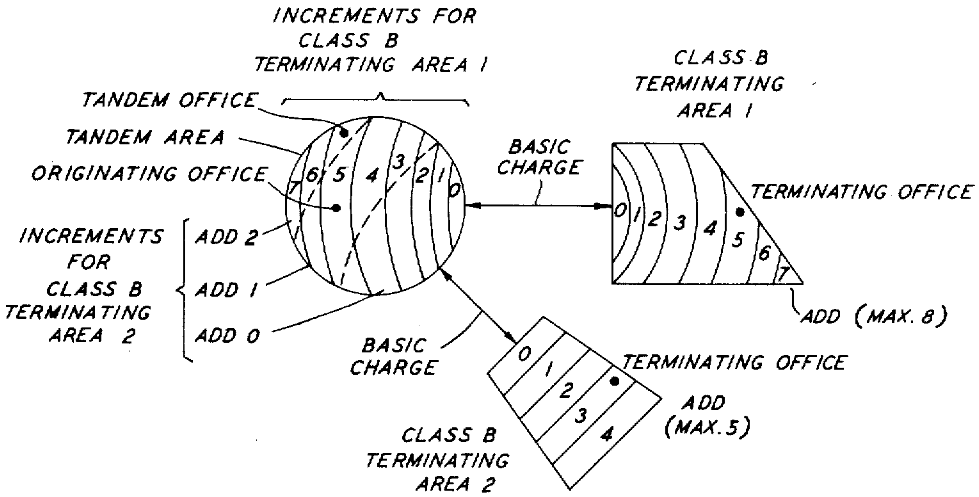

INVENTORS: R.C. AVERY
O. MYERS
BY Donald M. Duft
ATTORNEY

CLASS C CALLS

ON CALLS TO THESE AREAS, THE SAME CHARGING RATE APPLIES FOR ALL ORIGINATING ZONES WITHIN THE TANDEM AREA AND FOR ALL CALLED OFFICES WITHIN THE TERMINATING AREA. THIS RATE IS DETERMINED DIRECTLY FROM THE AREA INDICATION.

THE DISTANCES INVOLVED ARE GENERALLY GREATER THAN FOR CLASS B CALLS.

INVENTORS: R. C. AVERY
O. MYERS
BY Donald M. Duft
ATTORNEY

INVENTORS: R.C. AVERY
O. MYERS
BY
Donald M. Duft
ATTORNEY

Sept. 14, 1965 R. C. AVERY ETAL 3,206,552

TELEPHONE CALL CHARGE RATE COMPUTER

Filed Aug. 2, 1960 76 Sheets-Sheet 72

INVENTORS: R.C. AVERY
O. MYERS

Donald M Swift
ATTORNEY

TELEPHONE CALL CHARGE RATE COMPUTER

Filed Aug. 2, 1960 76 Sheets-Sheet 73

CLASS A CALLS

CLASS A CALLS

INVENTORS: R.C. AVERY
O. MYERS
BY
Donald M Duft
ATTORNEY

INVENTORS R.C. AVERY
O. MYERS
BY
Donald M. Duft
ATTORNEY

INVENTORS: R.C. AVERY
O. MYERS
BY Donald M Duft
ATTORNEY

INVENTORS: R.C. AVERY
O. MYERS
BY
Donald M Duft
ATTORNEY 3,206,552

TELEPHONE CALL CHARGE RATE COMPUTER

Robert C. Avery, Jackson Heights, and Oscar Myers, Mount Vernon, N.Y., assignors to Bell Telephone Laboratories, Incorporated, New York, N.Y., a corporation of New York Filed Aug. 2, 1960, Ser. No. 46,945
16 Claims. (Cl. 179—7.1)

This invention relates to a computer and more particularly to a telephone call charge rate computer which classifies calls into various categories and then computes the charge rate for each call in accordance with a procedure dependent upon its classification. The term "charge rate" may be defined as the cost of a call (excluding excise taxes, if any) for an elemental period of time such as, for example, three minutes, together with the cost of additional time periods, if any, such as, for example, successive periods of one minute each. The total charge for a call is later determined from the charge rate and the elapsed time.

The telephone industry has expended considerable research effort in attempting to minimize the manual operations required by its personnel both in the completion of calls and in the preparation of subscriber bills. This effort has produced significant advances insofar as concerns the completion of calls. The replacement of local manual exchanges by dial equipment was, perhaps, the first major step forward in the attainment of this objective since it eliminated the need for operator assistance on all local calls except for those of a special or emergency nature. Next, the operator effort required in completing many toll calls was minimized with the installation at toll centers of automatic switching equipment which enabled an originating toll operator to complete a connection by first dialing a toll code and then the called subscriber's toll number (which number may or may not be the same as his directory number).

More recently, a fundamental numbering plan for toll switching has been adopted which gives subscribers access to toll switching equipment whereby they can complete many of their own toll calls, without operator assistance, by dialing a three-digit area code plus the regular directory number of the called subscriber. In accordance with this fundamental plan, which includes the entire United States and portions of Canada, each subscriber is given a 10-digit designation which consists of a three-digit regional or area code, a three-digit office code and a four-digit station designation. Only the three-digit office code and the four-digit station designation need be dialed to reach any subscriber in the same area. To reach a subscriber in any other area, one must dial the proper three-digit area code, the three-digit office code, and the four-digit station designation of the called subscriber. This nationwide toll dialing plan is described in detail in an article entitled, "Nationwide Numbering Plan," by W. H. Nunn, on pages 851 through 859 of the September 1952 issue of the Bell System Technical Journal.

Since this nationwide numbering plan and customer access to toll dialing facilities are fairly recent innovations, all subscribers are not presently provided with such service. It is the intention of most telephone companies, however, that all subscribers be provided with such service as quickly as is economically feasible. Once all subscribers are integrated into this nationwide toll dialing network, operator assistance will be required only for special types of calls, such as collect and person-to-person calls, calls from coin boxes, from hotels and other similar establishments. Operator assistance would still be required for collect and person-to-person calls because, at the present time, there is no suitable equipment available which can perform the duties of the operators on these calls. Although coin phones could easily be integrated into the nationwide toll network insofar as their dialing is concerned, operator assistance would still be required on toll calls since there is no suitable equipment available for determining the amount of money a calling subscriber should deposit for such calls and then ascertaining that he actually makes the correct deposit. Operator assistance would still be required for toll calls from hotels and other similar establishments since, due to the nature of their business, it is essential that they be notified promptly as to the charges of all toll calls made by their tenants.

In summary, it may be seen that the telephone industry has made considerable progress in minimizing the manual effort required of its personnel in the completion of both local and toll calls.

The technological advances in billing procedures have not been quite as spectacular as those of the switching art. Although there is still room for improvement, the recording and computation of charges for most local calls involves no prodigious amount of manual effort and a number of reasonably satisfactory methods are currently in use. The details of these different methods vary and they may be briefly classified as follows: (1) flat rate service wherein subscribers are permitted an unlimited number of calls within a certain area, (2) the adoption of a single charge for all calls within a city or town together with the provision of a message register for each subscriber which is actuated each time he completes such a call, and (3) the adoption of a zone system for cities covering a large area, for example, New York city or Los Angeles. In these, the charges for a call vary in accordance with the distance between the offices involved and the message register of the calling subscriber is actuated a number of times per call in accordance with the charges to the called office. Accordingly, the computation of charges and the preparation of bills for local calls are relatively simple since it involves nothing more than either the billing of a uniform amount for flat rate service or the billing of each customer an amount dependent upon the reading of his message register for the current billing period.

The determination of charge rates, the computation of charges, and the preparation of bills for toll calls leaves much to be desired since a burdensome amount of manual effort is still required for both operator completed and customer dialed toll calls. The procedure for operator completed toll calls varies depending upon whether the operator is requested to, or must, ascertain and record the charges for the call in connection with its completion. Although the procedure is far more burdensome when the operator must perform these duties, there are many types of calls for which there is, at present, no other alternative. The operator must, obviously, immediately ascertain the initial and overtime charges for toll calls placed from coin phones in order that the proper amounts may be collected from the caller. Also, the operator must immediately ascertain the total charges for toll calls from hotels (who often must collect from guests about to check out), from coin phones, and when specifically requested by the caller to report the charges at the end of the call. When handling calls of this type, the operator determines the charge rate by referring to charts or books containing the desired information or obtains the information from a special operator who has the charts and books. If the call is from a coin phone, she then requests the caller to deposit the indicated amount for the initial period. If the charges do not have to be determined until the end of the call, she records the total conversation time on a toll slip or card after the call is completed, ascertains the charge rate in the same manner, computes the total charge, writes the information on the toll slip and notifies the caller.

On calls for which the operator is not requested or required to determine the charges, she merely records the calling number and called office together with the conversation time on a toll slip or card which is later sent to a billing department for processing.

The billing department collects both types of toll slips, computes and records the charges on each slip where necessary, sorts them by subscriber, and totals the slips for each subscriber when computing his toll statement for the current billing period.

From the preceding, it may be seen that, although the manual effort required on all operator completed toll calls is less than ideal, the quantity of effort is especially burdensome for those calls for which the operator must compute the charges either during or immediately after the call. On these, the operation which consumes the most time is that of ascertaining the charge rate. As has already been said, this information is not obtained automatically but instead, is obtained by the operator either by referring to printed material for calls to the more frequently called cities or by communicating with a rate and route operator for calls to the less popular localities. On these, the rate and route operator refers to voluminous printed material, ascertains the charge rate, and reports this to the toll operator handling the call. The time spent in this operation often exceeds that required by all the other operations combined including the dialing of the call to its completion. In addition to being a burdensome and expensive operation for the telephone company, this operation quite understandably may lead to customer annoyance on coin phone and hotel calls since he may be required to wait a considerable period of time while the operator ascertains the charge rate even though the same customer is accustomed to dialing the same call from his home and obtaining a connection to the called party within a few seconds.

The charging and billing procedure for customer dialed toll calls has been mechanized to some extent due to the availability of call data recording equipment in the central offices. One such system currently in use is the automatic message accounting system which was developed by the Bell System. In this, tape perforators are installed, as required, at local, tandem, and toll offices for recording call data on paper tapes. For the more distant calls, the information currently recorded in such systems, insofar as the present discussion is concerned, is limited to the identification of the calling and called stations together with the chargeable time for the call. At the present time no data is recorded regarding charge rates, except for calls to comparatively nearby offices. The tapes are collected periodically and sent to centrally located processing centers where the charge rates are determined, the charges computed, and the customer bills prepared.

The subsequent processing of the toll slips for operator completed calls and the call data tapes for subscriber dialed toll calls in order that the charge rates and total charges for the calls thereon may be computed is considerably more complicated than might at first appear. Although the methods used vary widely, it may be said that generally the charge rate for each call is obtained from translators utilizing stored media such as perforated cards or the like. Such translators are large, slow operating and expensive because they must have a separate card for each possible combination of calling and called offices served by the processing center in which they are located. The charge rate information obtained from the translator may then be recorded either on the original input record or on a new output record. The records containing this information are subjected to further processing for a computation of charges for each call, for collating by calling subscriber, and for the eventual preparation of each subscriber's toll statement.

From the preceding discussion it may be seen that the provision of a computer which could provide the charge rate for a call in response to the receipt of information identifying the two offices involved would be of considerable benefit to the telephone industry. Such a computer located in a dial switching office would allow coin phones to be integrated to a greater extent into the nationwide toll switching system. For example, the calling subscriber could dial a toll call from a coin phone in the same manner he does at the present time from his own home. The charge rate computer in the central office, upon receiving the number dialed as well as the identification of the calling station, would derive the charge rate and transmit it to visual indicators on an operator's board. The dial equipment could be arranged to block the completion of the call while the operator requests the caller to deposit the indicated amount of money and then ascertains that the proper deposit is made. Once the money is deposited, she could then operate a key which would allow the call to progress to completion in much the same manner as is done by CAMA operators at the present time for customer dialed toll calls from multiparty lines and from lines in offices having no call data recording equipment. Such an arrangement is shown in Patent 2,883,471 to C. E. Germanton, April 21, 1959. In the system disclosed therein, the progress of the call is blocked upon the completion of dialing while the operator orally ascertains the calling party's number and keys it into the switching equipment which then allows the call to proceed to completion.

In addition to calls from coin boxes, such as a charge rate computer situated at the switching center would minimize the amount of operator effort required on the other types of toll calls for which she must determine the charges, i.e., calls from hotels and calls for which she is requested to report the charges to the calling party at the termination of the call. In both of these situations the charge rate computer could be arranged to transmit its output information to a visual indicator which would automatically display the charge rate to the operator who then would only have to obtain the conversation time of the call in order to compute its charges and report them to the calling party.

The provision of a charge rate computer in the central office could also lead to a simplification of the billing procedures for those calls for which data tapes are currently produced at the switching centers. It has already been discussed how the data presently recorded on such tapes does not include the charge rates in most cases. This information is obtained from translators at the billing center during lengthy and complicated processing operations. If a charge rate computer were available in the central office, a suitable rearrangement of equipment thereat could be made whereby the charge rate computer would: receive information identifying the calling and called stations on each call, derive the charge rate from this information, and cause the derived charge rate to be perforated on the same output tape on which is currently recorded the previously described call data. This proposed arrangement would simplify the subsequent operations at the processing center since the call data tapes arriving thereat would contain the charge rate for each call. The tapes could then be fed through a computer which would derive the total charges for each call from the recorded charge rate and elapsed time information.

Although the preceding discussion points out only a few possible uses of a charge rate computer, it should be obvious that the provision of such a computer would be of immense value to the telephone industry since it would eliminate a number of expensive and time consuming operations currently performed by toll operators and would additionally simplify the complicated procedures now used in preparing subscriber toll statements.

An object of the present invention is to minimize the operator effort required in the serving of operator completed toll calls.

A further object of the invention is to minimize the operator effort required in the completion of certain types of subscriber dialed toll calls.

A further object of the invention is to facilitate the determination of charge rates for toll calls.

Another object of the invention is to facilitate the determination of charge rates for toll calls in response to information pertaining to the calling and called offices.

In accordance with the present invention, a relatively small and inexpensive computer is provided which, in response to the receipt of input information identifying the calling and called offices, classifies calls into various categories and then computes the charge rate for each call in accordance with a procedure dependent upon its classification. The utilization of different methods of computing charge rates, depending upon the classification of the call, renders economically feasible the mass production of computers having a limited memory capacity, but yet, which are suitable for installation in any switching center for a determination of the charge rates for all calls emanating therefrom or switched therethrough.

It has long been recognized that a charge rate computer would find wide usage in the telephone industry. However, with the present methods of determining charge rates, wherein the calling and called office for each call are directly compared, the enormity of the storage problem has precluded the development and mass production of any computer having universal utility. For example, with approximately 25,000 central offices in the United States, a computer would have to have a memory capacity of approximately 625,000,000 items in order to be able to determine the charge rates for calls between all possible combinations of these offices as long as the rates are determined by a direct office to office comparison. Although computers having such a memory capacity are in existence, their cost and size render them unsuitable for use in dial switching offices or in bill computation centers. A specialized computer utilizing direct office to office comparison could be constructed for any given installation serving only a few offices on an originating basis. The required memory capacity of any such computer could be reduced to approximately $25{,}000 \times N$, where N equals the number of originating offices served. Although such a computer might theoretically be feasible, it would not be susceptible of mass production and would not be economical due to its specialized nature and concomitant high cost.

The presently disclosed computer utilizes three different methods of charge rate determination with the particular method used for each call being determined by the characteristics of the call. This procedure, as explained hereinafter, permits a significant reduction in computer storage capacity over that required by the direct office to office comparison method. The three methods used in the present invention are designated method A, B and C, respectively, and the type of calls associated with each method are, for the purpose of discussion, referred to as class A, class B and class C calls.

Although a number of factors are involved, the main factor which determines a call's classification is the distance between the originating and terminating offices. Class A calls, which generally involve the shortest distances, are those in which appreciable backhaul may be encountered in completing them through a common tandem or toll switching center. This classification is given to all calls from an originating office to all offices in the same numbering plan area and, when desired, to calls from offices in limited portions of a maximum of two nearby and adjacent numbering plan areas to all offices in all three of these areas. The latter applies where a tandem or toll office is located near national area boundary lines and is arranged to serve originating offices in two or three areas. A sophisticated two-step translation procedure is used for these calls. Although this procedure basically involves a comparison of the called office with the originating office, it is considerably more economical and utilizes far less equipment than would a conventional one-step translation involving a direct comparison of the two offices. This comparison procedure is used on class A calls since the complexity of the trunking patterns between offices, the quantity of backhaul traffic, and other similar factors preclude the use of any other procedure such as, for example, one based upon distance. The class A designation would often be given to calls from a city in one state to its suburbs in adjoining states, i.e., from New York city to the adjacent suburban areas of New Jersey and Connecticut.

The class B designation is given to calls from an originating office in one national area to distant national areas wherein the location of the called office within its numbering plan area will have an appreciable bearing on the over-all distance of the call. Backhaul, however, is not involved. The charge rates for such calls are computed as follows: (1) A basic charge is derived in accordance with the minimum distance between the terminating numbering plan area and the originating tandem area in which the calling office is located. The term "originating tandem area" may be defined for the purposes of this specification as the area encompassed by all the local offices served on an originating basis by the tandem or toll switching center in which the present equipment would be installed. For example, if a particular toll switching center serves 50 local offices on an originating basis, the area encompassed by these 50 offices would be functionally designated as the originating tandem area. A tandem area may be a part of, and situated entirely within, a single numbering plan area or, alternatively, may encompass portions of not more than three such areas. (2) A terminating increment is derived which is dependent upon the location of the called office within its numbering plan area and with respect to the direction of the originating tandem area. (3) An originating increment is derived which is dependent upon the location of the originating office within its tandem area and with respect to the direction of the terminating area. The total charge rate is determined by adding these three factors.

A call from Newark, New Jersey, to Rockford, Illinois, would probably be classified as a class B call and the charge rate, therefore, would be derived as follows: A basic charge would first be derived for all calls between the numbering plan area which includes Rockford, Illinois and the tandem area serving the city of Newark. A terminating increment would then be derived in accordance with the distance the city of Rockford is from the eastern border of its numbering plan area. (For calls from areas west of Rockford, the terminating increment would be determined in accordance with the distance Rockford is from the western rather than from the eastern border of its area.) Finally, an originating increment would be derived in accordance with the distance Newark is from the western border of its tandem area. The total charge rate for the call would then be determined by adding the basic charge, the terminating increment and the originating increment.

The class C designation is given to calls from an originating office to offices in far distant numbering plan areas wherein the precise location of the called office in the terminating area has relatively little bearing on the overall distance of the call. Since the location of the called office in its area has little effect upon the distance of the call, it is proposed that a flat rate of each class C area be established and that all calls to any such area be charged identical charge rates. This proposal would enable the charge rate to be derived directly from the three-digit code of the terminating area. The derivation of charge rates in accordance with such a procedure would eliminate the necessity of class C calls of any further translation operations, other than, of course, the translation of the terminating area code, and would reduce the memory capacity and complexity of any equipment built to operate in accordance with these principles.

In accordance with this proposed method, all calls from New York city to any office in a given numbering plan area in California would probably be termed class C calls and would be assigned identical charge rates. The same classification would be given to calls from New York city to other distant numbering plan areas where the location of the called office within the called area has little effect on the distance of the call. For example, all calls from New York city to numbering plan areas in any of the Pacific states, and in probably some of the western states, could be classified as class C calls since an inspection of a United States map shows that the location of a called office in any of these areas would have little bearing on the over-all distance of a call from New York city. Continuing for a moment with the example of New York city as the situs of the originating office, it should be appreciated that, although calls from New York city to anywhere within a particular class C area will be assigned identical charge rates, calls from New York city to different class C areas will have different charge rates.

The presently disclosed computer was designed to derive the charge rates for toll calls dialed in accordance with the previously discussed nationwide toll numbering plan whereby a call is completed to any subscriber in the same numbering plan area by dialing only his seven-digit directory number and whereby a call is completed to a subscriber in another area by first dialing a special three-digit area code and then the seven-digit directory number. This three-digit area code is often functionally represented by XIX or XOX where the first X may be any value from 2 through 9 and where the second X may have any value from 0 through 9 except however, the eight codes 211, 311, 411 . . . 911 are not used as area codes and are used for other purposes. Thus, with this arrangement there are 152 possible area codes $$(8\times 2\times 10=160-8=152)$$

The computer comprising the present invention derives the charge rate for a call automatically and without further attention once information identifying the calling and called offices is received. The calling office information is received in the form of an originating zone number wherein each zone is a small geographical area comprising a portion of the tandem area served on an originating basis by a particular toll switching center. The exemplary embodiment of the information enclosed herein provides for a maximum of fifty originating zones designated 00 through 49 in a single tandem area. Thus, the representation of a particular originating office by its originating zone number identifies the geographical location of the office within a set of limits determined by the area encompassed by its originating zone. An originating zone may have either a single office or a plurality of offices. If it has a plurality of offices, all such offices will have identical charge rates for calls to other offices. The called office information, as received by the computer, comprises the first three or six digits, respectively, of the seven or ten digits dialed by the calling subscriber.

The first function performed by the computer once it receives this information is to ascertain whether the received data represents a class A, B or C call. It has already been stated that a call that is to be completed anywhere within the originating numbering plan (N.P.) area represents a class A call and that additionally, if desired, calls to a maximum of two nearby and adjoining N.P. areas may also be designated as class A calls. Since any call completed within the originating area is a class A call, it is obvious that any seven-digit call must, of necessity, be a class A call. Therefore once the computer ascertains that only seven digits were dialed, it energizes the portion of its circuit that is associated with class A calls to initiate a two-step translating operation for a derivation of the desired charge rate.

A ten-digit call may be either a class A, B or C call. Thus, once it is ascertained that ten digits were dialed, the first three (the area code) are fed to an area code translator which has an individual output terminal for each of the possible 152 area codes. The output terminals which represent the three possible class A areas are connected to the class A portion of the circuit to effect the processing of a call on a class A basis as already described. The output terminals of the area code translator which represents class B areas are connected to a class B portion of the circuit whereby a two-step translating operation may be initiated based on the terminating N.P. area, the terminating office code and the originating zone in order to derive a basic charge, a terminating increment and an originating increment for the call. These three factors are then fed to an adder circuit which derives the total charge rate for the call.

The output terminals of the area code translator which represent class C areas are selectively cross-connected directly to the output of the computer. No further translating operations are necessary for class C calls since the charge rate is determined exclusively from the area code indication and, therefore, the output terminals of the area code translator which represent class C calls may be directly cross-connected to the output of the computer to indicate the charge rate.

The charge rater comprising the present invention, when installed for use in a switching system, will be operatively associated with an item of switching equipment from which it will receive data pertaining to the calls whose charge rates are to be derived and to which it will supply the desired charge rate data. The details of the particular switching equipment with which the charge rater will be associated will, of course, be dependent to a large extent upon the characteristics of the over-all switching system of which both will be a part. The main requirement for this equipment, insofar as the present invention is concerned, is that it must have sufficient data concerning each call so that it, in turn, can supply to the present charge rate computer the originating zone of the calling office, the called office code and, where required, the terminating N.P. area code.

In accordance with present day telephone technology, the charge rater could advantageously be associated with an item of common control equipment called the "sender" in a number of the crossbar switching systems now in use. For example, if it is desired to use the charge rater in a local office, it could be associated with the sender shown in the A. J. Busch Patent 2,585,904 dated February 19, 1952, which discloses a crossbar system that is currently used in many local offices. Alternatively, if it is desired to use the charge rater at a tandem switching center, it could be associated with the sender shown in the Breed et al. Patent 2,848,543 of August 19, 1958, which discloses a crossbar tandem switching system. In both types of installation the charge rater would receive the data for calls whose charge rates are to be derived and, after completing its operation, would transmit the computed charge rate data back to the sender. The sender may be arranged to utilize the information in various manners. First of all, it could be arranged to transmit the computed charge rate to an operator's display board for those toll calls for which the operator is required to report or compute the charges. Secondly, a sender could be arranged to transmit the charge rate data to automatic recording equipment for those calls for which perforated data tapes are currently produced at the switching center. Still other arrangements are possible and, in short, the sender could be arranged to utilize charge rate data in any manner required by the over-all switching system of which it is a part.

The charge rater is a much faster operating unit than is the sender and, therefore, most installations will contain fewer charge raters than senders. The specific embodiment disclosed herein contemplates a single charge rater and ten senders. The charge rater contains the necessary preference and seizure circuits so that it will service the senders on an equitable basis during busy periods and also, so that two or more senders will never seize the charge rater simultaneously.

The charge rater is described in connection with an item of switching equipment (a sender) with which it could be associated in its commercial embodiment. It is disclosed in such a manner because it is believed that the operation of any complex piece of equipment, such as this is, can be more readily understood when accompanied by a description which sets forth the surrounding environment of the complex equipment and which describes the reasons why the charge rater operates in a certain manner rather than just describing how it operates without regard to its environment. The sender is disclosed herein only in diagrammatic form since its details comprise no part of the present invention.

The charge rater is not dependent, patentwise, upon either the sender or any other switching component. If desired, its input wires, which now are shown as running from the senders, could be connected instead to manually operable keys. The charge rater would work equally well in this situation and, in response to the selective operation of the keys by an operator, would undergo the same operations it now does and would derive the same items of output information. The output information in this case could be manifested by the energization of lights rather than by the operation of relays within the senders. In this case, the output wires from the charge rater would be connected to a panel of indicator lamps. However, it is believed that such a disclosure would leave much to be desired insofar as concerns clarity of understanding since it would fail to convey an appreciation of the over-all system of which the charge rater will normally be a part.

The charge rate computer comprising the present invention could also advantageously be used in a telephone bill processing center instead of in the central offices served by this billing center. In this case, the operator prepared toll slips and the call data tapes arriving at the billing center could be processed through a data reader which would transmit sufficient information to the charge rate computer whereby it would derive the desired charge rates for each call and would then transmit this output information to other equipment for controlling the subsequent step in the processing operation.

A feature of the invention is the provision of equipment which computes charge rates for calls by various methods with the method used for each call being dependent upon certain characteristics of the call.

A further feature of the invention is the provision of equipment for deriving charge rates for calls by various procedures with the procedure applicable to each call being determined by information pertaining to its called office.

A further feature of the invention is the provision of equipment for deriving charge rates for calls by various procedures with the procedure applicable to each call being determined by the geographical location of the called office.

A further feature of the invention is provision of the equipment which derives charge rates for calls by various procedures with the procedure applicable to each call being determined by information pertaining to its terminating office codes and its terminating area code.

A further feature of the invention is the provision of equipment for deriving charge rates for calls by a two-step translation wherein the output product of the first step comprises information pertaining to the terminating office, where the input information for the second step comprises the output information of the first step together with information pertaining to the originating office, and where the output of the second step indicates the desired charge rate.

A further feature of the invention is the provision of equipment for deriving charge rates for calls in response to the receipt of information identifying the calling and called areas, and the location of the calling and called offices within their areas.

A further feature of the invention is the provision of equipment for deriving charge rates for calls by first deriving a basic charge rate in accordance with the minimum distance between the geographical areas in which the calling and called offices are situated, deriving a terminating increment in accordance with the location of the called office within its geographical area with respect to the calling office, deriving an originating increment in accordance with the location of the originating office within its geographical area with respect to the called office, and finally, totaling these three factors to obtain the desired charge rate.

A further feature of the invention is the provision of equipment for deriving charge rates for calls in response to the receipt of information pertaining to the geographical area in which the called office is situated.

A further feature of the invention is the provision of equipment for deriving charge rates for calls to distant areas wherein the location of the called office within the area has little effect upon the distance of the call by translating an identification code of the terminating area.

These and other features and objects of the invention will be more readily apparent from the following description, the appended claims, and the drawings in which:

FIGS. 1 through 67 disclose the circuit of a preferred exemplary embodiment of the invention;

FIGS. 68, 69, and 70 illustrate the geographical arrangement of offices for class A, B, and C calls, respectively;

Figure 75:
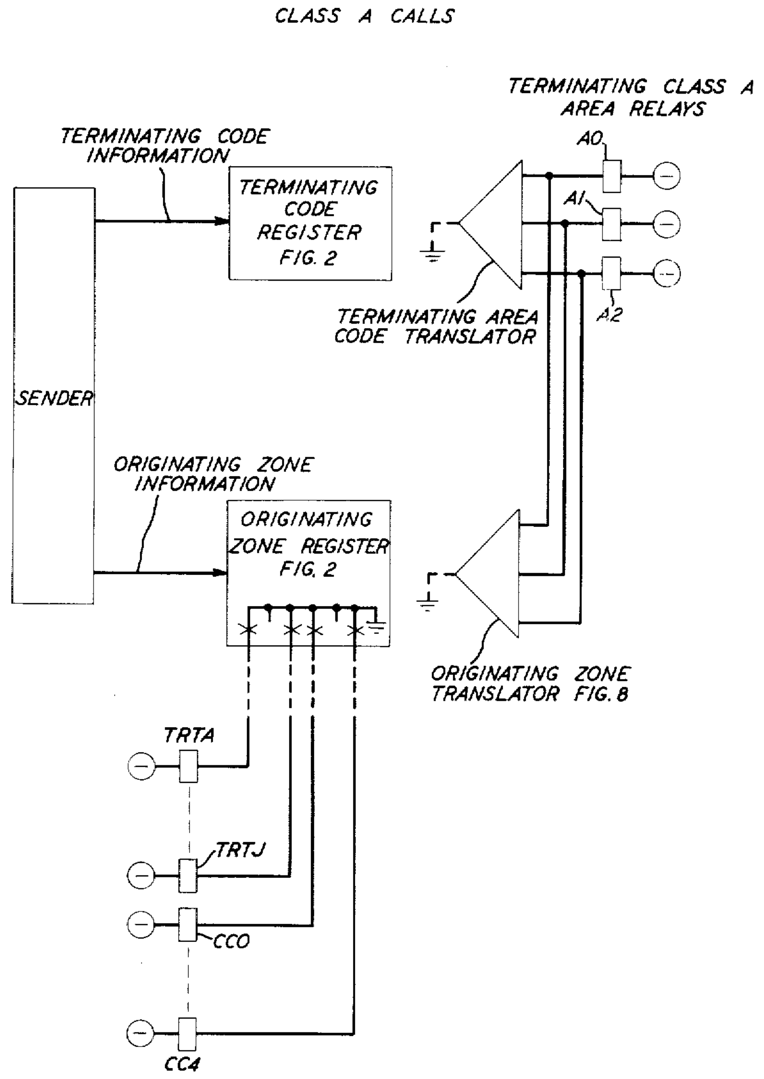
Figure 76:
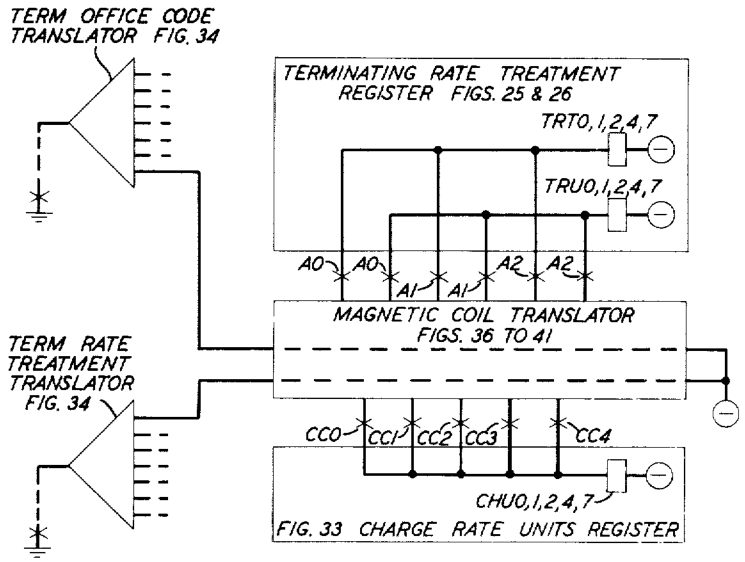
Figure 77:
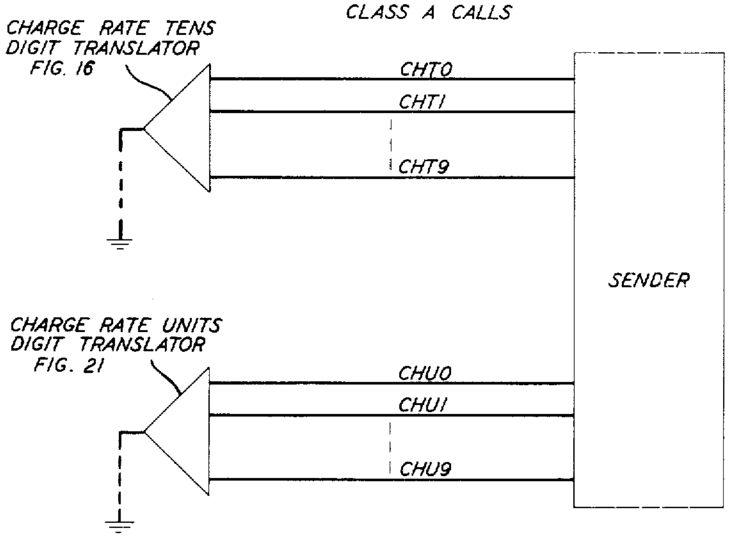
Figure 78:
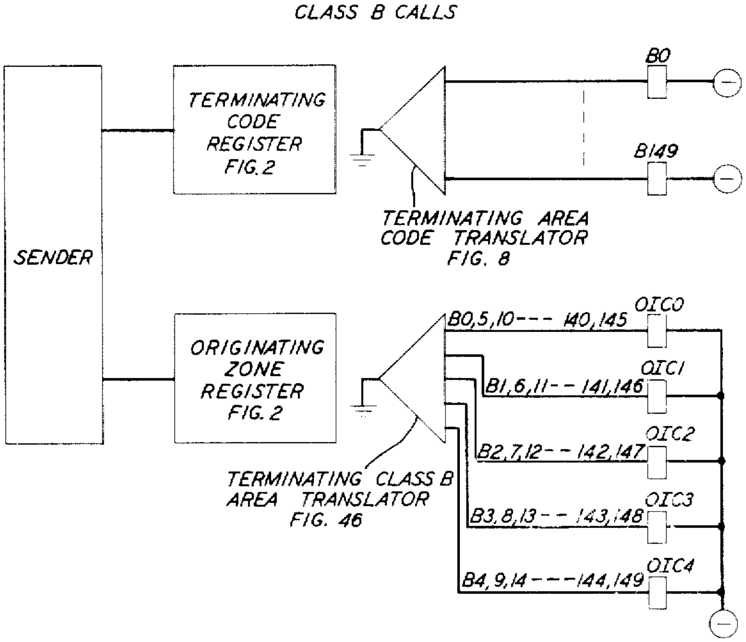
Figure 80:
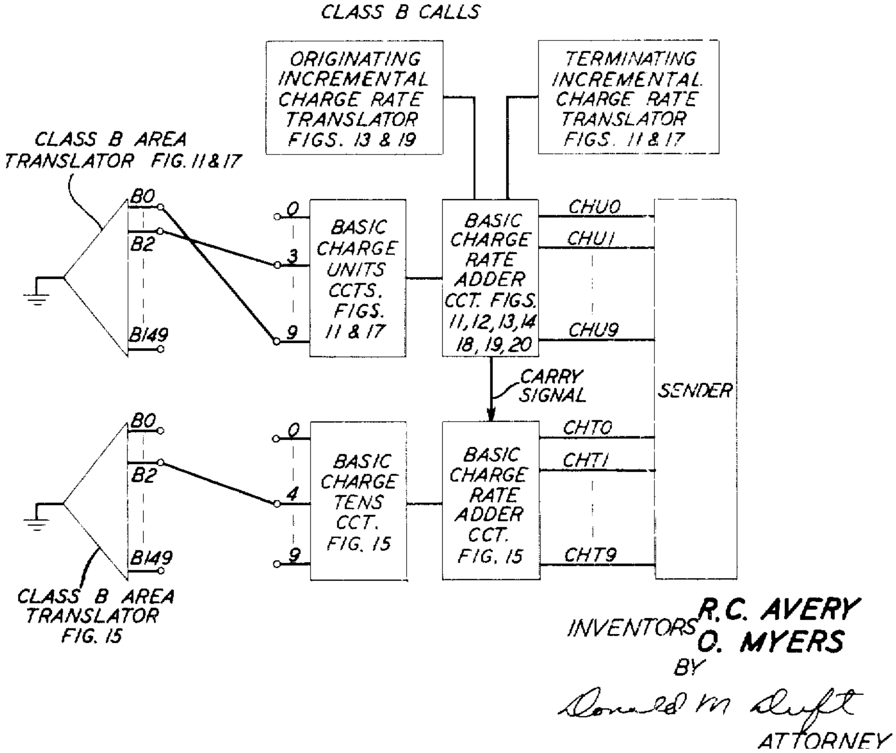
Figure 79:
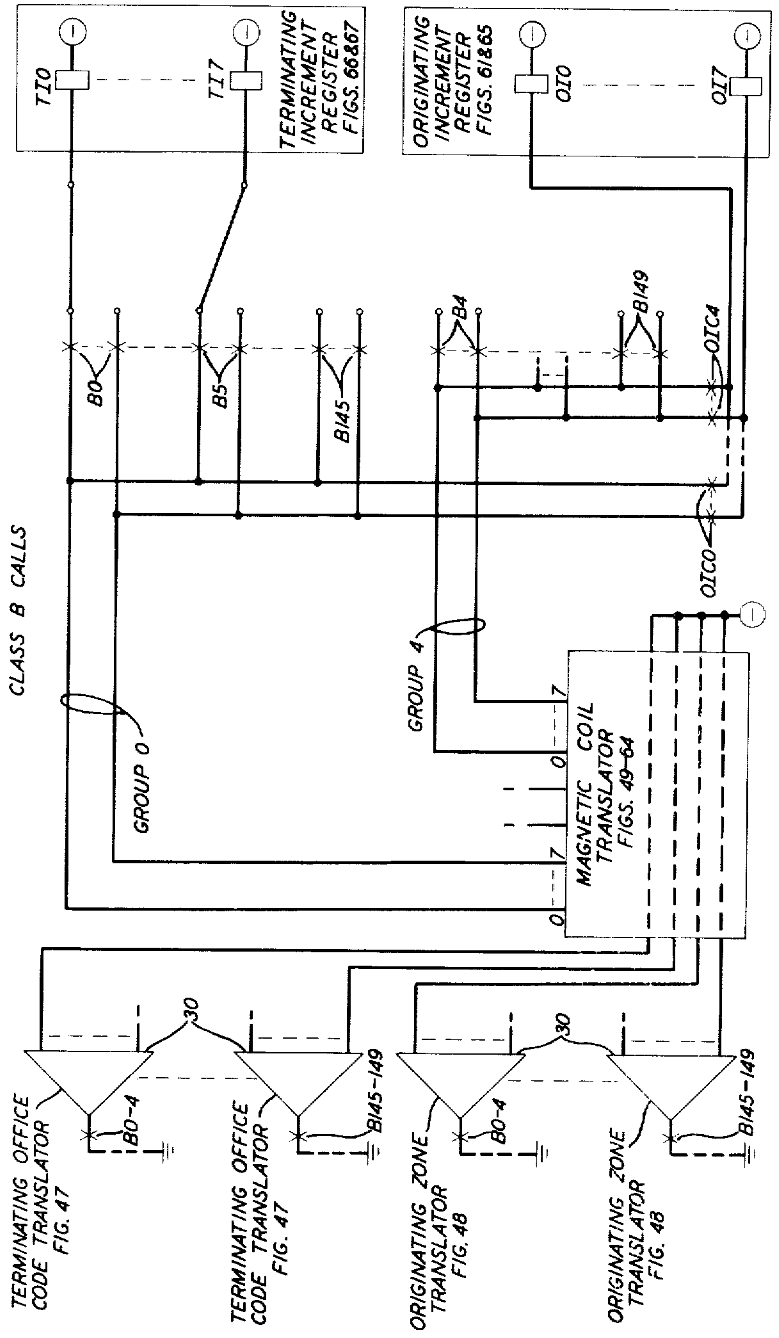
Figure 81:
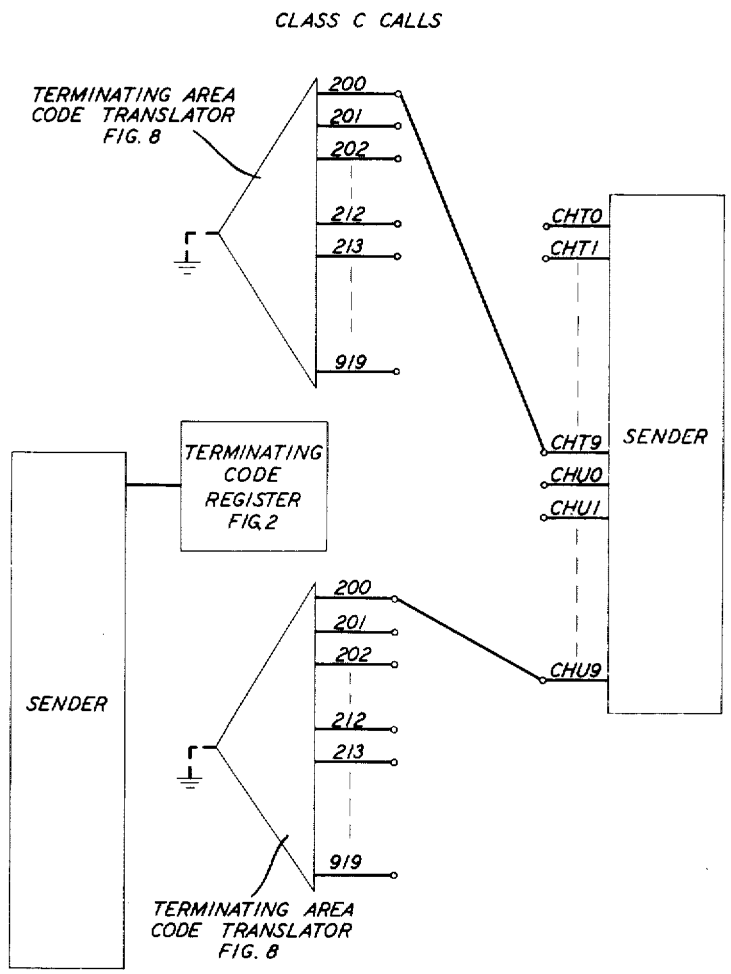

FIGS. 75, 76, and 77 diagrammatically illustrate the manner in which the present invention functions during the serving of class A calls;

FIGS. 78, 79, and 80 diagrammatically illustrate the manner in which the present invention functions during the serving of class B calls; and FIG. 81 diagrammatically illustrates the manner in which the present invention functions during the serving of class C calls.

The drawings disclose the circuit of the present invention in what is commonly known as the detached contact type of presentation wherein relay contacts are shown detached from the relay windings. It is believed preferable to utilize this type of presentation for large circuits since, among other reasons, the complete circuit over which each relay is operated is usually contained on a single sheet of the drawings. Thus, for example, referring to FIG. 3, the relatively complex circuit over which relay 3–CK1 operates is contained entirely on FIG. 3. If this circuit for this relay were disclosed in the "attached" contact type of presentation wherein relay contacts are shown adjacent their windings, many different sheets of drawings would, in all probability, be required together with the necessary interconnecting wires between sheets.

The digit or digits preceding the first dash in the designation of each relay indicate the figure number of the drawings on which the relay winding may be found. Thus, the winding of relay 1–GC is shown on FIG. 1 while the winding of relay 22–CKB is found on FIG. 22. The designation of the relay contacts includes in parentheses the relay designation with the digits before the parenthesis indicating the figure on which the contacts appear. Thus, contacts 22(1–GC) may be found on FIG. 22 and are associated with and controlled by the winding of relay 1–GC shown on FIG. 1.

Contacts which are closed when their associated relay is operated (make contacts) are represented by an X crossing the lines representing the connecting conductors while contacts which open when a relay is operated (break contacts) are represented by a short line intersecting the connecting conductors.

GENERAL DESCRIPTION

*Class A calls*

FIGS. 75, 76, and 77 together diagrammatically illustrate the manner in which the present invention functions functions to serve class A calls. Each unit of apparatus diagrammatically illustrated on these figures, as well as on FIGS. 78, 79, and 80 for class B, and on FIG. 81 for class C calls, has associated therewith an indication of the particular figure number, or numbers, on which the circuit details of the diagrammatically disclosed apparatus may be found.

The input information to the computer comprising the present invention is received from the sender shown diagrammatically on FIG. 75 and is applied to the terminating code register and the originating zone register shown on the same figure. The terminating code comprises the first six digits dialed by the calling subscriber, excluding directing digits and the like, and comprises a three-digit national area code plus a three-digit called office code for 10-digit calls, and for seven-digit calls, comprises a three-digit called office code plus the first three digits of the called station number. The originating zone information is of the same type on all calls and comprises a two-digit code indicating the location of the calling office within the geographical area served on an originating basis by an office having as a part thereof the computer comprising the present invention.

Depending upon whether the call is of the 10-digit or seven-digit type, either the terminating area code translator shown to the right of the terminating code register or the originating zone translator shown to the right of the originating zone register, respectively, is utilized to translate the received information and, in turn, provide an output indication of the terminating class A area. It will be recalled that any particular switching center can complete calls on a class A basis to only a maximum of three terminating areas. These three areas are represented by relays A0, A1, and A2, and one, and only one, of these relays will be operated on each class A call.

Thus, if the call is of the seven-digit type, the originating zone information registered in the originating zone register is translated and applied to one of relays A0 through A2 to operate it is an indication of the class A area. If the call is of the 10-digit type, the terminating area code registered in the first three stages of the terminating code register is translated and applied to one of relays A0 through A2 to operate it. Only the three outputs of the terminating area code translator which represent the national area codes for the three possible class A terminating areas are connected to relays A0, A1, and A2. The other outputs of this translator represent either class B calls, class C calls, or vacant national area codes and are not connected to any of the circuitry on this figure.

Two groups of relays designated TRTA through TRTJ and CC0 through CC4 are connected to the originating zone register. One relay in each of these groups is operated in response to the originating zone registration on each call to simplify the translation of the originating zone information as subsequently described.

The terminating office code stored in the terminating code register of FIG. 75 is translated by contacts of the relays comprising part of this register to derive an output indication for the terminating office code. This terminating office code translator is shown on the upper left-hand corner of FIG. 76 where each of the horizontal lines on the right-hand side of the translator represents an output for a different terminating office code. A wire or jumper is then connected from each such output and is selectively threaded through coils of the magnetic coil translator. The operation of the terminating code register on FIG. 75 for a call closes contacts within the terminating office code translator on FIG. 76 to energize the output conductor representing the terminating office code. This causes a heavy surge of current to flow over this conductor which, being selectively threaded through the various coils of the magnetic coil translator, induces a resultant output signal on each coil through which it is threaded.

Each terminating office code may appear in all three of the terminating class A areas, and therefore each conductor representing a terminating office code is selectively threaded through three sets of coils in the coil translator. Each coil set is associated with one of the three terminating class A areas and, when energized by the current over a conductor representing a particular terminating office code, each coil set products an output indication signifying the terminating rate treatment for calls to that office within its associated class A area.

The terminating rate treatment comprises a two-digit number and is registered in a two-out-of-five combinational code form by the two groups of relays shown within the terminating rate treatment register on the top of FIG. 76. Recalling that the terminating class A area for a call is represented by the operated one of the three relays A0, A1, and A2 on FIG. 75, the contacts of these three relays are utilized on FIG. 76 to interconnect the terminating rate treatment register relays with the outputs of three coil sets of the coil translator. For example, assuming the terminating area on a particular call is represented by the operation of relay A0, the operation of this relay closes its make contacts on FIG. 76 to interconnect the terminating rate treatment register relays with the set of coils utilized to derive the terminating rate treatment for calls to class A area 0. Thus, the application of a surge of current by the terminating office code translator to a jumper representing a terminating office code induces output signals in all three sets of coils of the coil translator. However, the terminating rate treatment register relays at this time are connected only to the coil set for class A area 0, by the contacts of relay A0, and therefore, only the output signals developed within this coil set are effective to operate the two sets of relays comprising this register to register the terminating rate treatment for calls to this particular called office within class A area 0.

Contacts of the terminating rate treatment register relays are wired to comprise the terminating rate treatment translator shown in the lower left-hand corner of FIG. 76. This translator has an output indication for each terminating rate treatment. Also, contacts of relays TRTA through TRTJ comprise an integral part of this translator, and each output indication within this translator representing a unique terminating rate treatment is connected to a set of make contacts on each of relays TRTA through TRTJ. The other side of the make contacts of these relays comprises the plurality of outputs shown on the terminating rate treatment translator. By this expedient, each output represents a complete translation of the terminating rate treatment number and a partial translation of the originating zone information since, as will be recalled, relays TRTA through TRTJ are operated by the originating zone register of FIG. 75.

Each output terminal of the terminating rate treatment translator is connected to a jumper which is selectively threaded through coils within the coil translator.

The coils of this translator are divided into five sets during this translation and each set is connectable to the relays of the charge units register by make contacts of relays CC0 through CC4. The operation of the terminating rate treatment translator closes circuits to energize one of its outputs which, in turn, causes a surge of current over the jumper connected thereto. This current induces output signals in all of the five sets of coils within the magnetic coil translator. However, only one of relays CC0 through CC4 is operated on a call, and the contacts of the operated one of these relays interconnects one coil set with the charge units register relays so that the signals developed within the connected coil set may enter the units digit of the charge rate in two-out-of-five combinational code form into the charge units register.

Contacts of the relays of the charge units register are wired to comprise the charge rates units digit translator shown on the lower left-hand portion of FIG. 77. Circuitry is closed within this translator to energize one of its ten outputs in accordance with the units digit of the derived charge rate. This information is then transmitted over the appropriate one of the conductors CHU0 through CHU9 to the sender.

Figure 16:
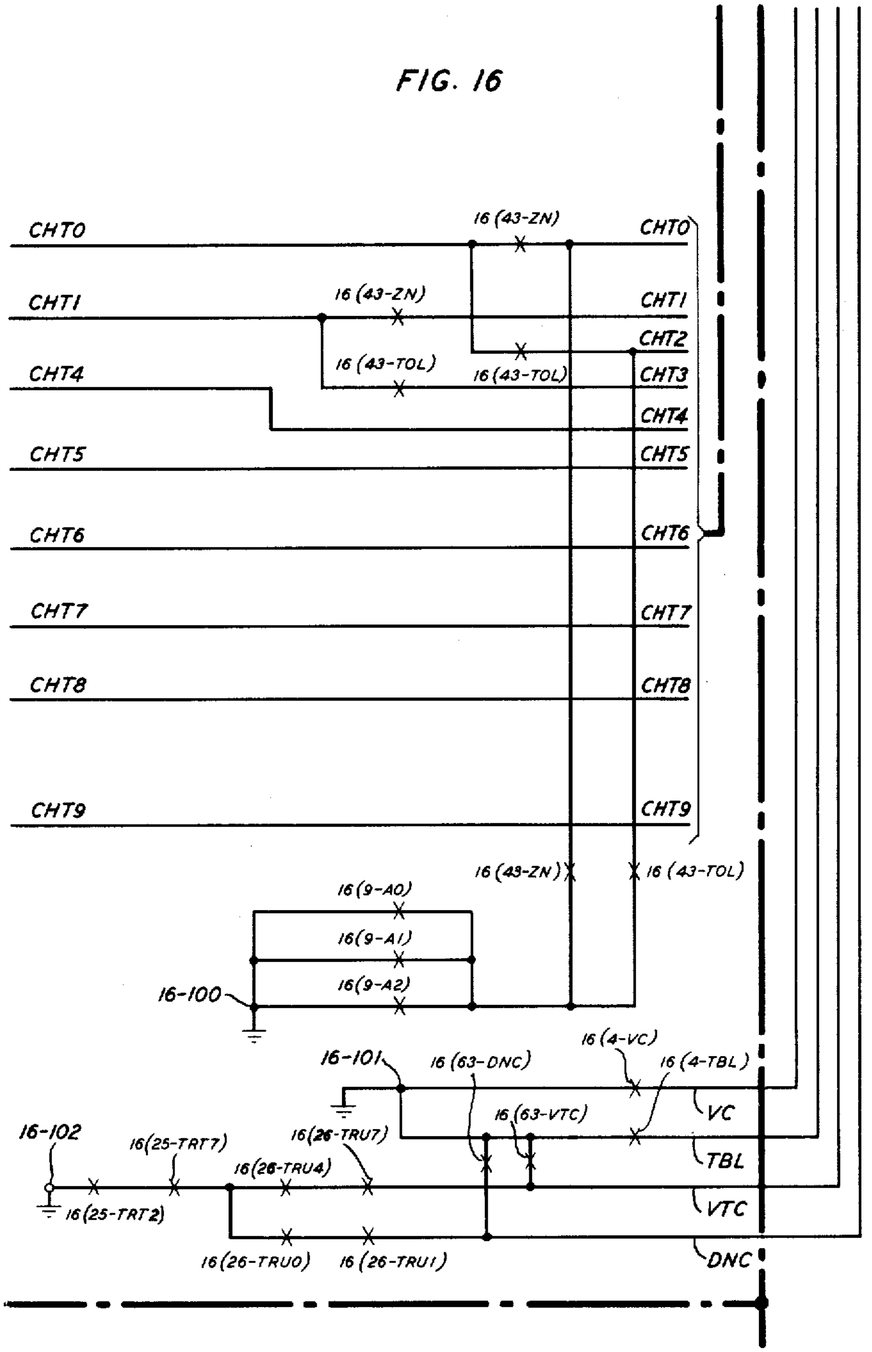

The tens digit of the charge rate is derived by a charge rate tens digit translator, shown diagrammatically in the upper left-hand portion of FIG. 77 and shown in detail on FIG. 16. One of the outputs of the translator is energized in accordance with the tens digit of the charge rate, and this information is transmitted to the sender over the appropriate one of conductors CHT0 through CHT9.

*Class B calls*

FIGS. 78, 79, and 80 disclose diagrammatically the manner in which the circuit of the present invention operates during the serving of class B calls. It will be recalled from the previous discussion that the charge rate for class B calls is derived by the following steps: (1) deriving a basic charge rate in accordance with the minimum distance between the geographical areas in which the calling and called offices are situated; (2) deriving a terminating incremental charge rate in accordance with the location of the called office within its area with respect to the direction of the originating office; (3) deriving an originating incremental charge rate in accordance with the location of the originating office within its area with respect to the direction of the terminating area; and (4) totalizing the basic and the two incremental charge rates in order to derive the total charge rate for the call.

The sender shown on FIG. 78 transmits terminating code information to the terminating code register and originating office information to the originating zone register. The originating zone information is of the same type previously discussed for class A calls. The terminating code information for class B calls is always a three-digit national area code plus the three digits of the terminating office code since class B calls are of the 10-digit type. The terminating area code stored within the terminating code register is translated by the terminating area code translator, immediately to the right thereof, which has a separate output for each terminating area code. Each output of this translator representing class B calls is selectively connected to a different relay in the group of relays B0 through B149. This group of relays provides for the designating of a maximum of 150 national areas as class B areas. The outputs of this translator representing class A and class C areas are not connected to any of relays B0 through B149. Assuming that a class B terminating area code is registered in the terminating code register, a circuit is closed within the terminating area code translator to apply an output potential to the one output thereof which represents the called class B area. This output, in turn, is interconnected with one of the relays B0 through B149 to operate it.

The contacts of relays B0 through B149 are wired to comprise a translator having five outputs, with each output being associated with a plurality of the class B areas in the manner shown on FIG. 78. Each output, in turn, is interconnected with one of relays OIC0 through OIC4. Thus, with the foregoing arrangement, it may be seen that calls to class B areas 0, 5, 10, etc., operate relay OIC0, and that calls to others of the class B areas operate others of the relays OIC1 through OIC4 in the manner illustrated.

The contacts of the terminating office code register relays within the terminating code register of FIG. 78 are wired so as to comprise 30 terminating office code translators shown on FIG. 79 with each translator having a unique output for each terminating office code. The uppermost one of these 30 translators is connectable to ground over a circuit including contacts of relays B0 through B4, while others of these translators are connectable to ground by means of contacts on other B– relays. The last translator is connectable to ground via contacts of relays B145 through B149. Each output terminal of each of these translators is connected to a jumper which, in turn, is selectively threaded through coils of the magnetic coil translator.

With the foregoing arrangement, it may be seen that the energization of an office code output on one of the translators represents a translation for the called office code in not one, but rather in all five, of the class B areas associated with the translator. Thus, for example, an output potential on one of the outputs of the uppermost terminating office code translator identifies the terminating office code only to the extent that it may be in any one of class B areas 0 through 4. The potential on this output is applied over the jumper connected thereto and causes a surge of current to flow over the jumper and induce an output potential in all of the coil sets through which the jumper is threaded. Each jumper is threaded through five sets of coils, one for each of the five possible class B areas associated with the jumper, and contacts of the B– relays are utilized to pick off the output signals from the desired set of coils representing the class B area for each call.

For example, assuming a call to class B area 0, an output potential is applied to the output of the uppermost terminating office code translator representing the called office. The resulting current over the jumper connected thereto induces potentials in all five sets of coils. The output conductors from each group of coils are connected to make contacts of the various B– relays in the manner shown, with the output conductors of group 0 being connected to contacts of relays B0, B5, and in a similar manner to the first B– relay in each succeeding group of five, up through and including relay B145. The output conductors for the other coil groups are connected in a similar manner as illustrated.

Thus, continuing with the assumption of a call to class B area 0, the output conductors of the first coil group are extended by the make contacts of relay B0 to the terminals shown on the right-hand portion of FIG. 79 which, in turn, are selectively cross connected to relays in the group of relays TI0 through TI7. These relays represent terminating incremental charge rates of 0 through 7, respectively. In this manner for a call to class B area 0, the outputs of coil set 0 are selectively extended through make contacts of relay B0 to the windings of relays TI0 through TI7 so that the one coil in group 0 through which the jumper representing the terminating office code for the present call is threaded will be energized and thereby operate the TI– relay to which it is connected to signify the terminating incremental charge rate for the call.

The contacts of the originating zone register relays on FIG. 78 are wired so as to comprise 30 separate originating zone translators, as shown on FIG. 79, with each translator being connected to five B– relays in the manner illustrated. Each output of each translator is connected to a jumper which, in turn, is selectively threaded through coils of the coil translator. With the foregoing arrangement, the output of each of these 30 translators represents the originating zone information for five possible class B areas. A surge of current over the jumper connected to each translator output terminal induces output potentials in all five sets of coils. Each coil set at this time signifies one of the five possible class B areas associated with the energized jumper. The output information from the coil set associated with the class B area for a particular call is obtained via the make contacts of relays OIC0 through OIC4, only one of which is operated at a time, as previously described for FIG. 78, under control of the terminating class B area translator. The closure of the contacts of the operated one of the OIC0 through OIC4 relays interconnects the seven conductors of the appropriate coil group with relays OI0 through OI7, which represent originating incremental charge rates of 0 through 7, respectively. The output potential from the one energized coil in the coil set associated with the class B area for a call is thereby effective to operate the particular one of these relays which represents the originating incremental charge rate for the call.

The contacts of relays B0 through B149 are wired so as to comprise two separate class B area translators, as shown on the left-hand portion of FIG. 80. Each output terminal of these translators represents one of the possible 150 class B terminating areas. Each class B output terminal of the upper translator is selectively cross connected to the input terminals of a basic charge units circuit, while each output terminal of the other translator is selectively cross connected to the input terminals of a basic charge tens circuit. The derived basic charge units information is applied to a basic charge rate adder which also receives terminating incremental charge rate information and originating incremental charge rate information. The adder then totalizes the units digit of the basic charge rate and the two incremental charge rates to obtain the units digit of the total charge rate which is then transmitted to the sender over one of conductors CHU0 through CHU9.

The derived basic charge rate tens information is applied to the basic charge rate adder circuit, which also receives a carry signal from the adder for the units digit when applicable. The tens digit of the total charge rate is then derived and transmitted to the sender over the appropriate one of conductors CHT0 through CHT9.

*Class C calls*

FIG. 81 discloses the manner in which the circuit of the present invention operates during the serving of class C calls. Class C calls are stated to be of the 10-digit type, and therefore, the terminating code information transmitted from the sender at this time comprises the three digits of the terminating area code and the three digits of the terminating office code. The contacts of the terminating area code relays of the terminating code register are wired so as to comprise two separate terminating area code translators, as shown on FIG. 81. Each translator has an output terminal for each possible terminating area code. Some of these output terminals represent class A areas, while others represent class B areas. These terminals are left vacant and are not used on the circuit of FIG. 81. The output terminals representing class C areas are selectively cross connected to input conductors of the sender so as to indicate directly the tens and units digits of the total charge rates for the call. Thus, the uppermost terminating area code translator has its class C area output terminals selectively interconnected with conductors CHT0 through CHT9 of the sender to indicate directly the tens digits of the charge rate. In a similar manner, the lower terminating area code translator has its class C area output terminals interconnected with conductors CHU0 through CHU9 of the sender to indicate directly the units digit of the total charge rate.

DETAILED DESCRIPTION

*1.0 Seizure of charge rater*

Figure 1:
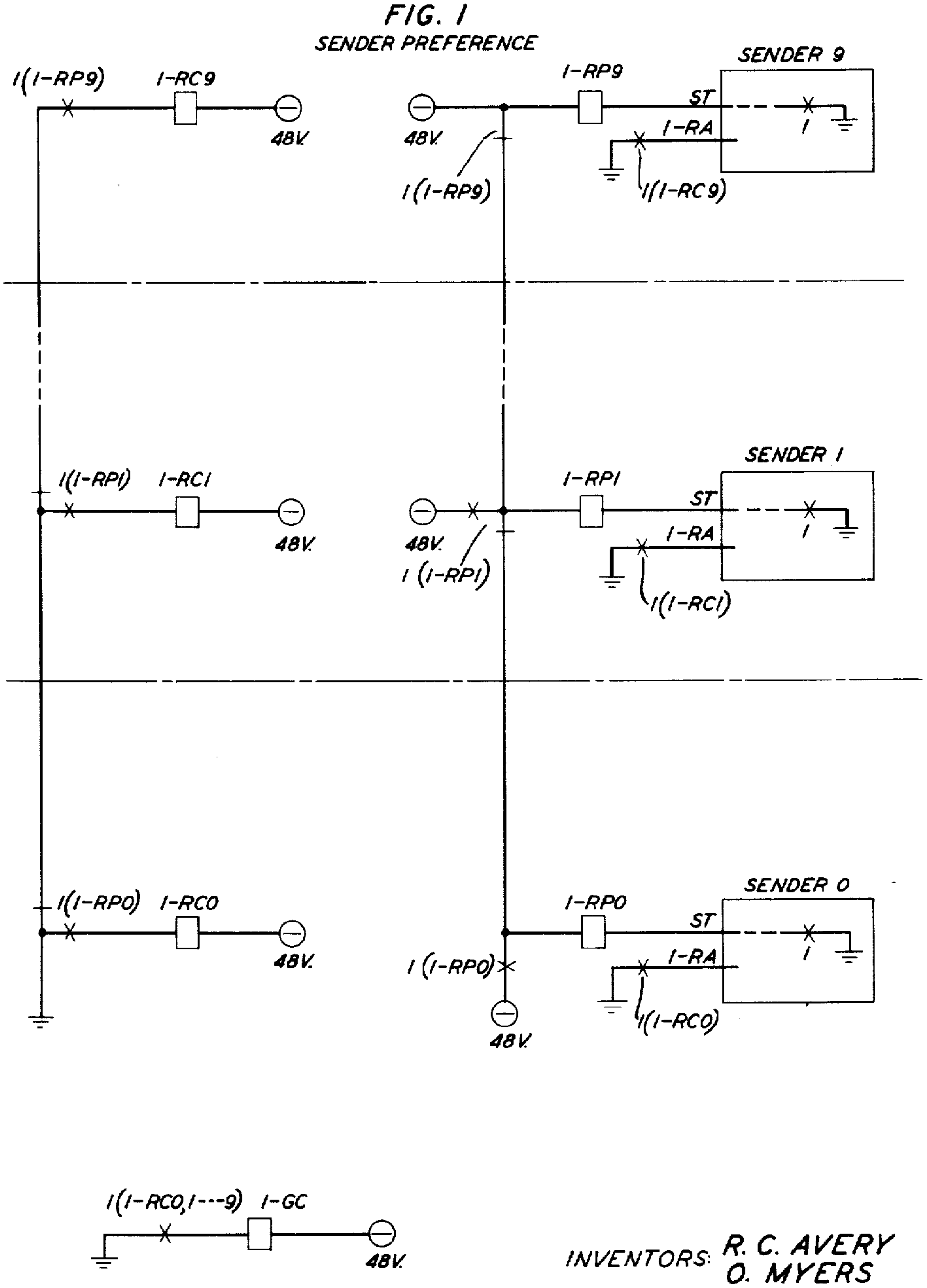

FIG. 1 discloses a preference and connector circuit which allows a single charge rater to serve ten senders. Skeletonized portions of senders 0, 1 and 9 are shown within the rectangles. Each sender is functionally associated with that portion of the charge rater's preference circuit which is on the same horizontal level with it on FIG. 1. For example, sender 0 is associated with relays 1–RP0 and 1–RC0. The same relationship exists between each of the remaining senders and the other relays of FIG. 1.

Contacts 1 within each sender are operable to supply an operating potential to its associated relay 1–RP– in the charge rater. The details of the circuits within the senders which operate contacts 1 are not shown since they represent no part of the present invention. Insofar as an understanding thereof is concerned, it is only necessary to appreciate that make contacts 1 in a sender close and apply a ground to its associated 1–RP– relay as the sender attempts to connect itself to the charge rater.

Let it be assumed that sender 0 attempts to seize the charge rater. This attempt is manifested by the closure of make contacts 1 in sender 0 which extend a ground through the winding of relay 1–RP0, through break contacts 1(1RP1) . . . 1(1–RP9) to battery. The current flowing over this circuit operates relay 1–RP0 which closes its make contacts 1(1–RP0) to supply a holding battery to the left side of its winding.

Similar circuits exist whereby the closure of contacts 1 in sender 1 operates relay 1–RP1 and whereby the closure of contacts 1 in the other senders operate their associated 1–RP– relays. The left winding terminal on each of relays 1–RP0, 1–RP1, . . . 1–RP8 (not shown) is connected to battery by means of a preference circuit comprising break contacts on one or more of the 1–RP– relays. The left winding terminal of relay 1–RP9 is connected directly to battery and therefore, this relay will operate whenever a ground is applied to its right winding terminal by sender 9. The left winding terminal of relay 1–RP1 is connected to battery through break contacts 1(1–RP2) (not shown) . . . 1(1–RP9) and therefore, relay 1–RP1 can only operate when all of relays 1–RP2 . . . 1–RP9 are unoperated. Similarly, relay 1–RP0 is connected to the same battery through a series circuit comprising break contacts on each of relays 1–RP1, . . ., 1–RP9 so that it can operate only when all of these relays are unoperated. This arrangement comprises a preference circuit whereby each relay will be operated in a certain preferred order during busy periods when a plurality of senders may attempt to seize the charge rater simultaneously.

Continuing with the previous assumption that sender 0 closes its make contacts 1 to operate relay 1–RP0, the operation of this relay closes a path from ground, through make contacts 1(1–RP0) to operate relay 1–RC0.

The left winding terminals of relays 1–RC0, . . . 1–RC9 are connectable to ground by means of a preference circuit comprising make and break contacts on relays 1–RP0, . . . 1–RP9. This preference circuit is arranged so that relay 1–RC0 is first preferred and will always operate whenever make contacts 1(1–RP0) close upon the operation of relay 1–RP0. At the same time these make contacts close, break contacts 1(1–RP0) open and remove ground from the operating paths of relays 1–RC1 . . . 1–RC9. Similarly, the operation of relay 1–RP1 closes a path to operate relay 1–RC1, providing that relay 1–RP0 is unoperated, and in doing so, opens the operating paths for relays 1–RC2, . . ., 1–RC9. Relays 1–RC0, . . ., 1–RC9 are connector relays which are operable to connect the charge rater to the various senders.

It is necessary to associate the operating paths of relays 1–RC0, . . . , 1–RC9 with a preference circuit in order that only one of them may be operated at a time. For example, assume that sender 0 seizes the charge rater at a time when all the other senders are idle and therefore, succeeds in operating relay 1–RP0 which locks to battery over its make contacts 1(1–RP0). The operation of this relay causes the operation of relay 1–RC0 in the manner already described.

Also assume that a short time later sender 9 attempts to serve a call and operates relay 1–RP9, the left winding terminal of which is connected directly to battery. At this time it may be seen that both relays 1–RP0 and 1–RP9 are operated. The operation of relay 1–RP9 has no effect on the operation of 1–RP0 which remains operated over its locking path. Relay 1–RC9 cannot operate at this time because its operating path to ground is opened by means of the preference circuit at break contacts 1(1–RP0). The necessity of the preference circuit in the operation path of the connector relays may readily be seen since, if each of the connector relays, such as 1–RC9, were operated solely by means of a make contact on its associated relay 1–RP9, it would be possible for more than one connector relay to be operated simultaneously because two or more of relays 1–RP0 . . . 1–RP9 may be operated simultaneously.

The operation of relay 1–RC0 closes a ground through its make contacts 1(1–RC0) to operate relay 1–GC. The operation of relay 1–GC controls a number of ground connections to various circuits within the charge rater, speeds up the release of the charge rater and prevents false operations during the release time by opening the grounds it supplies simultaneously.

The designation of make contacts 1(1–RC0, 1 . . . 9) in the operate path of relay 1–GC indicates that they represent ten parallel connected make contacts on the ten relays 1–RC0 through 1–RC9. There are a number of other instances on the drawings where a single set of contacts actually represent a plurality of parallel connected contacts. In each case contacts of this type are designated in a manner similar to contacts 1(RC0, 1 . . . 9). In describing a circuit containing such contacts, only the specific contacts will be enumerated which are on the single relay that has been assumed to have operated. Thus, the path over which relay 1–GC operates, upon the operation of relay 1–RC0, is specified to be from ground, through make contacts 1(1–RC0) to the winding of relay 1–GC. This nomenclature will be utilized throughout this specification.

*2.0 Class A calls*

This section describes the circuit operations for the processing of class A calls. It was stated earlier that class A calls generally involve shorter distances than do class B and C calls and that this classification is given to calls originating in a particular area and directed to other offices in the same N.P. area and also, when desired, to calls originating in limited portions of a maximum of two nearby and adjacent N.P. areas and directed to any offices in all three of these areas. A geographical example of such an arrangement would be a city in one state together with its suburbs in its adjoining states where the presence of backhaul precludes direct distance measurements, i.e. New York city together with the adjacent suburban areas of New Jersey and Connecticut.

FIG. 68 discloses an arrangement of this type wherein calls may be completed on a class A basis between three class A terminating areas 0, 1 and 2. Each such area also represents an individual N.P. area in accordance with the nationwide toll numbering plan previously discussed. The tandem office located in class A area 2 may serve, on a class A basis, calls originating from any of the local offices shown within the circle designated "tandem area" and directed to any offices in areas A0, A1 or A2. For example, a call originating anywhere in area A0 and directed to an office in the same area will be served by the tandem office on a class A basis. Also, a call originating in the area A0 portion of the tandem area and directed to any office in either area A0, A1 or A2 will similarly be completed on a class A basis. In short, the tandem office will handle, on a class A basis, calls originating anywhere within the tandem area circle and directed to any class A area. However, calls originating in these local offices and directed to national areas other than those shown on FIG. 68 will be served by the tandem office on a class B or C basis, depending upon the destination of the call. Also, a call originating in a part of area A1 which is not within the tandem area circle and directed to an office in area A0 or A2 will be served on a class B or C basis.

The circle shown on FIG. 68 designated "tandem area" encompasses a portion of all three class A areas and contains the local offices served on an originating basis by the tandem office. The tandem area is divided into a number of smaller segments designated "originating zone." Each originating zone contains either a single or a plurality of local offices and serves to identify the geographical location of each office within the tandem area circle. If an originating zone has a plurality of offices, all offices will have the same charge rates for calls to any given distant office.

The exemplary embodiment of the invention disclosed herein provides for a maximum of fifty originating zones designated 00 through 49 in a single tandem area. Thus, the representation of a particular originating office by its originating zone number identifies the geographical location of the office within a set of limits determined by the area encompassed by its originating zone. There can be no conflict of originating zone numbers in the tandem area served by the tandem or toll office on an originating basis where the tandem areas comprise portions of more than one class A or national area. Therefore the originating zone number for a calling office also signifies the originating national area.

In the arrangement shown on FIG. 68, the charge rate computer comprising the present invention would, in all possibility, be installed in the tandem office in order that it could derive the charge rates for toll calls originating from all the local offices and served by the tandem office. This arrangement would be economical since it would provide for a maximum utilization of the charge rate computer, the toll switching equipment at the tandem office, and the toll operators thereat. It should be understood that this arrangement is only illustrative of one possible use of the present invention and that, if desired, the presently disclosed charge rate computer could be installed in an originating office having sufficient outgoing toll traffic to justify the expense of its installation and of any toll operators who also might be stationed in the same office. An example of such an installation might be a local office which primarily serves a hotel area of a large city. In this case, the toll operators and charge rate computer at the local office would serve the toll calls from the various hotels and would provide an ideal arrangement whereby each hotel could immediately be notified as to the cost of every toll call originating therefrom. In the event that this equipment is installed in such a local office, the originating zone designations would not represent the geographical location of the originating office as shown on FIG. 68 but, instead, would represent the geographical location of the originating subscriber.

As is described in the following pages, a two-step translation is used in the derivation of the charge rate for class A calls. In the first translation the terminating office code is translated to derive what is known as a "terminating rate treatment" which comprises information unique to the terminating office code as well as unique to the terminating class A area. In the second translation, the terminating rate treatment is translated with respect to a particular originating zone and the ouput of this translation manifests directly the charge rate for the call. Although this two-step translation basically involves a comparison of the calling and called offices, it does so in a manner that is more sophisticated and that uses less equipment than would a one-step comparison of the two offices.

*2.01 Receipt of input data*

Continuing with the assumption that sender 0 seizes the charge rater, closure of contacts 1(1–RC0) applies a ground to sender 0 over conductor 1–RA to notify it that it is now attached to the charge rater. Once sender 0 receives this information, it transmits to the charge rater the information it needs in order to derive the charge rate for the call currently being served. The circuits over which the charge rater receives this information are shown on FIG. 2. Included in this received information are the originating zone of the calling office and the first six digits dialed by the calling subscriber.

The first six digits dialed and registered in the sender will comprise the three-digit terminating area code and the three-digit terminating office code for national area (10-digit) calls and the three-digit terminating office code plus the first three digits of the station designation for seven-digit calls. These first six digits are always designated A through F respectively (regardless of the type of call) and are stored in two-out-of-five code form in the terminating code register relays of FIG. 2. The first digit dialed, the A digit, is registered in two-out-of-five code form by relays 2–TA0, 1, 2, 4 and 7 which are shown as a single relay on FIG. 2 for ease of illustration. The remaining five digits are similarly registered by the remaining groups of relays with the last digit, the F digit, being registered in two-out-of-five code form by the relay group 2–TF0, 1, 2, 4 and 7.

Let it be assumed that a New Jersey subscriber situated in a tandem area which serves New York city on a class A basis dials a call to a subscriber in New York city whose phone number is WA6–1023. Since the national area code for New York city is 212, the New Jersey subscriber dials 212–WA6–1023. Let it further be assumed that the calling party's number is CR3–6012 and that his office is situated in originating zone 25. The first digit dialed by the calling subscriber, digit 2, is registered in the sender and then transmitted to the charge rater over the circuit comprising ground in the sender, through make contacts 2–TA0 and 2–TA2, respectively, in the sender, through make contacts 2(1–RC0), to operate relays 2–TA0 and 2–TA2, respectively, in the charge rater. The combined operation of these two relays represents the digit 2 in two-out-of-five code form. The second digit dialed, digit 1, is transmitted to the charge rater by the circuit comprising ground in the sender, through make contacts 2–TB0 and 2–TB1, respectively, in the sender, make contacts 2(1–RC0), to operate relays 2–TB0 and 2–TB1, respectively, in the charge rater. The operation of these two relays represents the digit 1 in two-out-of-five code form. The third dialed digit, digit 2, is transmitted to the charge rater from ground in the sender, through make contacts 2–TC0 and 2–TC2, respectively, in the sender, make contacts 2(1–RC0) to operate relays 2–TC0 and 2–TC2, respectively.

The fourth digit dialed is the letter W which corresponds to the digit 9. This is transmitted to the charge rater by the circuit comprising ground in the sender, through sender make contacts 2–TD2 and 2–TD7, respectively, through make contacts 2(1–RC0), to operate relays 2–TD2 and 2–TD7, respectively. The fifth digit dialed is the letter A which corresponds to the digit 2. This digit is transmitted to the charge rater by the circuit comprising ground in the sender, sender make contacts 2–TE0 and 2–TE2, make contacts 2(1–RC0), to operate relays 2–TE0 and 2–TE2, respectively. The sixth digit dialed in a 6 and this is registered in the charge rater by means of a circuit comprising ground in the sender, sender make contacts 2–TF2 and 2–TF4, respectively, closed make contacts 2(1–RC0), to operate relays 2–TF2 and 2–TF4, respectively. Thus, the first six digits dialed by the calling subscriber, namely 212–WA6, are now stored in the six relay groups comprising the terminating code register of FIG. 2.

The remaining data transmitted from the sender to the charge rater at this time is the originating zone of the calling office. It has been assumed in connection with our hypothetical call that the calling office is located in originating zone 25. This information is transmitted to the originating zone register of FIG. 2 which can register originating zone designations from 00 to 49 with the tens digit of the designation being registered in a one-out-of-five code form and with the units digit being registered in a two-out-of-five code form. The tens digit of 2 of the originating zone designation is transmitted to the charge rater by the circuit comprising ground in the sender, through make contacts 2–OZT2 in the sender, closed contacts 2(1–RC0), to operate relay 2–OZT2. The units digit of 5 of the originating zone designation is transmitted to the charge rater in two-out-of-five code form by the circuits comprising ground in the sender, make contacts 2–OZU1 and 2–OZU4, respectively, in the sender, make contacts 2(1–RC0), to operate relays 2–OZU1 and 2–OZU4, respectively.

Figure 2:
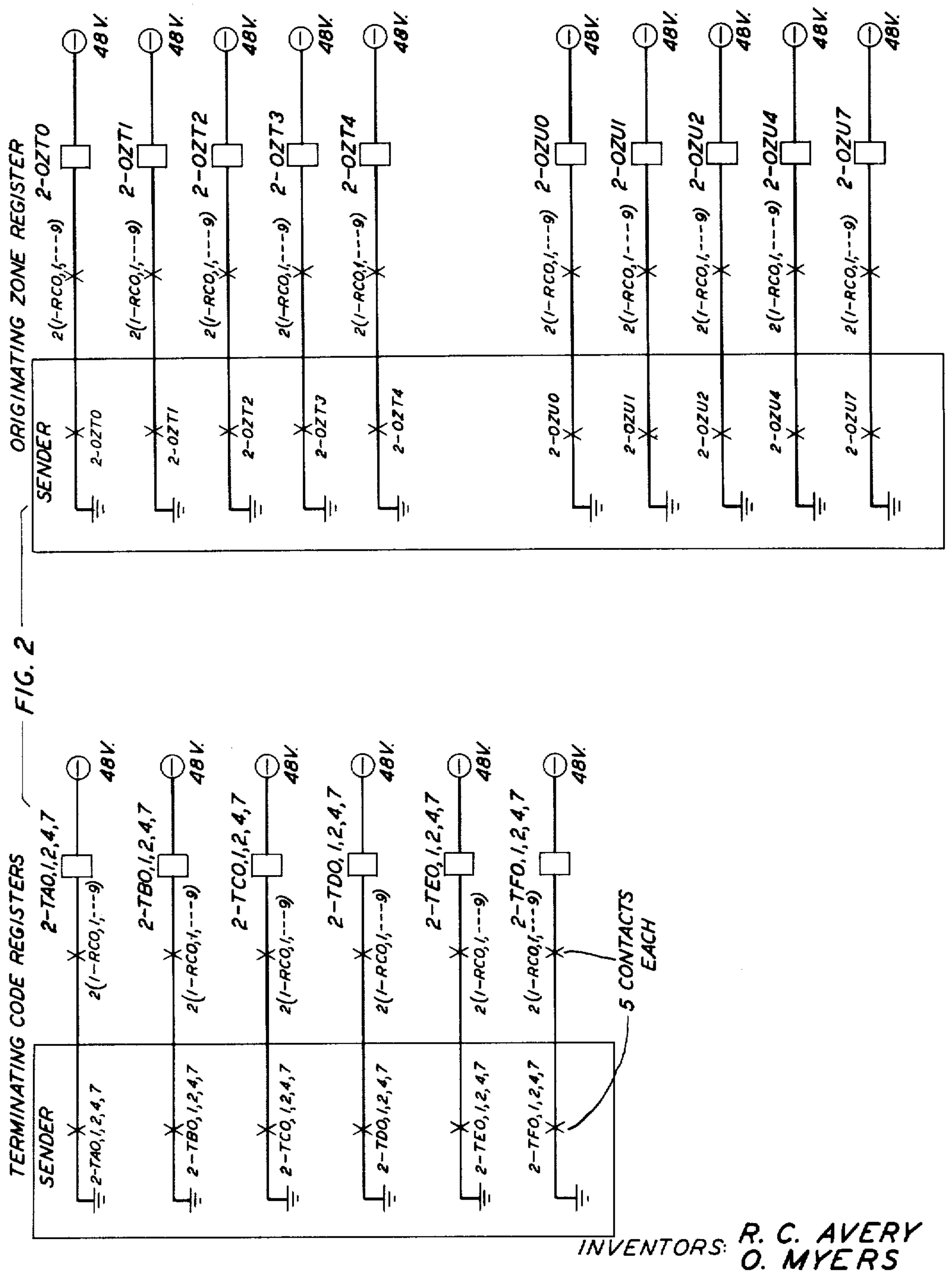

At this point, the sender has effected the necessary circuit action on FIG. 2 to register 212–WA6 in the terminating code register and 25 in the originating zone register.

*2.02 Input data check circuits*

Figure 3:
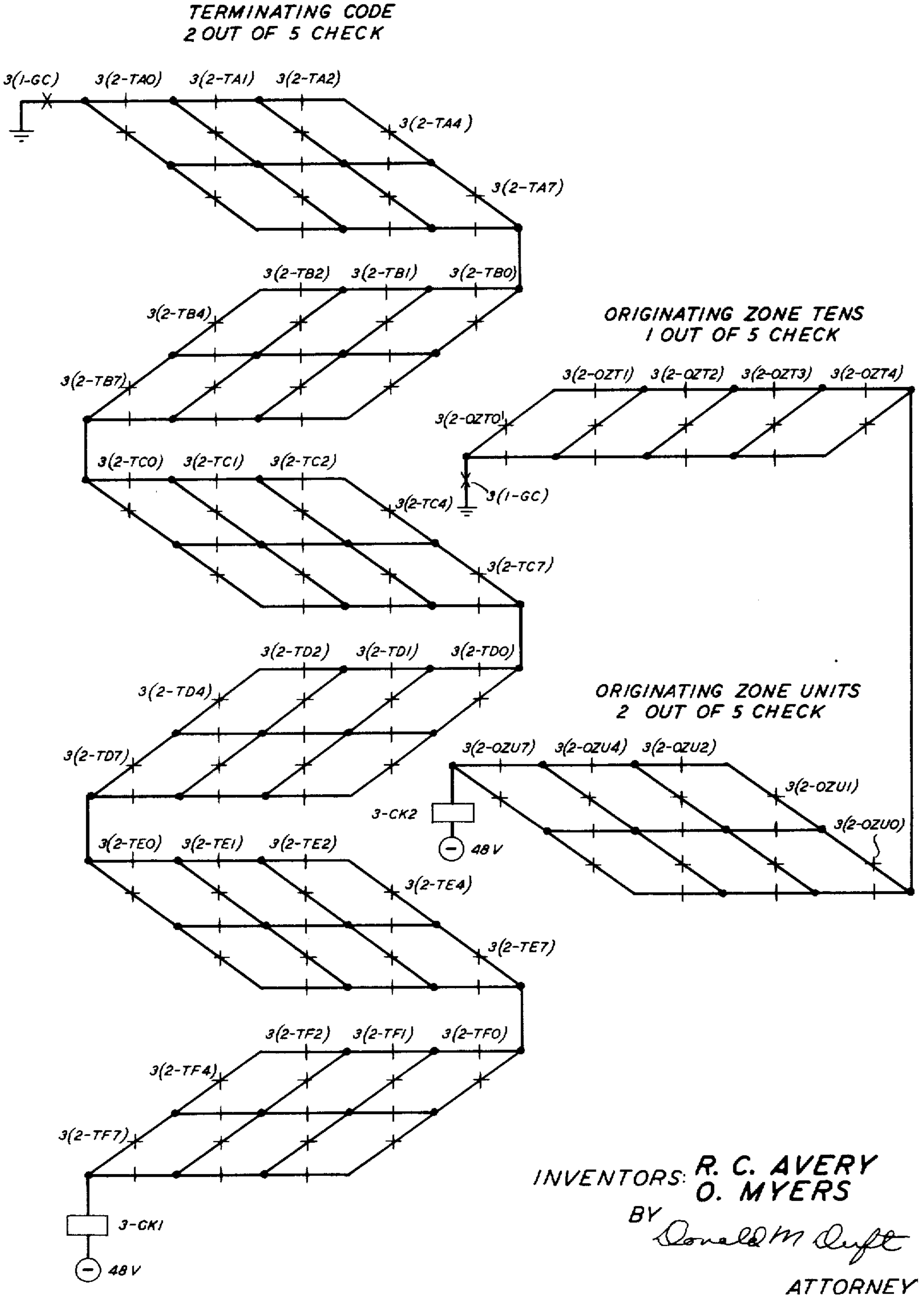

The circuits shown on FIG. 3 comprise a check circuit which ascertains whether the register relays of FIG. 2 are operated in the proper combinational code form. Functionally speaking, these circuits comprise a two-out-of-five logic circuit for each received digit of the terminating code and the units digit of the originating zone, and a one-out-of-five logic circuit for the tens digit of the originating zone. Logic circuits of this type are well known in the art and are operable to close a path therethrough only when the proper number of relays are operated.

Continuing with the call wherein a calling subscriber in originating zone 25 dials the number 212–WA6–1023, a path is closed from ground on the top left of FIG. 3, through make contacts 3(1–GC), make contacts 3(2–TA03, break contacts 3(2–TA1), make contacts 3(2–TA2), break contacts 3(2–TA4) and 3(2–TA7), make contacts 3(2–TB0) and 3(2–TB1), break contacts 3(2–TB2), 3(2–TB4) and 3(2–TB7), make contacts 3(2–TC0), break contacts 3(2–TC1), make contacts 3(2–TC2), break contacts 3(2–TC4) and 3(2–TC7), break contacts 3(2–TD0), 3(2–TD1), make contacts 3(2–TD), break contacts 3(2–TD4), make contacts 3(2–TD7), make contacts 3(2–TE0), break contacts 3(2–TE1), make contacts 3(2–TE2), break contacts 3(2–TE4) and 3(2–TE7), break contacts 3(2–TF0) and 3(2–TF1), make contacts 3(2–TF2) and 3(2–TF4), break contacts 3(2–TF7) to the winding of relay 3–CK1 to operate it.

Pausing for a moment to analyze the circuit just described, it may be seen that a path is closed through each of these symmetrical circuits only in the event that two, and only two, of the relays associated therewith are operated. Therefore, the closure of this circuit to operate relay 3–CK1 indicates that the relay groups comprising the terminating code register are operated in the proper combinational code form. The originating zone of 25 is stored in the originating zone register of FIG. 2 in a one-out-of-five code for the tens digit and in a two-out-of-five code for the units digits. Accordingly, a path to operate relay 3–CK2 may be traced on FIG. 3 from ground on make contacts 3(1–GC), break contacts 3(2–OZT0) and 3(2–OZT1), make contacts 3(2–OZT2), break contacts 3(2–OZT3) and 3(2–OZT4), break contacts 3(2–OZU0), make contacts 3(2–OZU1), break contacts 3(2–OZU2), make contacts 3(2–OZU4) and break contacts 3(2–OZU7) to the winding of relay 3–CK2.

The operation of relays 3–CK1 and 3–CK2 together manifests that data was transmitted to and received by the two register circuits of FIG. 2 in the proper combinational code form.

*2.03 Call classification*

Figure 4:
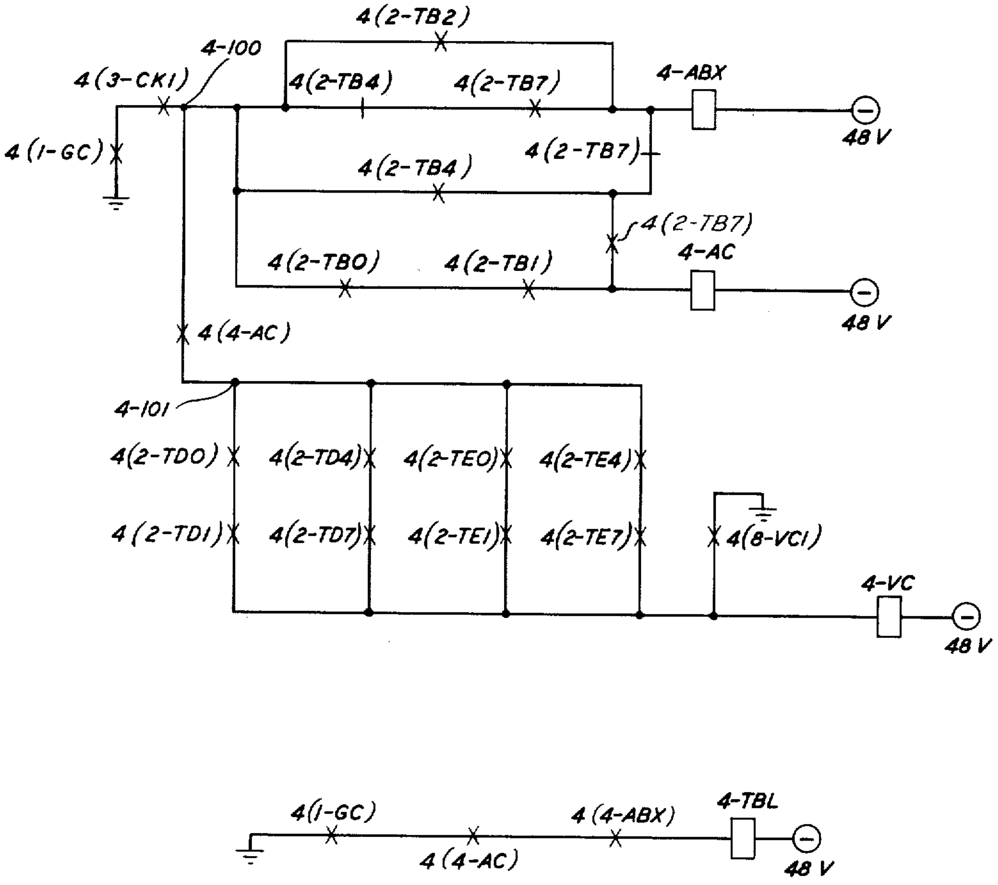

The circuit of FIG. 4 enables the charge rater to ascertain whether the data received from the sender represents a seven-digit call to a subscriber in the same national area or a 10-digit call to a subscriber in a different national area. This circuit also detects the dialing of an improper or vacant office code and also detects trouble conditions resulting in the simultaneous indication of both a seven-digit and a 10-digit call.

After the operation of relay 3–CK1, as already described, a path is closed on FIG. 4 from ground through make contacts 4(1–GC) and 4(3–CK1) to terminal 4–100. The ground on this terminal is then extended to one of relays 4–ABX or 4–AC in accordance with the information received by the terminating code registers of FIG. 2. A study of the circuit interconnecting terminal 4–100 with relays 4–ABX and 4–AC shows that relay 4–AC will be operated whenever the second digit dialed, the B digit, is a zero or a one. In this case, a path may be traced from terminal 4–100 through make contacts 4(2–TB0) and 4(2–TB1), to the winding of relay 4–AC for a B digit of one, and through make contacts 4(2–TB4) and 4(2–TB7) to the winding of relay 4–AC for a B digit of zero. Similarly, a path may be traced from terminal 4–100 to the winding of relay 4–ABX to operate it for any value of B digit other than zero or one. For example, if the B digit were a three, relays 2–TB1 and 2–TB2 would be operated, and therefore, a path would be closed from terminal 4–100 through make contacts 4(2–TB2) to the winding of relay 4–ABX.

It is desirable on area code calls to check that the subscriber did not mistakenly dial a restricted service code or another area code in place of the office code for the fourth, fifth and sixth digits. This function is accomplished by relay 4–VC and the contact network connecting it with terminal 4–100.

From an inspection of any telephone dial, it may be seen that the digits one and zero are not associated with any letters and therefore, these digits will never comprise the first two digits of any office code. Conversely, the dialing of either of these digits for the first two digits of an office code indicates either that a special service code (011, etc.) or a nonexistent code was dialed. Make contacts 4(4–AC) close upon the operation of relay 4–AC for an area code call and apply the ground on terminal 4–100 to terminal 4–101. If the subscriber mistakenly dials a zero or a one for the fourth digit, the D digit, in place of a permissible office code, the ground on terminal 4–101 will be extended through make contacts 4(2–TD0) and 4(2–TD1) or 4(2–TD4) and 4(2–TD7) to the winding of relay 4–VC. Similarly, if a zero or a one is dialed for the E digit, the fifth digit, in place of a permissible office code, the ground on terminal 4–101 will be extended through make contacts 4(2–TE0) and 4(2–TE1) or 4(2–TE4) and 4(2–TE7) to the winding of relay 4–VC to operate it. Relay 4–VC may also be operated upon the closure of make contacts 4(8–VC1) due to the dialing of a vacant area code. The operation of this circuit is discussed later. The operation of relay 4–VC closes a circuit on FIG. 16 from ground through make contact 16(4–VC) to supply a ground to lead VC to the sender notifying it that the caller has dialed an area code or a restricted service code in place of a permissible office code, or has dialed a vacant area code.

Figure 10:
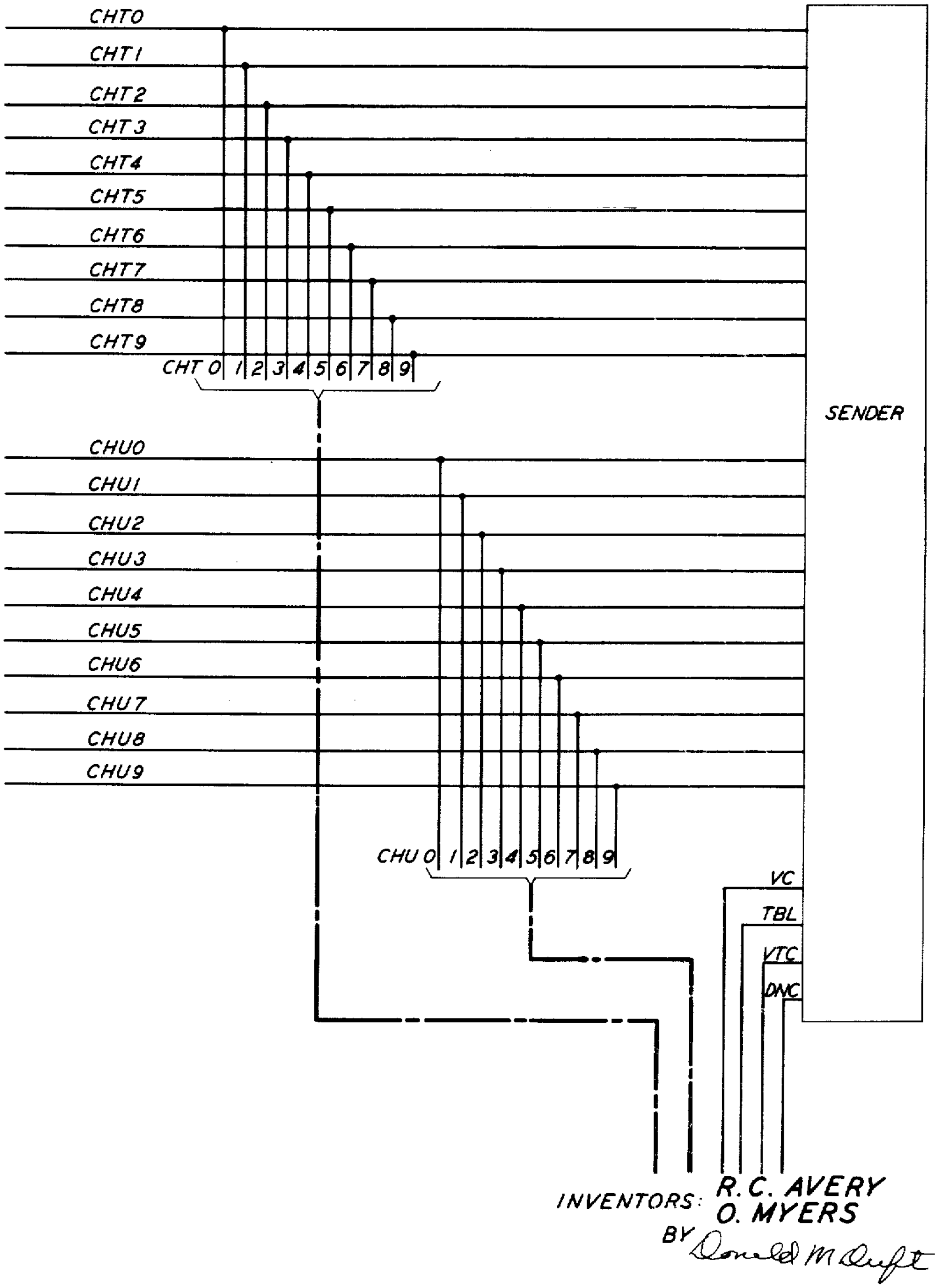

The contact network interconnected between terminal 4–100 and relays 4–ABX and 4–AC comprises two mutually exclusive circuits in that a path cannot be closed simultaneously to operate both relays since relay 4–AC operates for B digits of zero and one while 4–ABX operates for B digits of two through nine. Obviously, the operation of both of these relays simultaneously would represent a trouble condition. This trouble is manifested by relay 4–TBL which operates from ground through make contacts 4(1–GC), 4(4–AC) and 4(4–ABX). The operation of this relay closes a path on FIG. 16 from ground through make contacts 16(4–TBL) to the TBL lead to the sender shown diagrammatically on FIG. 10. The ground on this conductor may then effect whatever suitable circuit actions it may be desired to have the sender initiate in connection with the trouble indication.

It has been assumed in connection with the call described herein that the calling party dialed 212–WA6–1023. A path is now closed on FIG. 4 to operate relay 4–AC from ground, through make contacts 4(1–GC), 4(3–CK1), 4(2–TB0) and 4(2–TB1) to the winding of relay 4–AC.

*2.04 Terminating area translation*

Figure 8:
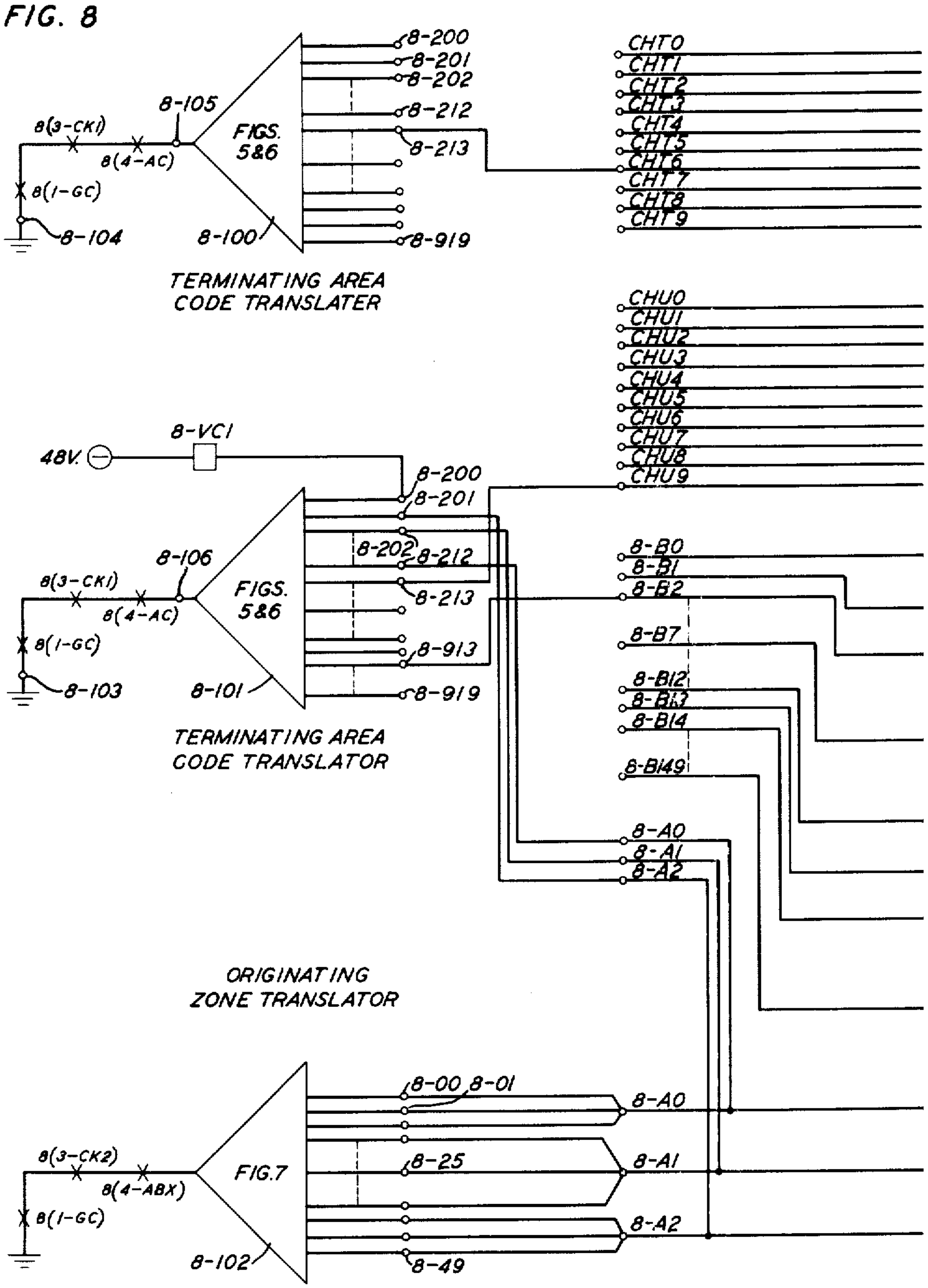
Figure 9:
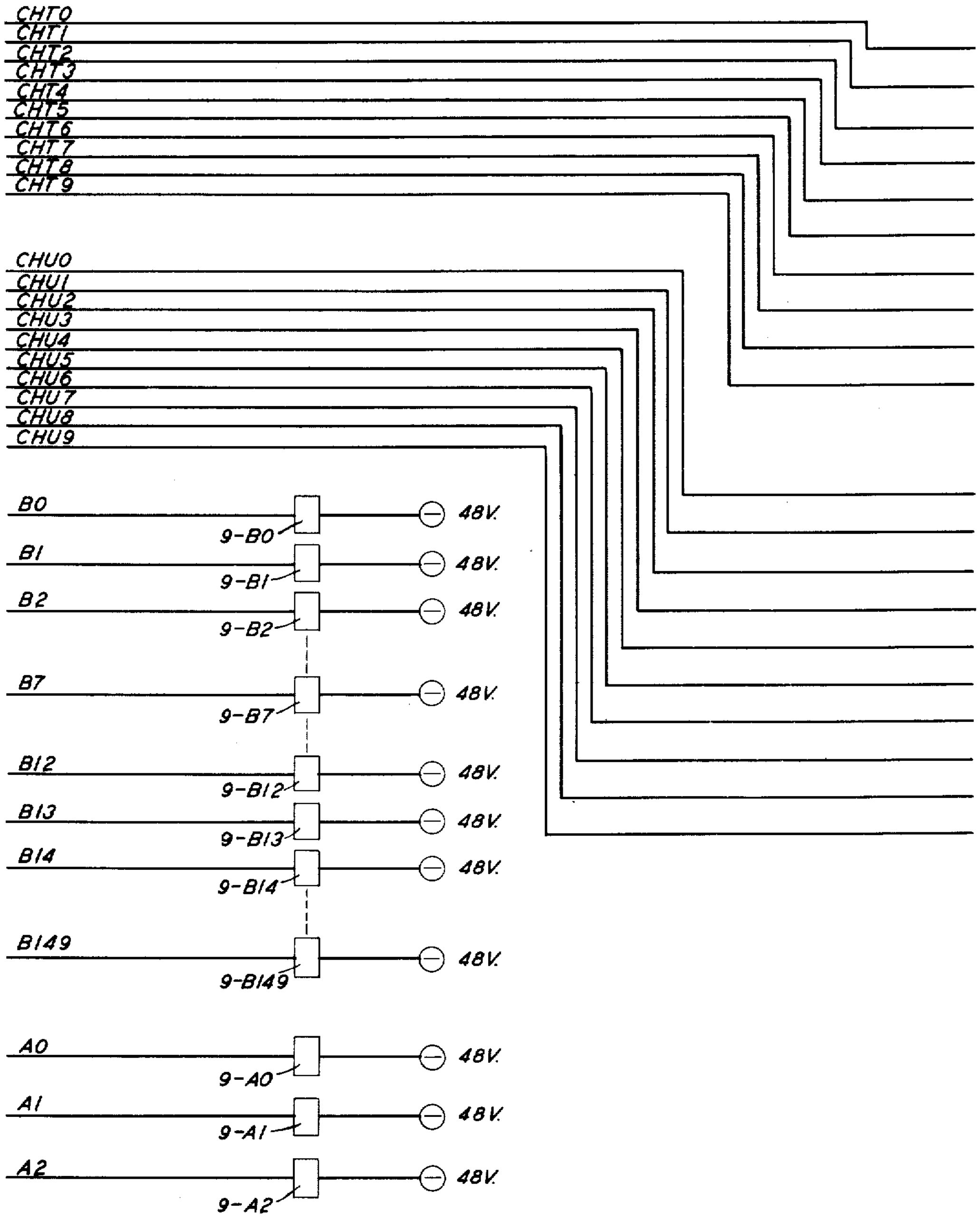

The circuits shown on FIGS. 8 and 9 translate the three-digit area codes (for 10-digit calls) and the two-digit originating zone numbers (for seven-digit calls) to provide an indication of the particular area to which each call is directed. The terminating area is the same as the originating area for class A calls and therefore, since each originating zone number is unique to a particular originating class A area, it also indicates the terminating class A area for seven-digit calls. Recalling that the digits 212–WA6–1023 were dialed for the hypothetical call currently being described, a path is closed on FIG. 8 from ground on terminals 8–104 and 8–103, through make contacts 8(1–GC), 8(3–CK1) and 8(4–AC) to the input of the terminating code translators 8–100 and 8–101. The circuit details of these translators are shown on FIGS. 5 and 6. Functionally speaking, each translator extends the ground appearing on its input to the particular output terminal representing the three-digit area code registered by the circuits of FIG. 2. These output terminals are numbered on FIG. 8 so as to correspond with the particular area codes represented thereby. For example, since the area code 212 was dialed for our hypothetical call, the ground on the input of the translators is extended therethrough to the output terminal 8–212 of each translator.

Figure 5:
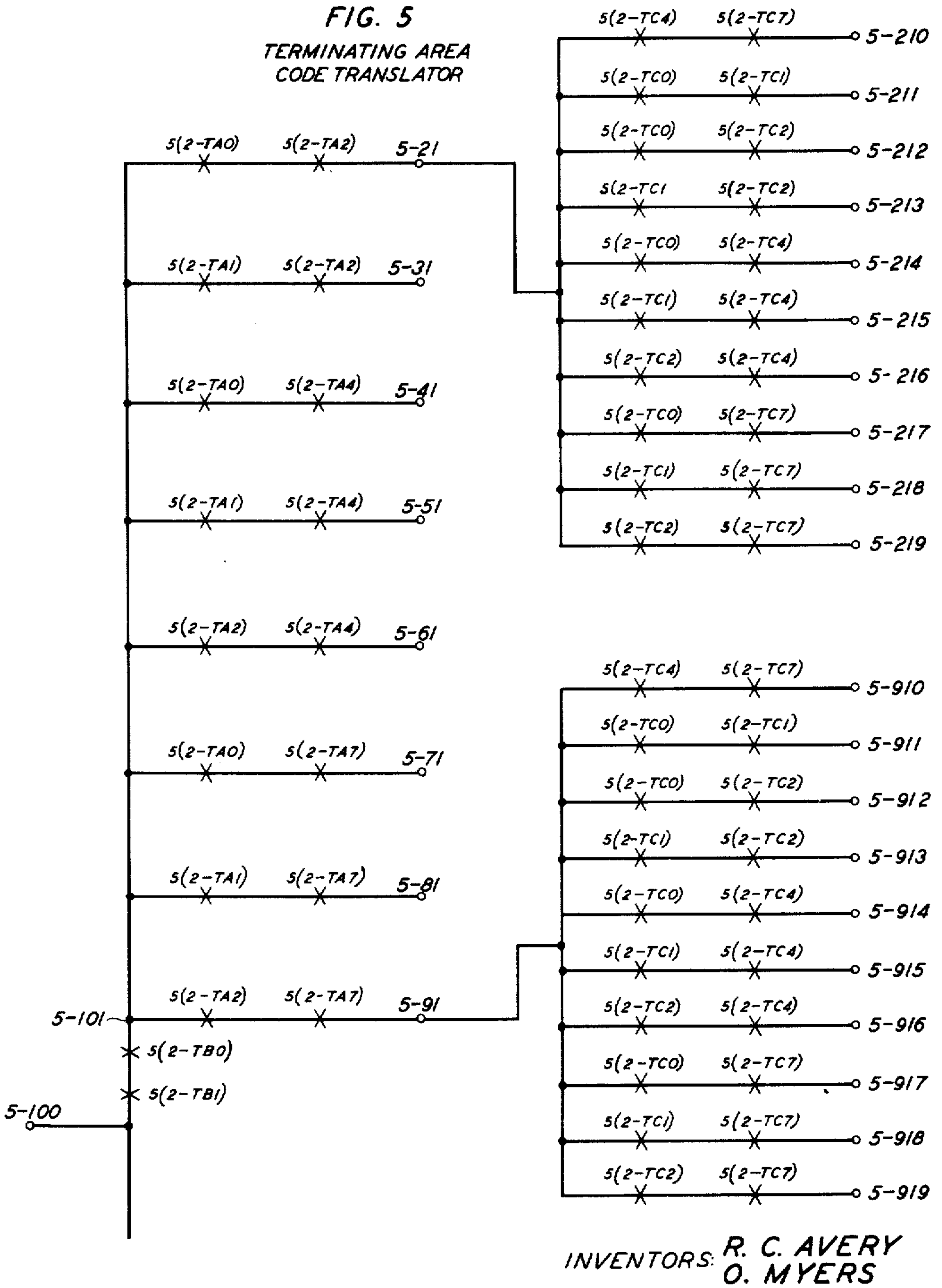
Figure 6:
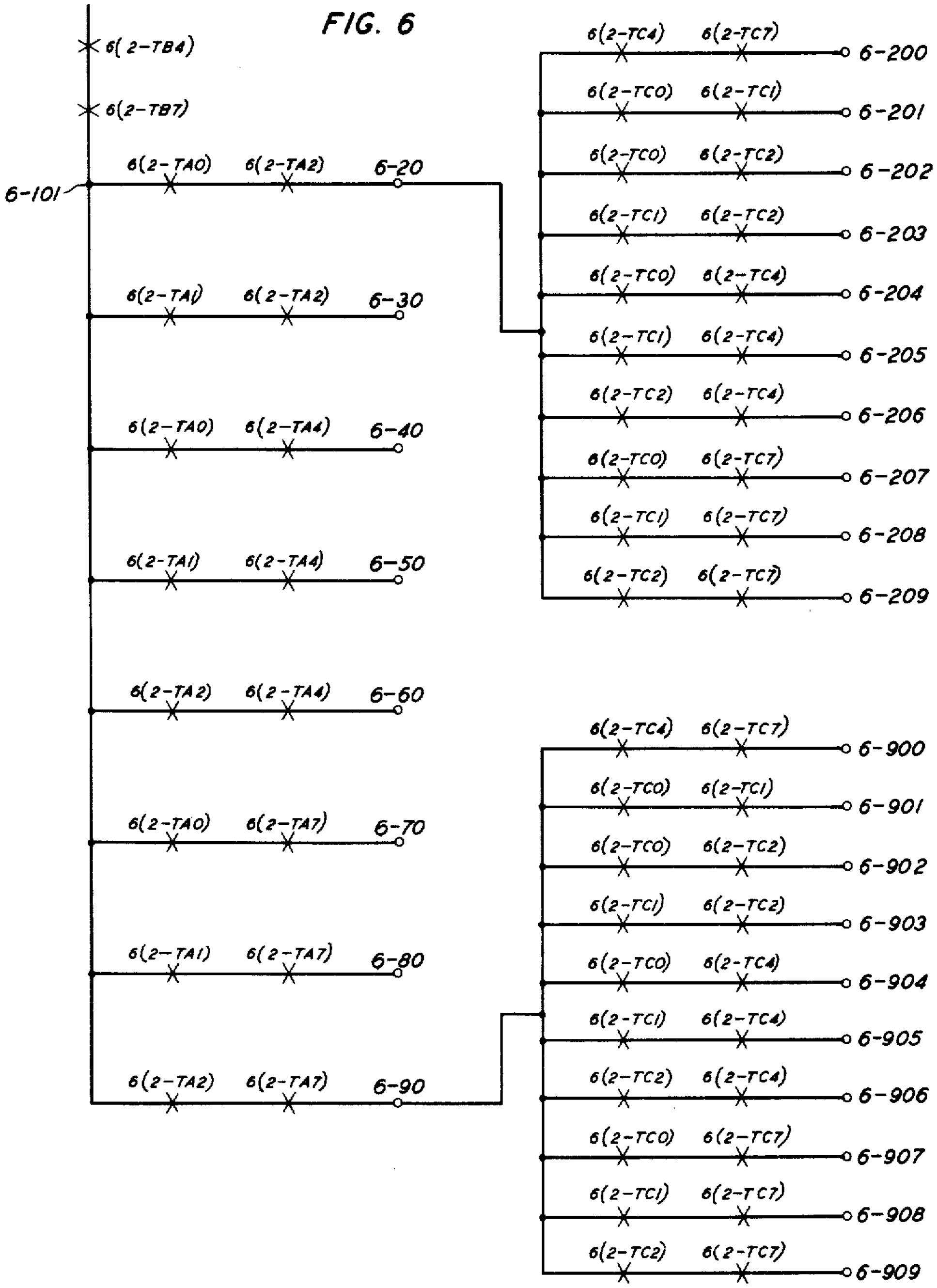

Referring to FIGS. 5 and 6 for the circuit details of translators 8–100 and 8–101, it may be seen that each translator is functionally divided into two parts with the contact network on FIG. 5 providing a translation for the area codes having a B digit of one while the contact network of FIG. 6 provides a translation for all area codes having a B digit of zero. A ground on terminal 8–105 or 8–106 (from contacts 8(1–GC), 8(3–CK1), 8(4–AC) as already described) which corresponds to input terminal 5–100 is extended through make contacts 5(2–TB1) and 5(2–TB0) to terminal 5–101 for area codes having a B digit of one and through contacts 6(2–TB4) and 6(2–TB7) to terminal 6–101 for area codes having a B digit of zero. Next, the ground on either terminal 5–101 or 6–101 is extended through the particular pair of contacts which represent the A digit of the terminating area code. The terminating area code for our hypothetical call is 212 and, therefore, a path may now be traced on FIG. 5 from ground on terminal 5–100, through make contacts 5(2–TB1) and 5(2–TB0), terminal 5–101, make contacts 5(2–TA0) and 5(2–TA2) to terminal 5–21. Each of the terminals on FIGS. 5 and 6, such as 5–21 through 5–91 and 6–20 through 6–90, represents a translation of the first two digits of the area code, and is connected to ten sets of contacts associated with the C digit relays which translate the C digit of the area code for each combination of A and B digits.

Since the area code for our hypothetical call is 212, the ground on terminal 5–21 is extended through contacts 5(2–TC0) and 5(2–TC2) to terminal 5–212 which represents a complete translation for area code 212. Similarly, if the terminating area code had a B digit of zero rather than one, the translation therefor would appear on one of the output terminals of FIG. 6 such as, for example, 6–201 for a terminating area code of 201.

In summary, the output terminals of translators 8–100 and 8–101 provide unique output indications for each of the 152 possible area codes (A digits 2 through 9, B digits 0 and 1, C digits 0 through 9, and excluding 211, 311 . . . 911).

Translator 8–100 is used only on class C calls as later described. Translator 8–101 is used on ten-digit class A calls and on all class B and C calls. It has been described how there will be a maximum of three class A areas for any particular installation. The three output terminals of translator 8–101 which represent the three class A terminating areas are selectively cross-connected to terminals 8–A0, 8–A1 and 8–A2 to operate one of relays 9–A0, 9–A1 and 9–A2. The output terminals of translator 8–101 which represent the class B areas are selectively cross-connected to terminals 8–B0 through 8–B149 to operate one of relays 9–B0 through 9–B149.

Let it be assumed in connection with our hypothetical call that area 212 represents area zero for class A calls. This being the case, the ground on output terminal 8–212 of translator 8–101 is extended to terminal 8–A0 and then to the winding of relay 9–A0 to operate it. The operation of relay 9–A0 completes a path of FIG. 22 to operate relay 22–CKA from ground on terminal 22–102, through make contacts 22(1–GC), 22(9–A0), break contacts 22(9–A1) and 22(9–A2) to the winding of relay 22–CKA. This contact arrangement comprises a one-out-of-three symmetric and operates relay 22–CKA as a check to insure that one, and only one, of relays 9–A0, 9–A1 and 9–A2 is operated.

The discussion to date has shown how relay 9–A0 is operated for a 10-digit class A call in which an area code was dialed. As has been shown, translator 8–101 is involved in 10-digit class A calls upon the closure of make contacts 8(4–AC) in its energizing path. The originating zone translator 8–102 is not operative at this time since relay 4–ABX operates only for seven-digit calls and, therefore, the energizing path for this translator remains open at contacts 8(4–ABX). The originating zone translator 8–102 is used for seven-digit class A calls in which case the energizing circuits for translator 8–100 and 8–101 remain open at contacts 8(4–AC) since relay 4–AC operates only for 10-digit calls.

It has been previously assumed that area 212 (the New York city area) also represents area A0 for class A calls for the hypothetical installation described herein. In order to illustrate the function of the originating zone translator 8–102, let it be assumed for a moment that a subscriber in area 212 calls a distant subscriber in the same area. Since the call is to be completed within the same national area, only seven digits are dialed. The terminating code register of FIG. 2 will receive the three terminating office code digits plus the first three numericals of the called station while the originating zone registers will receive the originating zone information as before. Let it be assumed that the calling subscriber is in originating zone 01. A circuit now may be traced from ground on FIG. 8, through makes contacts 8(1–GC), make contacts 8(3–CK2), 8(4–ABX) which close for seven digit calls, through the originating zone translator 8–102 which provides an output indication unique to zone 01 by applying ground to its output terminal 8–01. This terminal is cross-connected to terminal 8–A0. Therefore, the ground on terminal 8–01 is extended to terminal 8–A0 and from there to the winding of relay 9–A0 to operate it.

Figure 7:
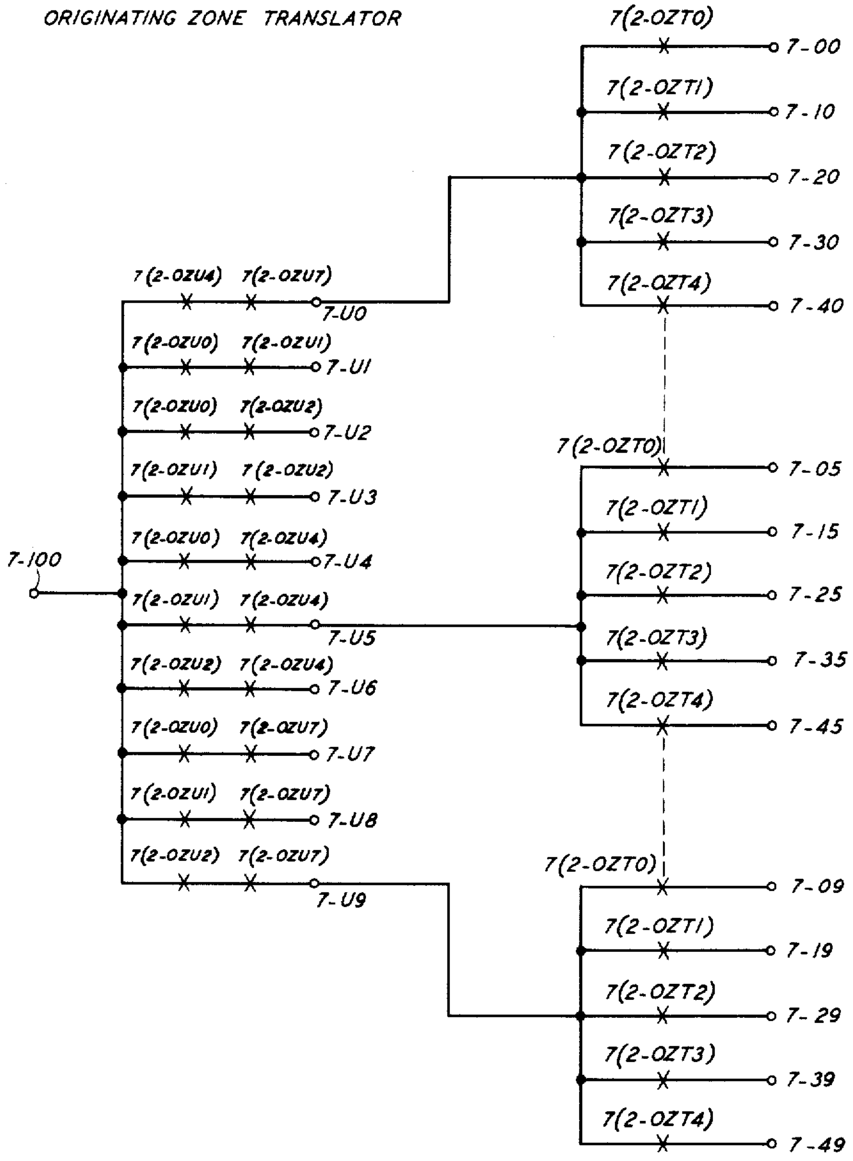

The circuit details of the originating zone translator 8–102 are shown on FIG. 7 and the operation of this circuit should be self-evident. Briefly, a ground appearing on input terminal 7–100 is extended through contacts on the relays of FIG. 2 which register the originating zone units digit to one of terminals 7–U0 through 7–U9. Each of these terminals, in turn, is connected to five contacts of the relays on FIG. 2 which register the tens digit of the originating zone information. Thus, a ground on terminal 7–100 is extended to the particular one of terminals 7–U0 through 7–U9 depending upon the units digit of the originating zone and, from there, to one of the output terminals, such as 7–00, 7–10, 7–05, 7–15, etc., in accordance with the value of the tens digit of the originating zone. For an originating zone of 01, the ground on terminal 7–100 is extended through make contacts 7(2–OZU0), 7(2–OZU1), terminal 7–U1, make contacts 7(2–OZT0) to output terminal 7–01 (not shown).

In summary so far on class A calls, the particular one of relays 9–A0, 9–A1 and 9–A2 is operated which represents the terminating class A area. This relay is operated by an output from the terminating area code translator 8–101 for 10-digit calls and by an ouptut from the originating zone translator 8–102 for seven-digit calls.

The output terminals of translator 8–101 associated with vacant national area codes are connected to relay 8–VC1. This relay is operated whenever a vacant area code is dialed and, in turn, closes its contacts 4(8–VC1) to operate relay 4–VC. The operation of this relay than transmits a vacant code indication to the sender in the same manner as previously described.

*2.05 Terminating office code translation*

Figure 23:
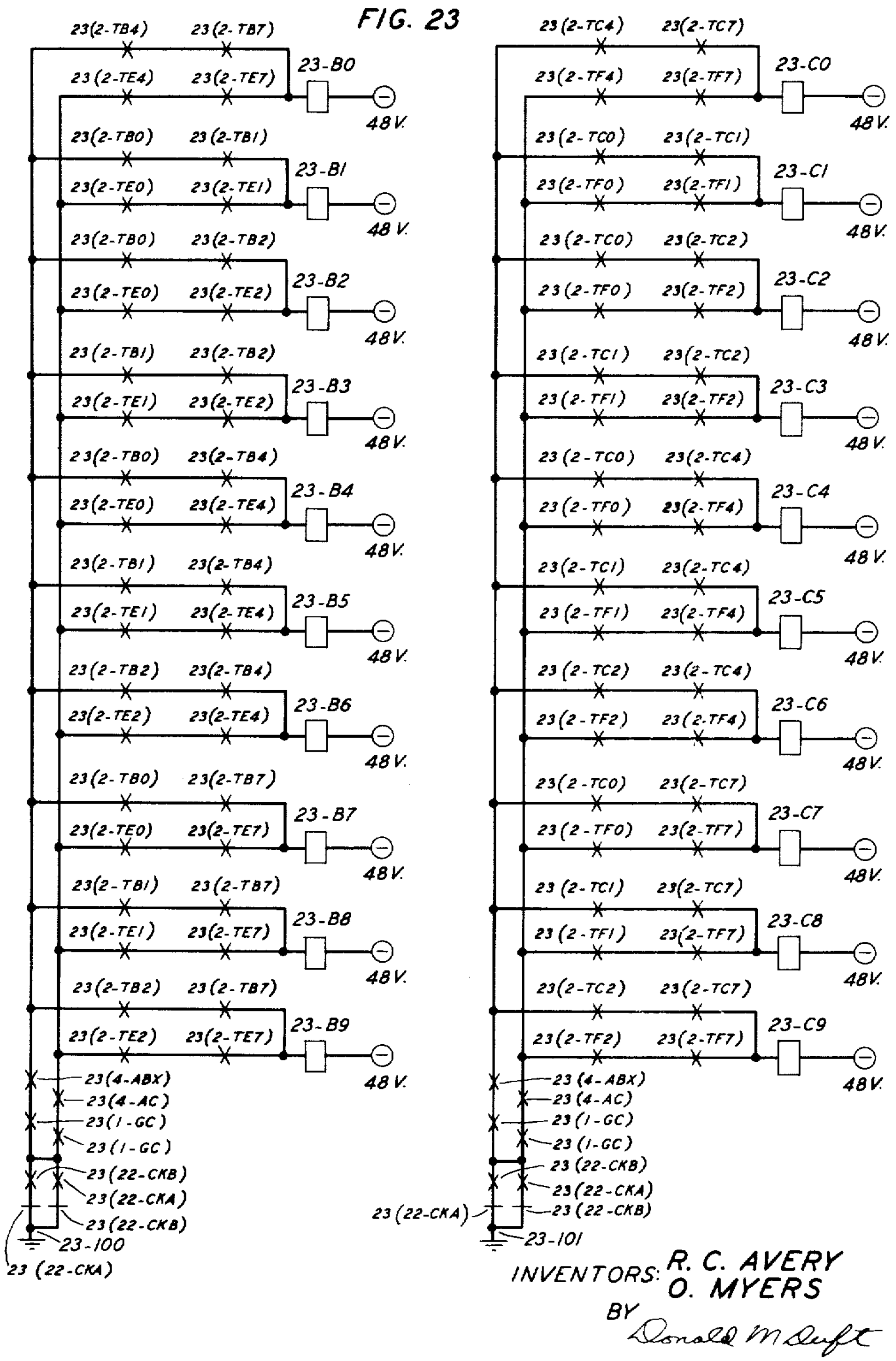
Figure 24:
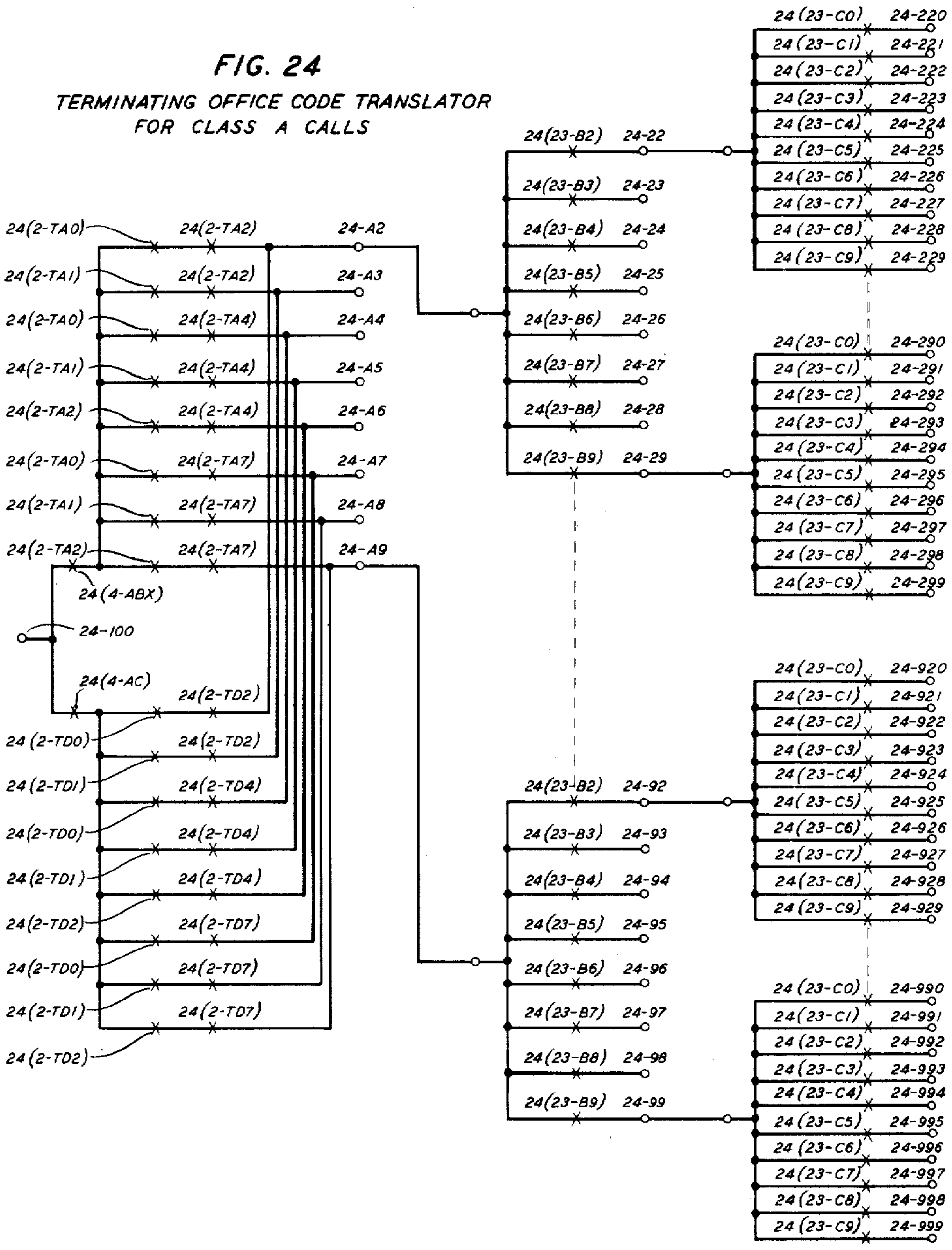

The circuits shown on FIGS. 23 and 24 together provide a translation of the terminating office code which is registered by the circuits of FIG. 2 as the A, B and C digits for seven-digit calls and the D, E and F digits for 10-digit calls. Referring to FIG. 23, the left hand column of relays 23–B0 through 23–B9, together with the contacts in their operating paths, register in decimal form the second digit of the office code. This digit will be the fifth digit dialed, the E digit, on 10-digit area code calls and will be the second digit dialed, the B digit, on seven-digit calls. Accordingly, relays 23–B0 through 23–B9 are operated either by contacts of relays 2–TB– for seven digit calls or by contacts of relays 2–TE– for 10-digit calls.

In a similar manner, the right hand column of relays, 23–C0 through 23–C9, is operable to register the third digit of the terminating office code. Similarly, these relays are operated either by the contacts of relays 2–TC– for seven-digit calls or 2–TF– for 10-digit calls.

The office code for the 10-digit hypothetical call currently being described is WA6 which represents the digits 926. A path on FIG. 23 now may be traced from ground on terminal 23–100, through break contacts 23(22–CKB), make contacts 23(22–CKA), 23(1–GC), 23(4–AC), 23(2–TE0) and 23(2–TE2) to the winding of relay 23–B2 to operate it. A circuit to operate relay 23–C6 may be traced from ground on terminal 23–101, through break contacts 23(22–CKB), make contacts 23(22–CKA), 23(1–GC), 23(4–AC), 23(2–TF2) and 23(2–TF4) to the winding of relay 23–C6.

The circuit shown on FIG. 24 comprises a three step translator for the three digits of the terminating office code. The top left group of contacts translates the first digit of the terminating office code for seven-digit calls while the lower left group translates the first digit of the terminating office code for 10-digit calls. The translated output from either of these contact groups is applied to one of terminals 24–A2 through 24–A9 in accordance with the value of the A digit. The terminating office code for the call now being described is WA6(926) and, therefore, a path may be traced from terminal 24–100 through make contacts 24(4–AC), make contacts 24(2–TD2) and 24(2–TD7) to terminal 24–A9, thereby manifesting that the first digit of the office code is a nine.

Each of terminals 24–A2 through 24–A9 is connected to a group of eight contacts of relays 23–B2 through 23–B9 in order to provide a translation for the B digit (the second digit) of the terminating office code. It has previously been described how relay 23–B2 is operated at this time to represent the B digit of 2 for the office code 926. Therefore, the previously described path terminating on terminal 24–A9 may be extended through make contacts 24(23–B2) to terminal 24–92 which provides a translation for the first two digits of the office code 926.

Each output terminal, such as 24–92, is connected to a group of ten contacts on relays 23–C0 through 23–C9 which provide a translation for the C digit of the office code. It has previously been described how relay 23–C6 is operated at this time to represent the third digit of the office code 926. Therefore, the previously described path terminating on terminal 24–92 may be extended through make contacts 24(23–C6) to terminal 24–926 which represents a complete translation for the office code 926.

Figure 34:
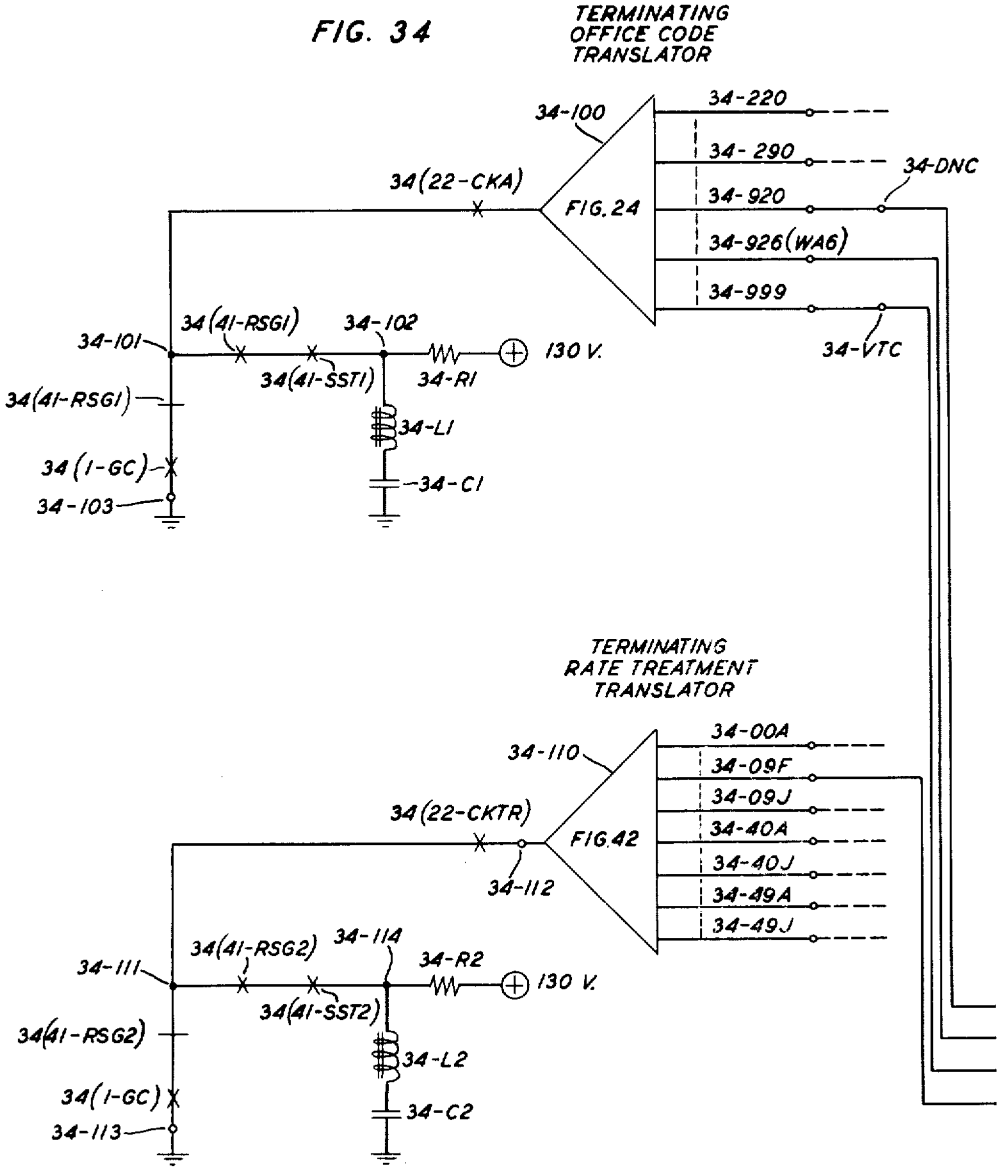

The terminating office code translator shown in detail on FIG. 24 is represented in diagrammatic form by the triangle 34–100 on FIG. 34. It has previously been described how relay 22–CKA operated. A path may now me traced on FIG. 34 from ground on terminal 34–103, through make contacts 34(1–GC), break contacts 34(41–RSG1), terminal 34–101, make contacts 34(22–CKA), through the terminating office code translator 34–100 to its output terminal 34–926 which represents a translation for office code WA6 in the manner already described.

*2.06 The coil field—first translation*

The output terminals of translator 34–100 (and also translator 34–110 which is described later) are connected to jumper wires which are threaded through a coil field on FIGS. 35 through 40 comprising six groups of five coils each. The jumper wires and the coil field together comprise a translator for first deriving and then recording certain information into either the register circuit of FIGS. 25 and 26 or the register circuit of FIG. 33. Each jumper represents certain information, such as a particular terminating office code, and is threaded through selected ones of the coils in such a manner that a subsequent surge of current through the jumper effects the derivation of desired information pertaining thereto. The output information for each translation is manifested by an induced potential across the output winding of every coil through which is threaded the jumper representing the input information for the translation. Thus, the jumper connected to terminal 34–926 is selectively threaded through the coil field so that a surge of current therethrough effects the derivation of the desired information regarding office code 926 (WA6). This information is manifested by an induced potential across the output windings of the coils through which this jumper is threaded. The induced potentials fire associated cold cathode tubes which, in turn, effect the entry of a portion of the derived output information into either the register circuit of FIGS. 25 and 26 or the circuit of FIG. 33 as described hereinafter.

Each coil on FIGS. 35 through 40 is individually associated with a cold cathode tube and has an output winding connected between the start anode of its tube and a source of positive potential. For example, coil 35–A0 has its output winding connected between the junction of a voltage divider comprising resistors 35–R1 and 35–R2 and the start anode 2 of its tube 35–T0 which has a cathode 1, a start anode 2 and a main anode 3. The remaining tubes and coils on FIGS. 35 through 40 are similarly connected. The positive potential normally applied to the start anode of each tube by the output winding of its coil is insufficient, without more, to effect further circuit action. However, a heavy surge of current through a jumper, such as the one connected to terminal 34–926, induces a potential in the output winding of every coil through which it is threaded.

This induced voltage together with the potential normally applied to the start anodes is sufficient to effect a discharge between the start anode and the cathode of each tube associated with an energized coil. As is typical in cold cathode tubes, this discharge may be transferred to the main anode by the application of a sufficiently high potential thereto. The main anodes of the tubes are connectable to register relays to operate them in accordance with the derived data represented by the energized tubes.

The previously described ground on terminal 34–926 is applied to its jumper which is selectively threaded through coils 35–A4, 35–A7, 36–B2, 36–B7, 37–C0, 37–C4, 38–D4, 38–D7, 39–E0, 39–E4, 40–F2, and 40–F7 to terminal 41–100 and from there to the winding of relay 41–RSG1. This ground operates relay 41–RSG1 which closes a holding path for itself to ground through make contacts 41(41–RSG1) and 41(1–GC). The operation of relay 41–RSG1 closes a path to operate relay 41–SST1 from ground, through make contacts 41(1–GC) and 41(41–RSG1), to the winding of relay 41–SST1.

Figure 41:
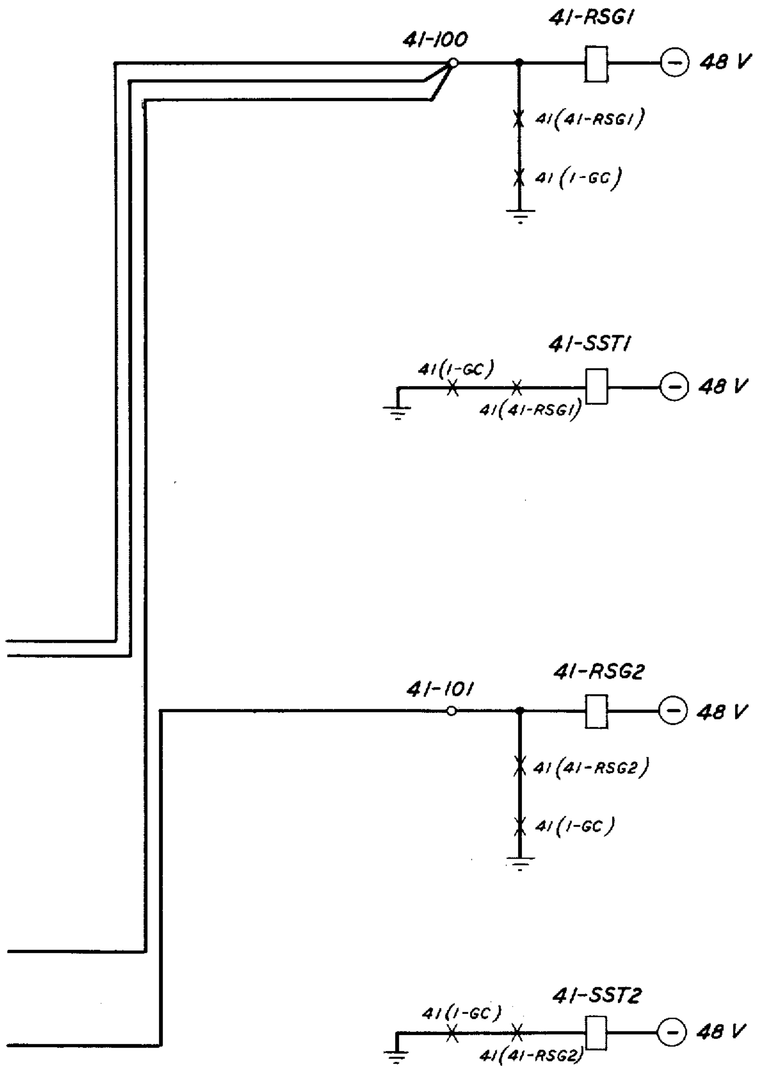

Condenser 34–C1 is normally charged to a 130-volt potential through inductance 34–L1 and resistor 34–R1. The operation of relay 41–RSG1 disconnects the ground supplied to terminal 34–101 by break contacts 34(41–RSG1). The combined operation of relays 41–RSG1 and 41–SST1 completes a path to discharge condenser 34–C1 to ground through inductance 34–L1, terminal 34–102, make contacts 34(41–SST1) and 34(41–RSG1), terminal 34–101, make contacts 34(22–CKA), through the previously described translator 34–100 to its output terminal 34–926, over the jumper wire connected to this terminal, to ground on FIG. 41 through make contacts 41(41–RSG1) and 41(1–GC). Condenser 34–C1 rapidly discharges over this path and, in doing so, produces a heavy surge of current in this jumper. This, in turn, induces a sufficient voltage across the output windings of the coils through which it is threaded to break down the start gaps of the tubes associated therewith. Thus, tubes 35–T4, 35–T7, 36–T2, 36–T7, 37–T0, 37–T4, 38–T4, 38–T7, 39–T0, 39–T4, 40–T2 and 40–T7 now have a sufficient voltage applied to their start gaps to effect a discharge between their start anodes and their cathodes.

Figure 25:
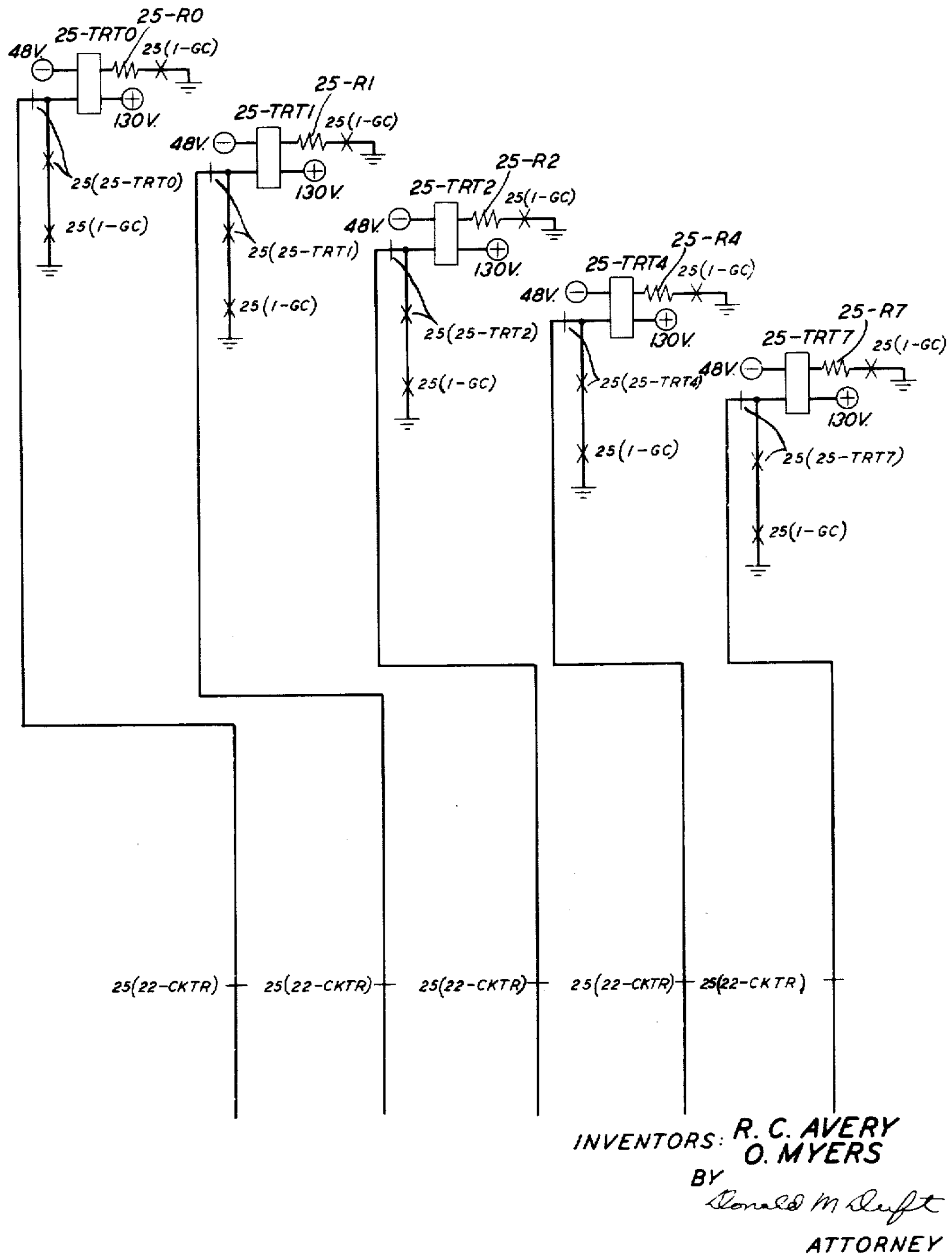
Figure 26:
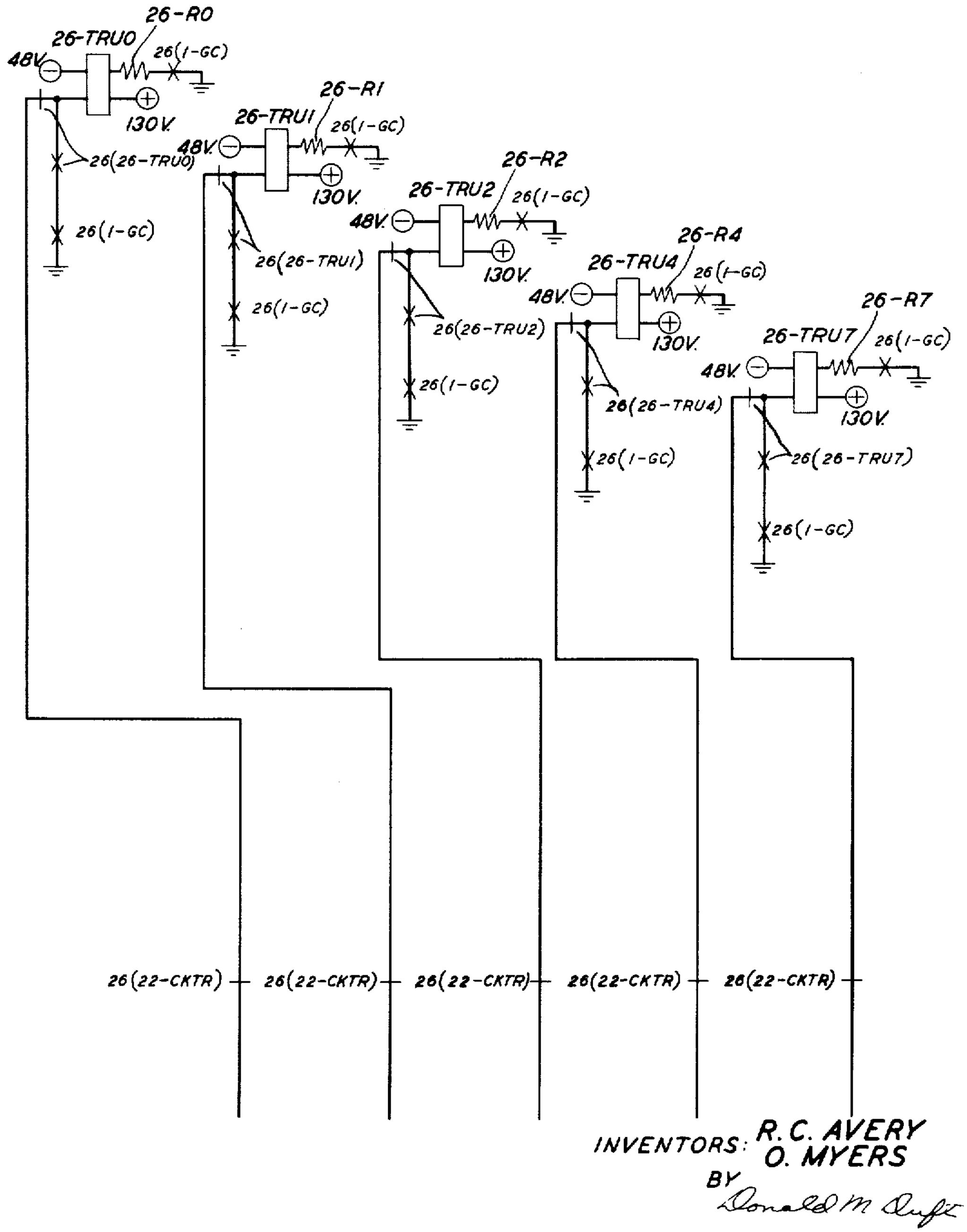
Figure 27:
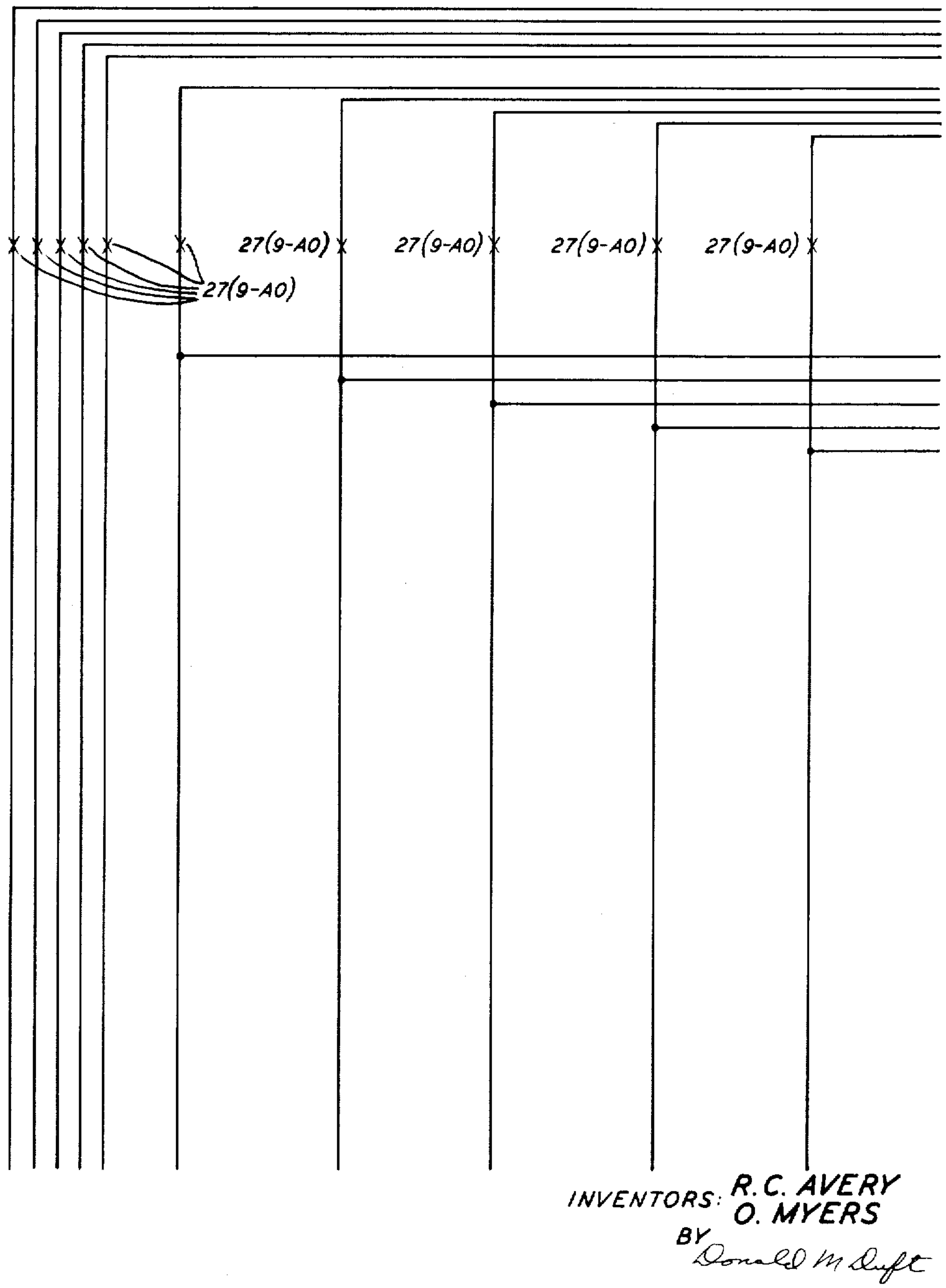
Figure 28:
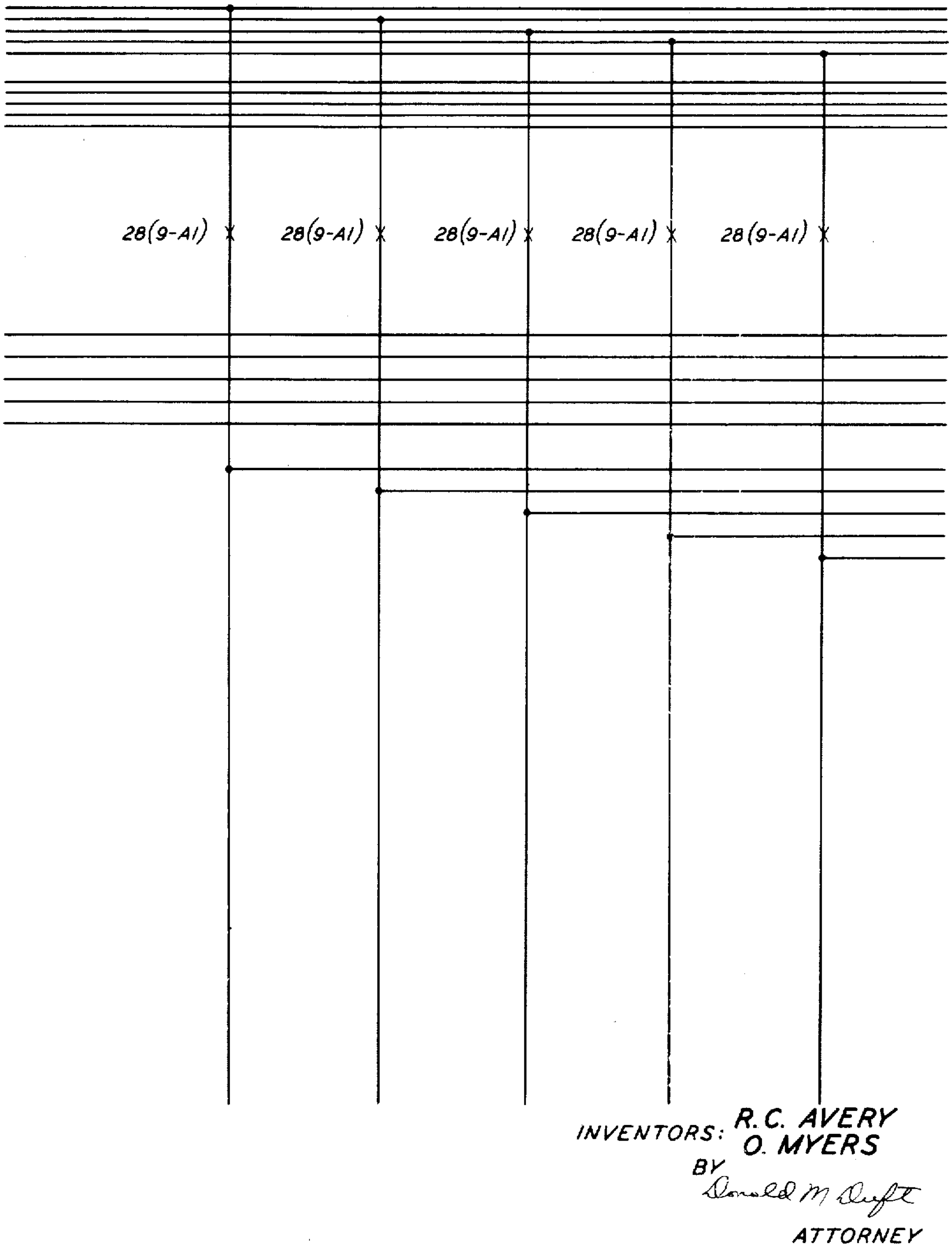
Figure 29:
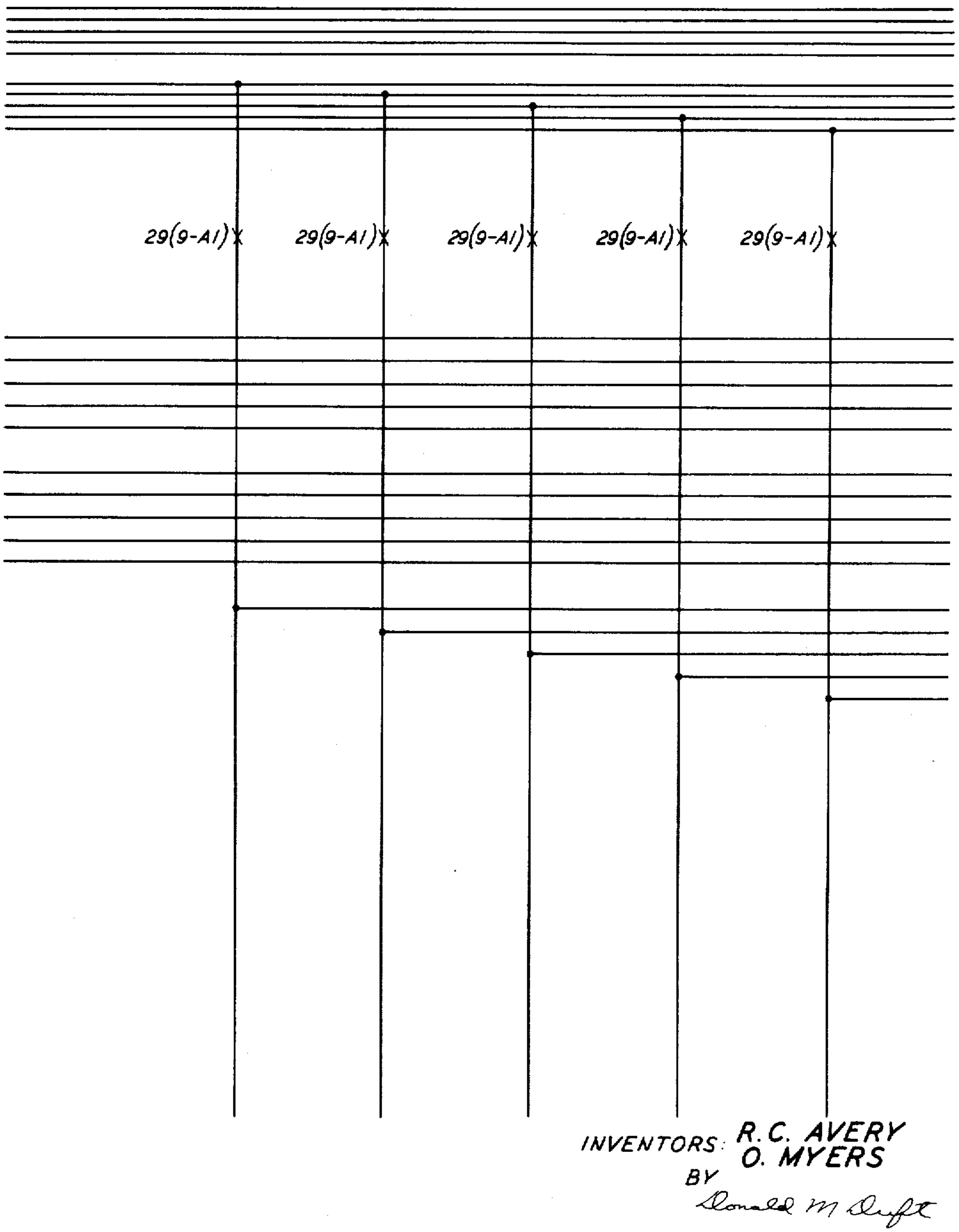
Figure 30:
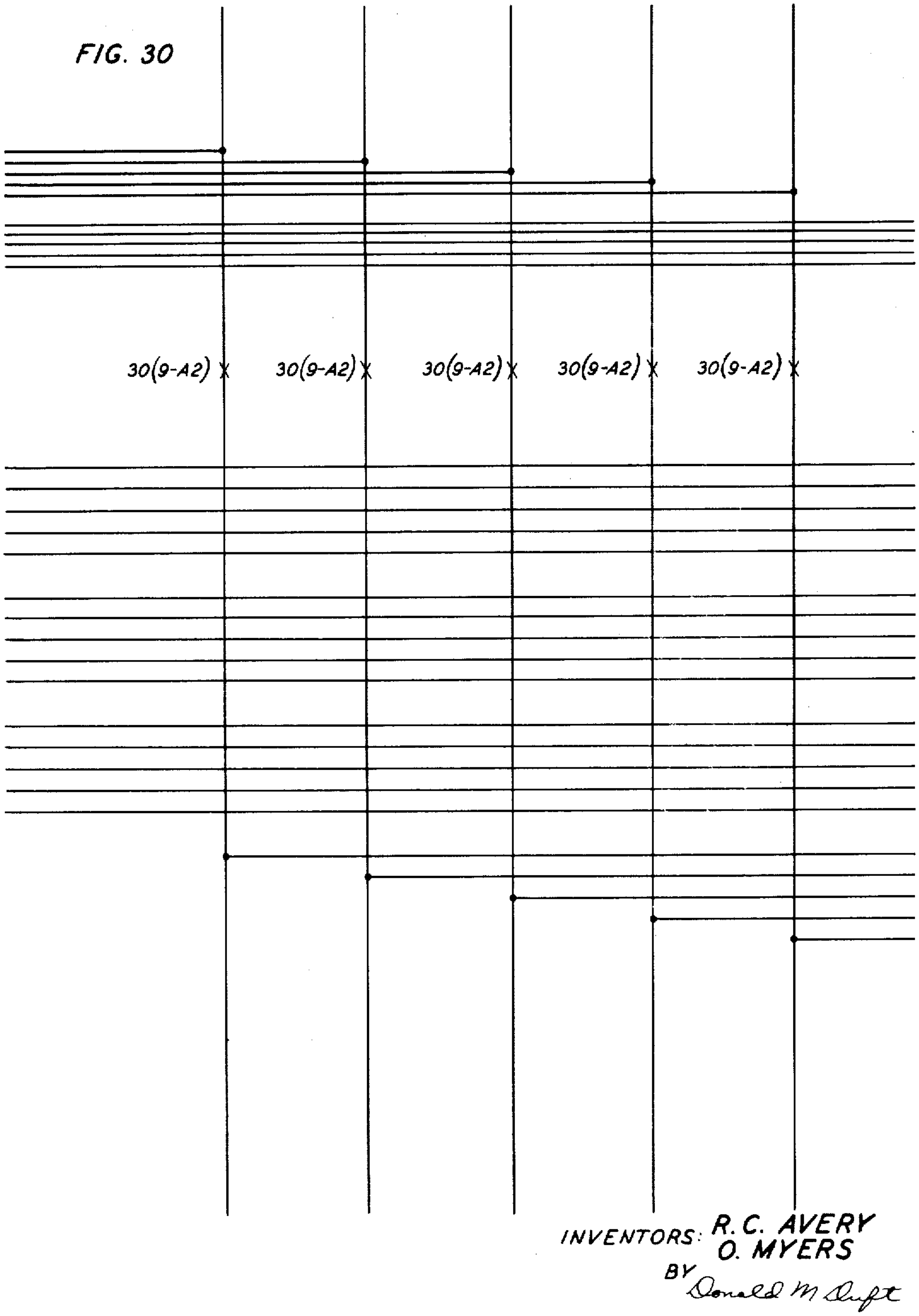
Figure 31:
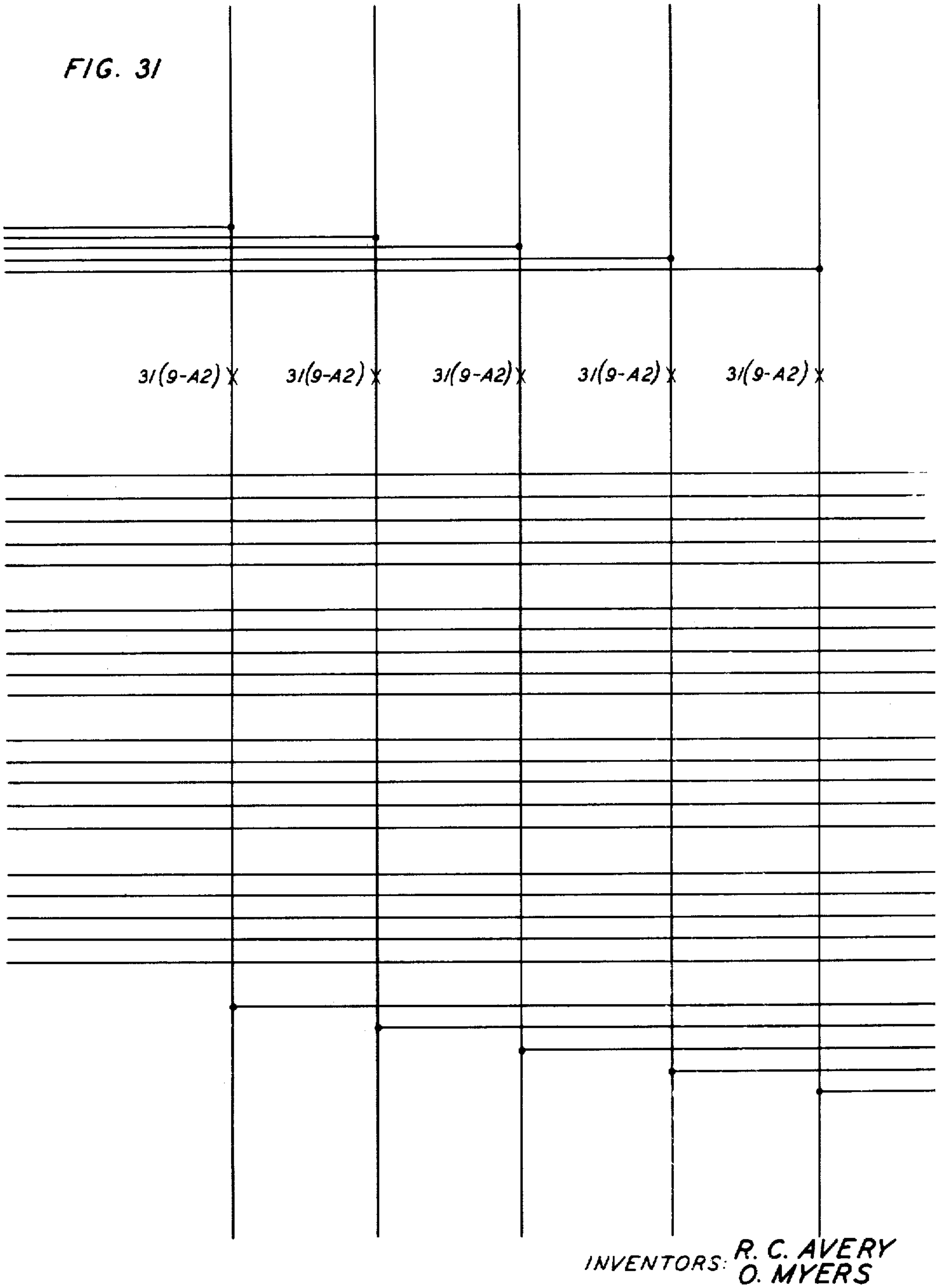
Figure 32:
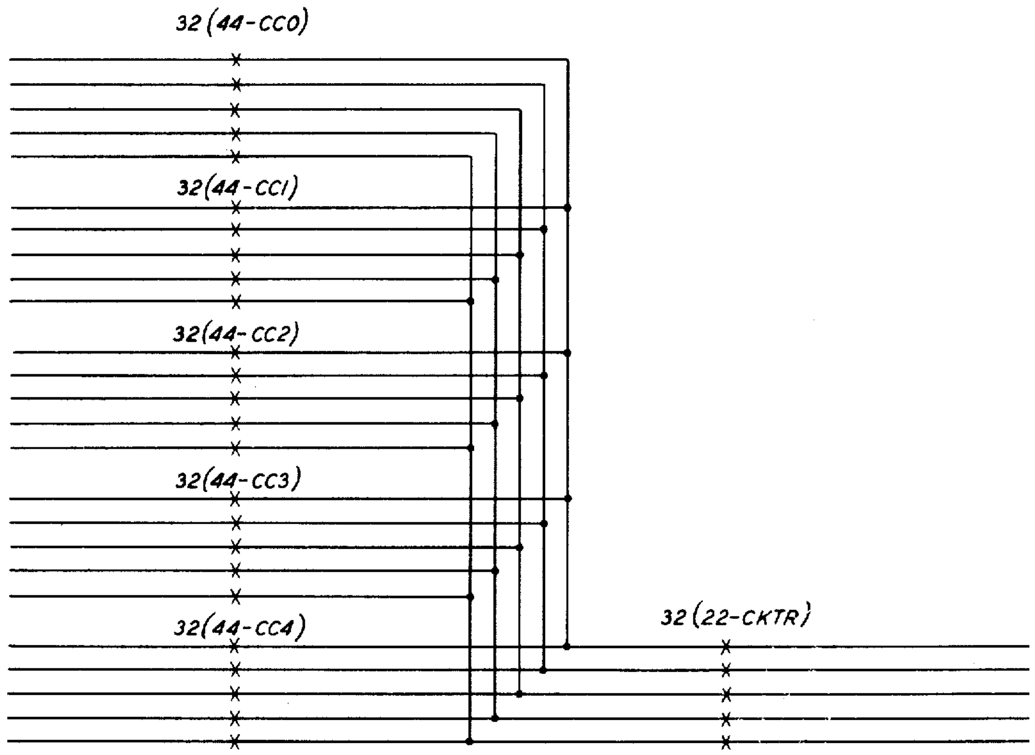
Figure 35:
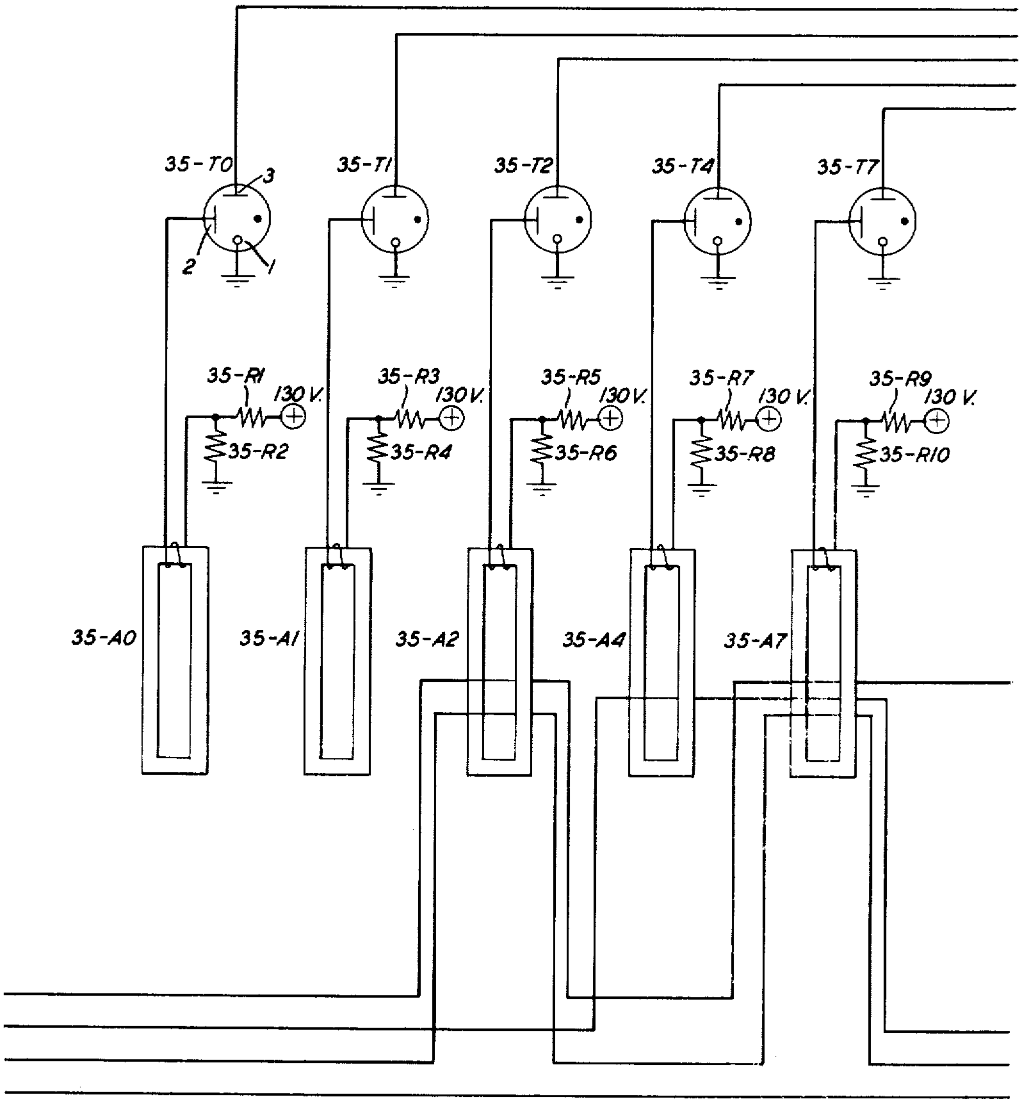
Figure 36:
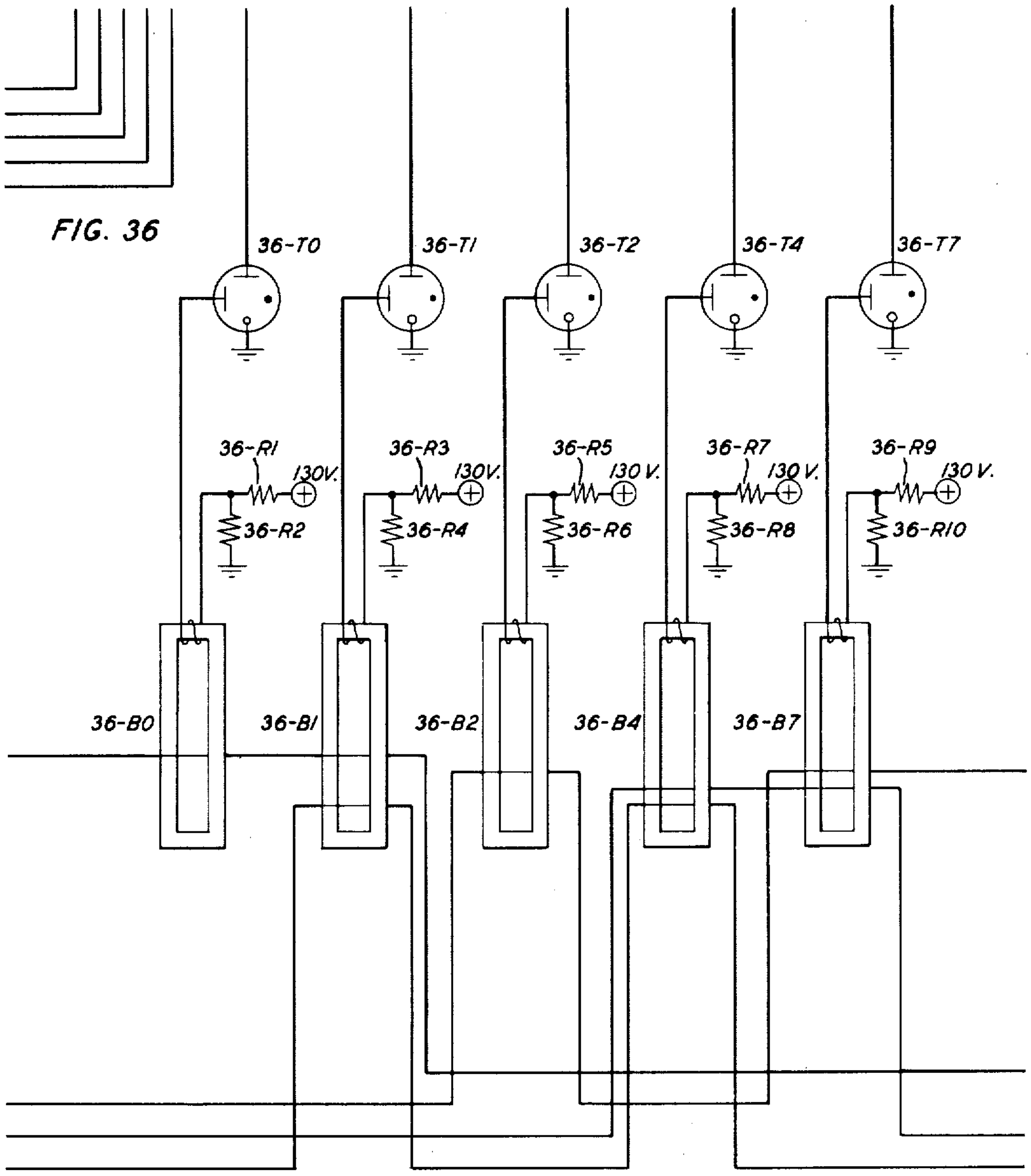
Figure 37:
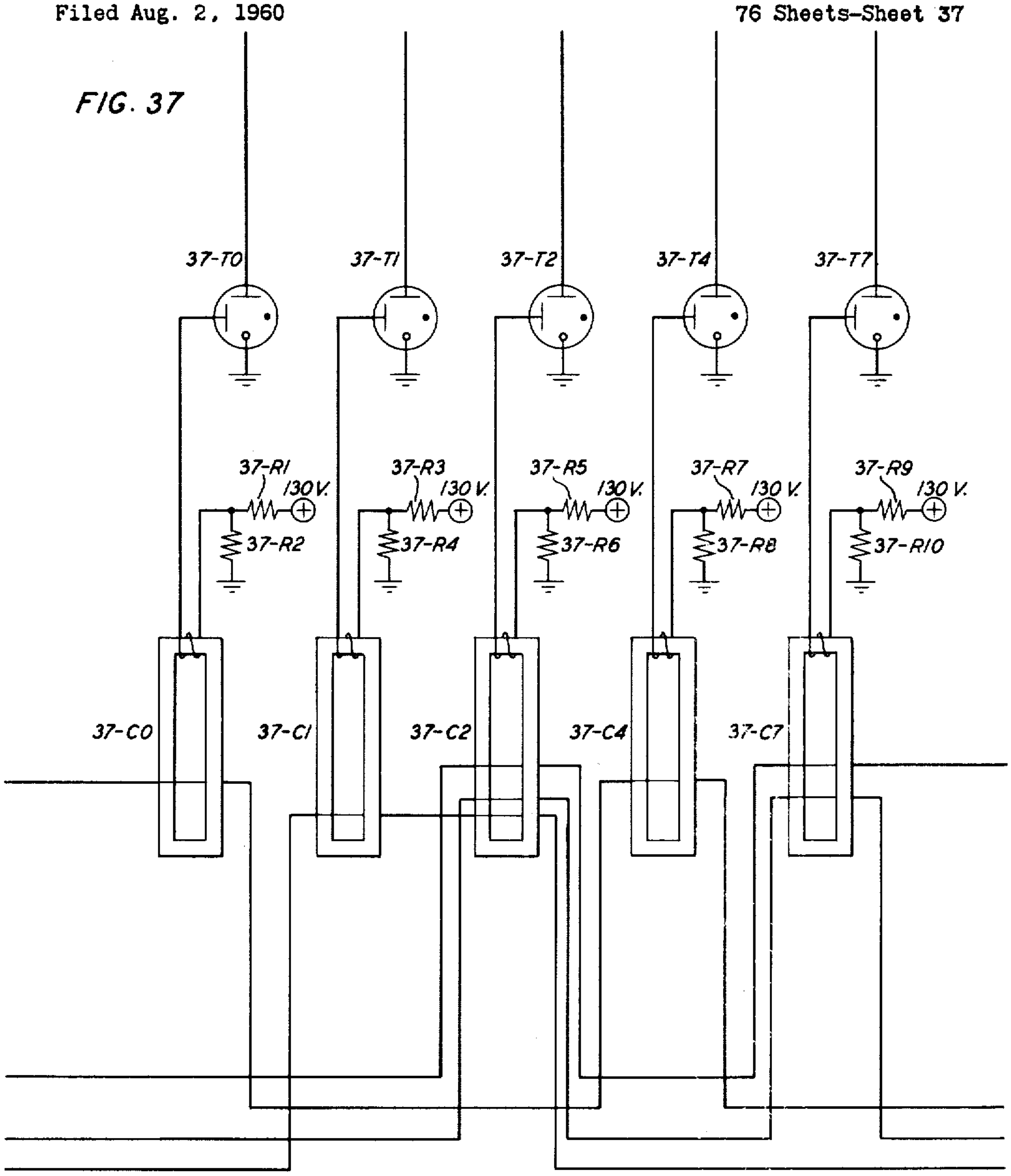
Figure 38:
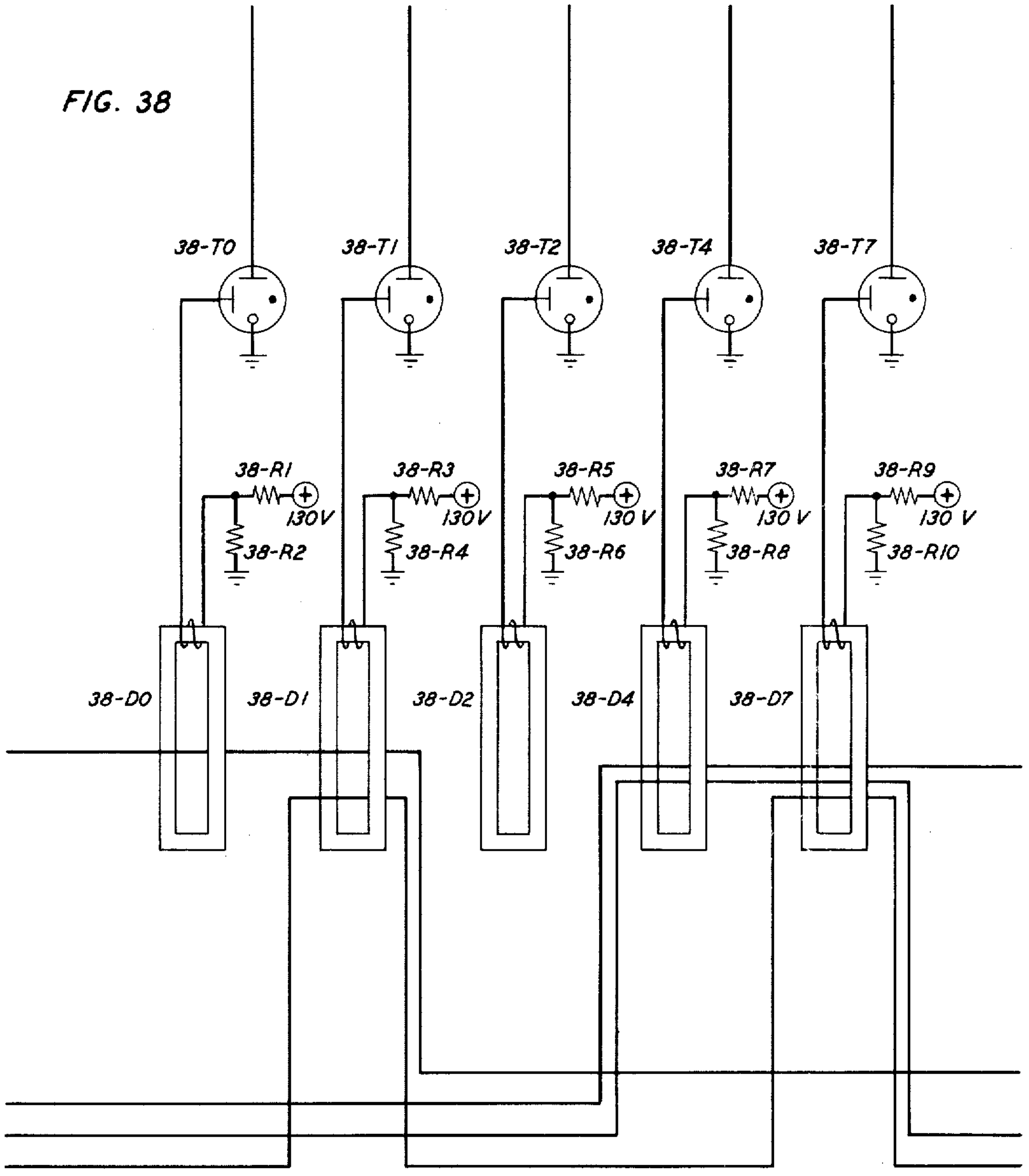
Figure 39:
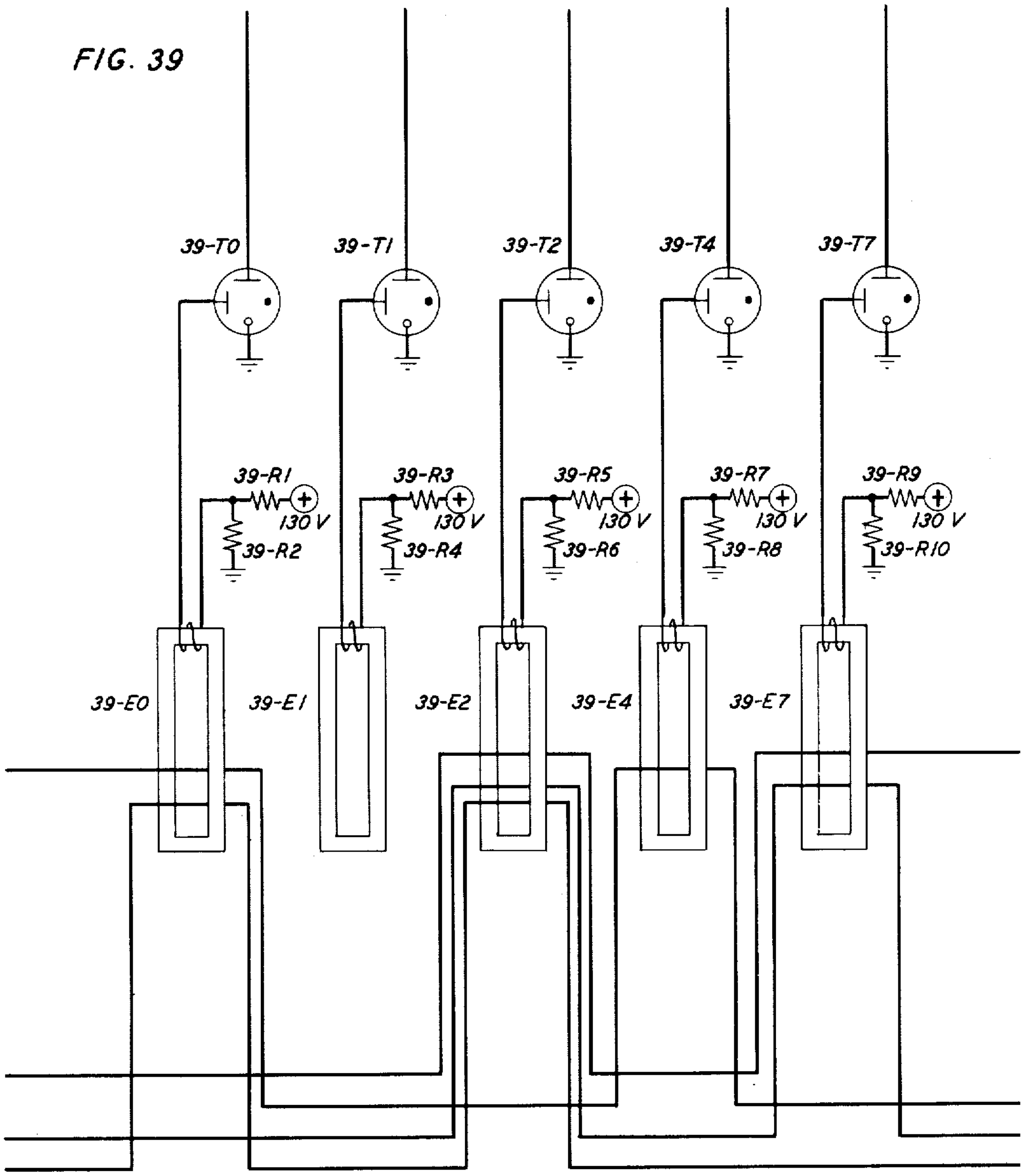
Figure 40:
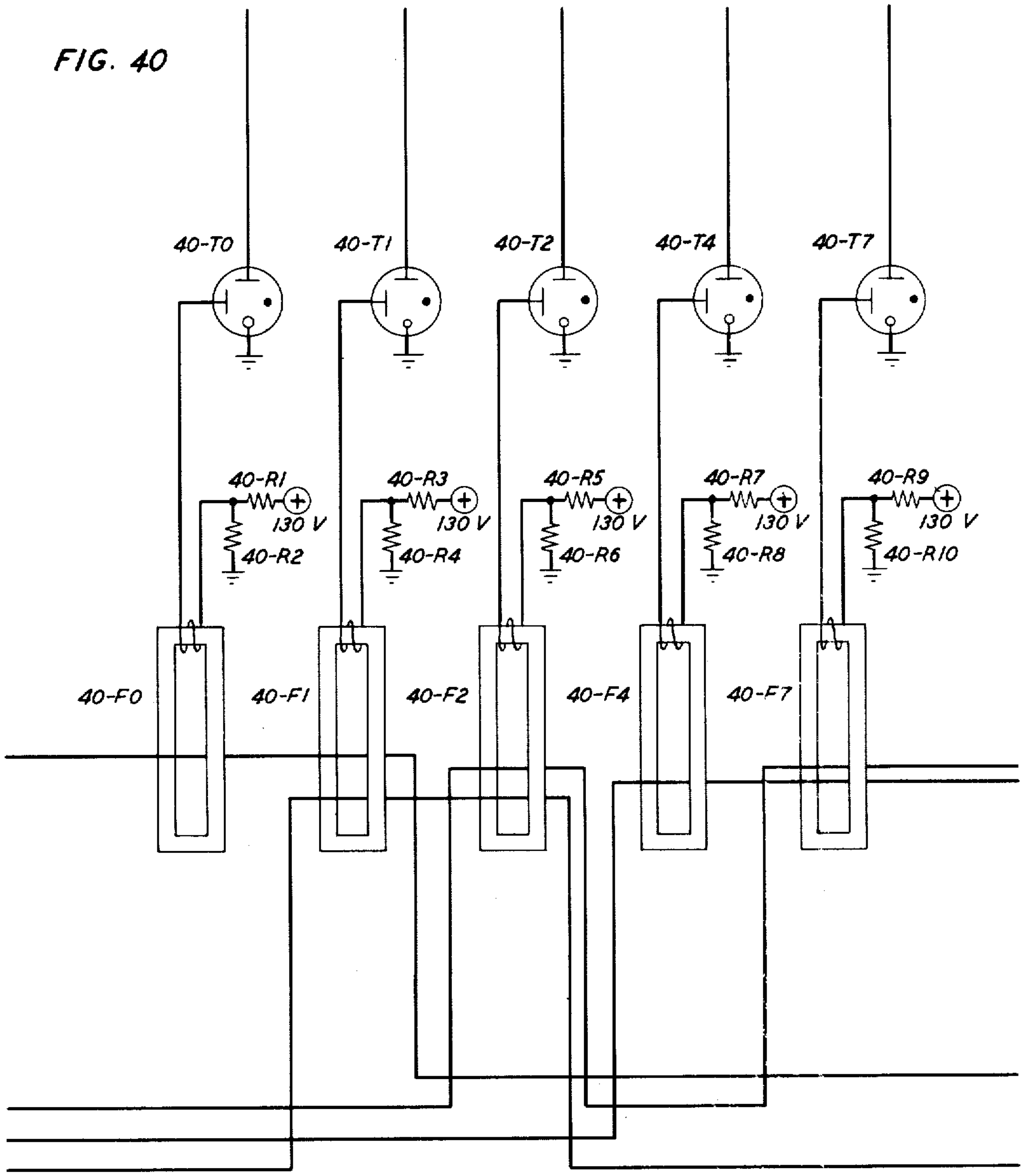

Recalling that relay 9–A0 is operated at this time and that relays 9–A1 and 9–A2 are unoperated, it may be seen that the main anodes of the tubes shown on FIGS. 35 and 36 are connected through the closed contacts of relay 9–A0 to the relay register circuit shown on FIGS. 25 and 26. It may also be seen that the main anodes of the tubes shown on FIGS. 37 through 40 remain disconnected from the relay circuits of FIGS. 25 and 26 by virtue of the open contacts on relays 9–A1 and 9–A2.

Starting at the main anode of tube 35–T4, a path may be traced to operate relay 25–TRT4 through make contacts 27(9–A0), break contacts 25(22–CKTR), break contacts 25(25–TRT4) to the winding of relay 25–TRT4, through the winding to a positive 130-volt potential. This 130-volt potential is applied to the anode of tube 35–T4 and causes the discharge therein to transfer from its start gap to its main gap. The current across the main gap operates relay 25-TRT4 which closes a locking path for itself through make contacts 25(25–TRT4) and 25(1–GC) to ground. This relay operates in a minimum of time since it is normally biased in its operate direction by the current through its upper winding as contacts 25(1–GC) closed. Relays 25–TRT7, 26–TRU2 and 26–TRU7 respectively, which are connected to tubes 35–T7, 36–T2 and 36–T7 respectively, operate and lock over circuits similar to that already described in connection with relay 25–TRT4. The operation of these four relays on FIGS. 25 and 26 represent the digits 09 in the two-out-of-five code. The digits 09 are termed the terminating rate treatment for this translation.

Summarizing so far, the surge of current through the jumper attached to terminal 34–926 fires the proper tubes on FIGS. 35 and 36 to enter a terminating rate treatment of 09 in two-out-of-five code form in the register circuits of FIGS. 25 and 26. The tubes shown on FIGS. 37 through 40 have no potential on their main anodes at this time due to the fact that relays 9–A1 and 9–A2 are unoperated. Therefore, discharge across the start gaps of these tubes, which cannot transfer to the main gaps, extinguishes as soon as the output pulses from the coils terminate as condenser 34–C1 discharges.

Figure 22:
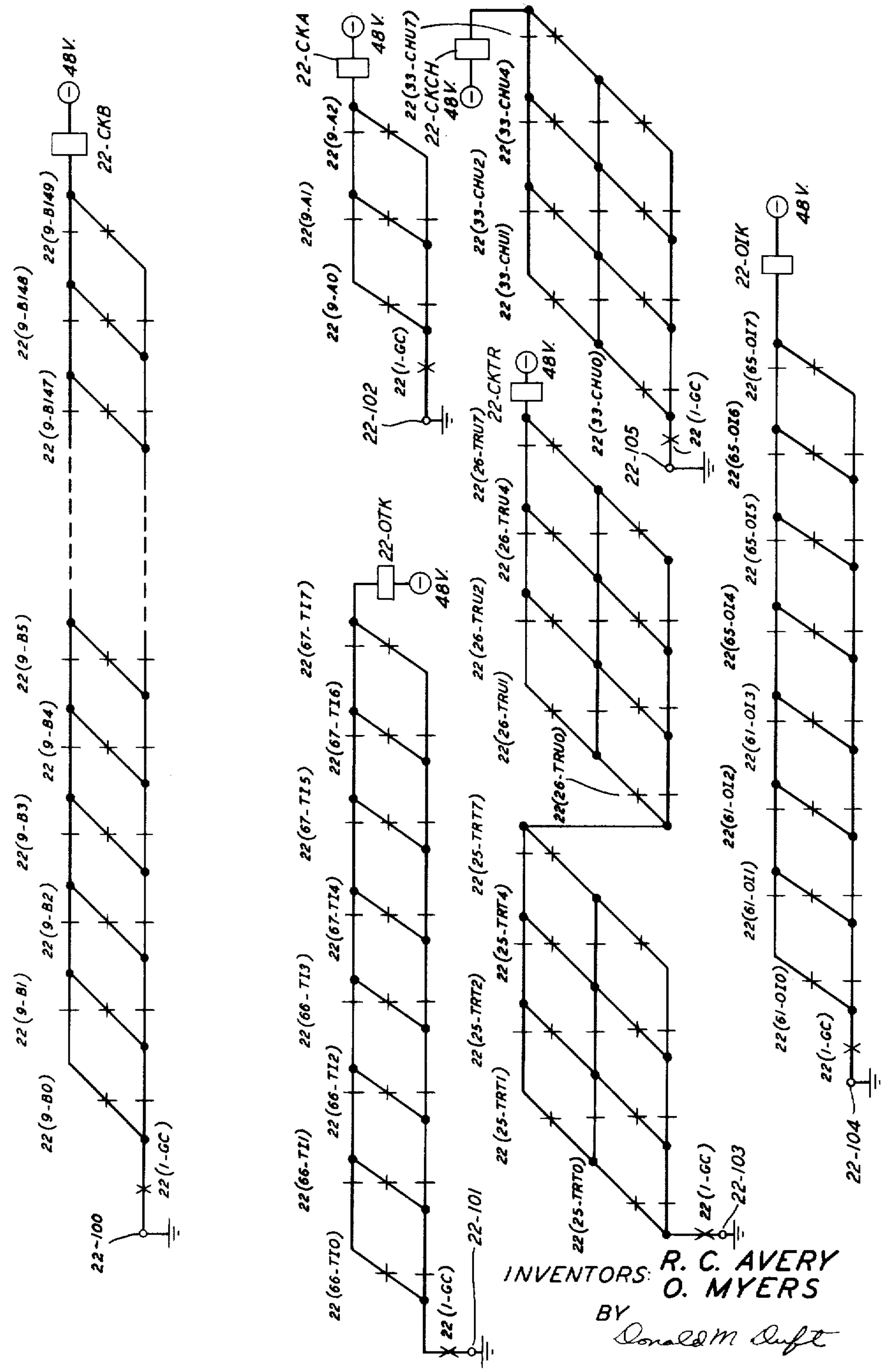

A path on FIG. 22 is now closed to operate relay 22–CKTR from ground on terminal 22–103, through make contacts 22(1–GC), break contacts 22(25–TRT0), 33(25–TRT1), 22(25-TRT2), make contacts 22(25–TRT4), 22(25–TRT7), break contacts 2(26TRU0), 22(26–TRU1), make contacts 22(26–TRU2), break contacts 22(26–TRU4), make contacts 22(26–TRU7), to the winding of relay 22–CKTR to operate it. The path just described comprises a check circuit to operate relay 22–CKTR providing that two, and only two, of the relays on each of FIGS. 25 and 26 operate.

*2.07 The coil field—Second translation*

Figure 42:
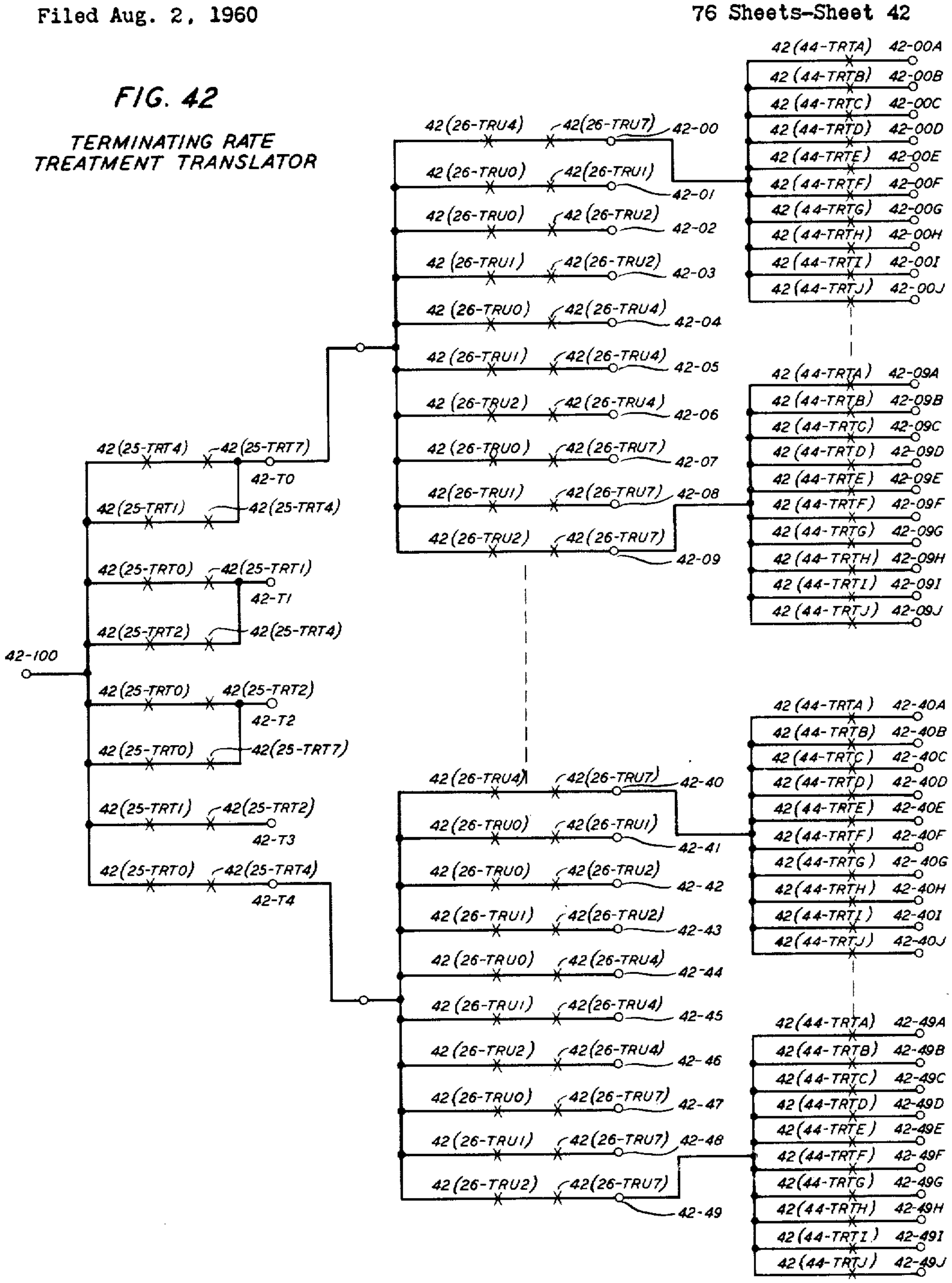

The operation of relay 22–CKTR closes a path on FIG. 34 from ground on terminal 34–113, through make contacts 34(1–GC), break contacts 34(41–RSG2), terminal 34–111, make contacts 34(22–CKTR), to terminal 34–112 and the input of the terminating rate treatment translator which is shown in detail on FIG. 42. Referring to FIG. 42, this circuit provides a complete translation of the terminating rate treatment digits derived during the operations described in section 2.06 together with a partial translation of the originating zone number. The left hand column of contacts on FIG. 42 translates the tens digit of the terminating rate treatment while the middle column of contacts translates the units digit. The right hand column of contacts further translates each terminating rate treatment in accordance with the originating zone number, as is explained in the immediate following paragraphs.

For determining charges, the circuit is arranged for 50 terminating rate treatments, numbered 00 to 49. Terminating rate treatment tens digits 5, 6 and 7 provide translations corresponding respectively to those for tens digits 0, 1 and 2, and are used to differentiate between zone and toll charging as hereinafter described.

It has been explained how the originating zone of the calling office is transmitted by the sender to the charge rater and registered in the right hand column of relays on FIG. 2. Specifically, the originating zone of the call currently being described as 25, and is registered in the circuit of FIG. 2 with the operation of relays 2–OZT2, 2–OZU1, and 2–OZU4.

Figure 44:
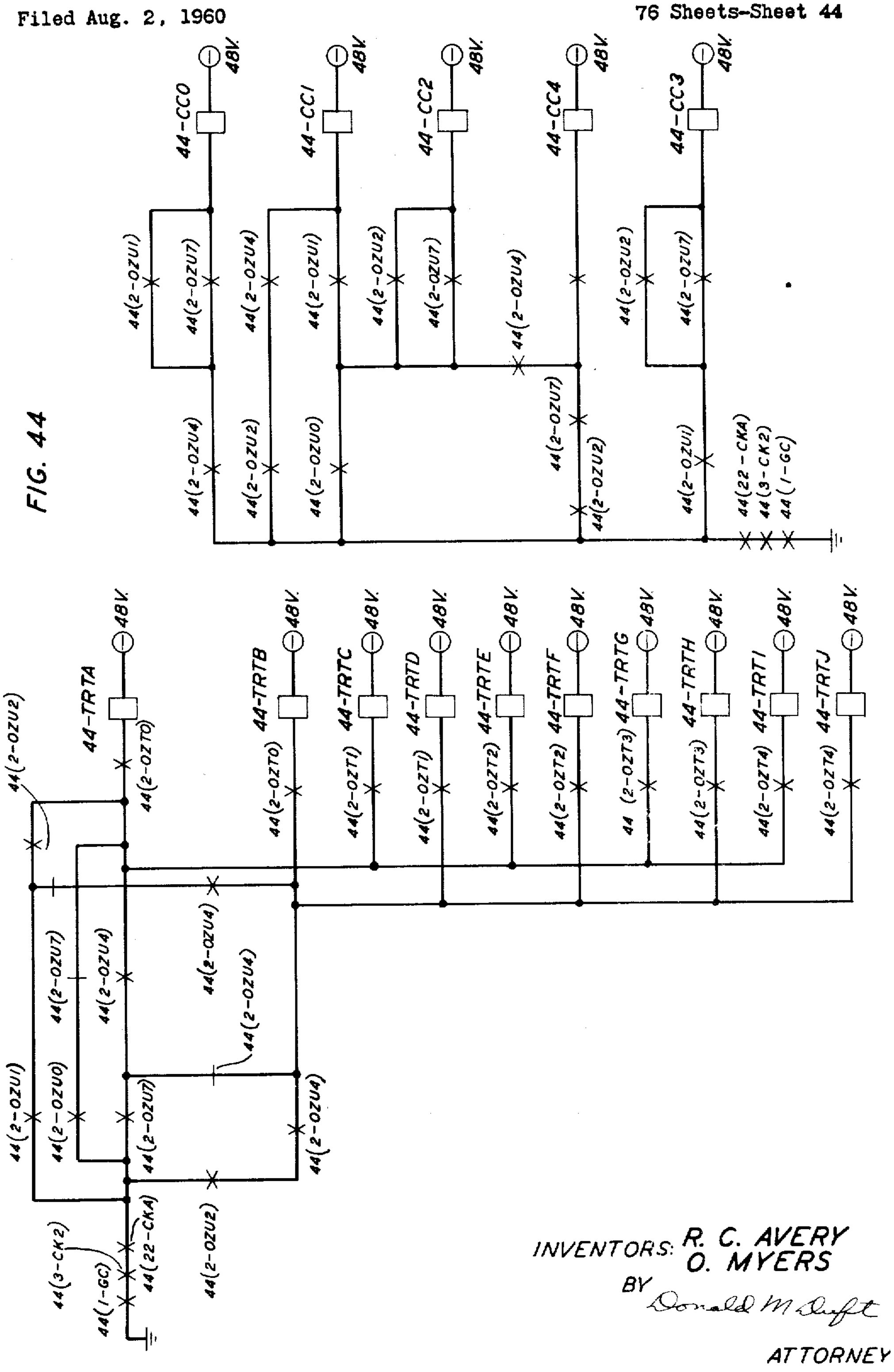

The circuit of FIG. 44 contains a group of 10 relays designated 44–TRTA through 44–TRTJ, and a set of 5 relays designated 44–CC0 through 44–CC4. Both of these relay sets are operated by contacts of the originating zone register relays of FIG. 2 in accordance with the following table:

| | Originating Zone Numbers | | | | |
|---|---|---|---|---|---|
| 44-TRT-Relay Operated | | | | | |
| 44–TRTA | 0 | 1 | 2 | 3 | 4 |
| 44–TRTB | 5 | 6 | 7 | 8 | 9 |
| 44–TRTC | 10 | 11 | 12 | 13 | 14 |
| 44–TRTD | 15 | 16 | 17 | 18 | 19 |
| 44–TRTE | 20 | 21 | 22 | 23 | 24 |
| 44–TRTF | 25 | 26 | 27 | 28 | 29 |
| 44–TRTG | 30 | 31 | 32 | 33 | 34 |
| 44–TRTH | 35 | 36 | 37 | 38 | 39 |
| 44–TRTI | 40 | 41 | 42 | 43 | 44 |
| 44–TRTJ | 45 | 46 | 47 | 48 | 49 |
| 44–CC-Relay Operated | 44–CC0 | 44–CC1 | 44–CC2 | 44–CC3 | 44–CC4 |

The call currently being described has an originating zone number of 25. Therefore, a path on FIG. 44 may now be traced to operate relay 44–TRTF from ground, through make contacts 44(1–GC), 44(3–CK2), 44(22–CKA), 44(2–OZU1), break contacts 44(2–OZU2), make contacts 44(2–OZU4) and 44(2–OZT2) to the winding of relay 44–TRTF to operate it. A path is also closed to operate relay 44–CC0 from ground through make contacts 44(1–GC), 44(3–CK2), 44(22–CGA), 44(2–OZU4), 44(2–OZU1) to the winding of relay 44–CC0.

Referring again to FIG. 42, a path may now be traced from the input terminal 42–100, through make contacts 42(25–TRT4) and 42(25–TRT7), to terminal 42–T0, which represents a tens digit of 0 for the terminating rate treatment. This path may be extended through make contacts 42(26–TRU2) and 42(26–TRU7), to terminal 42–09, which represents a terminating rate treatment of 09. This path may be further extended through make contacts 42(44–TRTF) to terminal 42–09F which represents a complete translation for the terminating rate treatment 09 and a partial translation for the originating zone 25. This is a partial translation for the originating zone number since, as is shown in the preceding chart, relay 44–TRTF is operated for all originating zone numbers 25 through 29.

Referring once again to FIG. 34, the previously described ground on input terminal 34–112 of the translator may now be extended through the translator to output terminal 34–09F. This terminal as well as the other output terminals of the translator is connected to jumpers which are selectively threaded through the coil fields on FIGS. 35 through 40. However, only the jumper connected to terminal 34–09F is shown on the drawings in order to minimize their complexity. The main anodes of the tubes are connectable at this time to the register circuit of FIG. 33 by the contacts of relays 44–CC0 through 44–CC4. It has already been explained how, out of this group of relays, only relay 44–CC0 is currently operated. Therefore, only the main anodes of the tubes shown on FIG. 36 are now connected to the register circuit of FIG. 33, and only these tubes will be effective to store derived information.

The jumper connected to terminal 34–09F is selectively threaded through coils 36–B1, 36–B4, 37–C1, 37–C2, 38–D1, 38–D7, 39–E0, 39–E2, 40–F1, and 40–F2, to terminal 41–101 and the winding of relay 41–RSG2. The ground on this jumper operates relay 41–RSG2 which closes a holding circuit for itself through contacts 41(41–RSG2) and 41(1–GC) to ground. Relay 41–RSG2 in operating closes a path to operate relay 41–SST2 from ground, through make contacts 41(1–GC) and 41(41–RSG2) to the winding of 41–SST2.

Condenser 34–C2 is normally charged to a potential of 130-volts through inductance 34–L2 and resistance 34–R2. Upon the operating of relays 41–RSG2 and 41–SST2, ground through break contacts 34(41–RSG2) is removed from terminal 34–111, and condenser 34–C2 is discharged through make contacts 34(41–SST2), 34(41–RSG2), 34(22–CKTR), the terminating rate treatment translator 34–110, the jumper connected to terminal 34–09F, make contacts 41(41–RSG2) and 41(1–GC) to ground. The discharge current through this jumper induces a voltage in the output winding of every coil through which it is threaded. This voltage is effective to initiate a discharge in the start gap of the associated tubes.

The main anodes of the tubes shown on FIGS. 37 through 40 have no potential on them at this time and, therefore, the discharge across the start gaps of these tube subsides as condenser 34–C2 discharges. The main anodes of the tubes shown on FIG. 36 are connected through make contacts 32(44–CC0) and 32(22–CKTR), to the register circuit of FIG. 33. The positive potential supplied by the register relays of this circuit transfers the discharge in tubes 36–T1 and 36–T4 to the main anode. The current through this circuit operates relays 33–CHU1 and 33–CHU4. Both of these relays lock to ground through their own make contacts and make contacts 33(1–GC).

Figure 33:
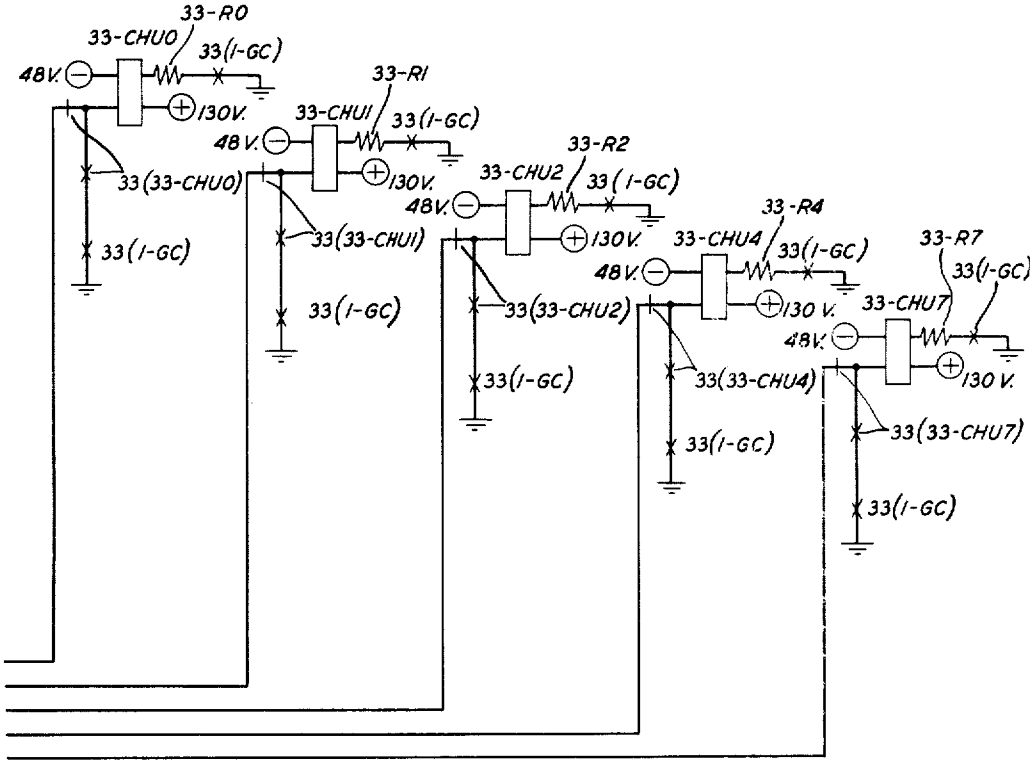

Referring to FIG. 22, a path may be traced at this time to operate relay 22–CKCH from ground on terminal 22–105, through make contacts 22(1–GC), break contacts 22(33–CHU0), make contacts 22(33–CHU1), break contacts 22(33–CHU2), make contacts 22(33–CHU4), break contacts 22(33–CHU7) to the winding of relay 22–CKCH to operate it. This network comprises a check circuit to operate this relay in the event that two and only two of the relays on FIG. 33 are operated.

*2.08 Transmission of charge rate data to the sender*

The charge rate information derived by the present invention is transmitted to the sender as a two-digit number. The charge rate does not indicate directly the total charge for a call since the total charge is dependent on other factors such as, for example, the chargeable conversation time, initial period charge, initial period duration, overtime period duration, the number of overtime periods and the charge for a single overtime period. Each charge rate represents a specific combination of these parameters. The relationship between a charge rate and the charge for the initial period of the call will also depend upon the rate structure of the community in which each charge rater will be installed. In accordance with the rate structures in use at the present time, the charge rate numbers and the corresponding monetary initial period charge could be related as shown in the following table:

| Initial charge | Charge rate digits | | Initial charge | Charge rate digits | |
|---|---|---|---|---|---|
| | Zone | Toll | | Zone | Toll |
| .10 | | 21 | 1.45 | | 48 |
| .15 | 02 | 22 | 1.50 | | 49 |
| .20 | 03 | 23 | 1.55 | | 50 |
| .25 | 04 | 24 | 1.60 | | 51 |
| .30 | 05 | 25 | 1.65 | | 52 |
| . | . | . | 1.70 | | 53 |
| . | . | . | . | | . |
| 1.00 | 19 | 39 | . | | . |
| 1.05 | | 40 | 2.30 | | 65 |
| 1.10 | | 41 | 2.35 | | 66 |
| 1.15 | | 42 | 2.40 | | 67 |
| 1.20 | | 43 | 2.45 | | 68 |
| 1.25 | | 44 | 2.50 | | 69 |
| 1.30 | | 45 | . | | . |
| 1.35 | | 46 | . | | . |
| 1.40 | | 47 | 4.00 | | 99 |

In accordance with this table, it may be seen that initial charges between ten cents and a dollar are represented by charge rates of 02 through 19 for zone calls and 21 through 39 for toll calls. Initial charges of $1.05 and over are represented by charge rate numbers of 40 or higher and are associated only with toll calls. The distinctions between a zone and a toll call are best described by setting forth some of the characteristics of each. A zone call is one that is commonly referred to as a "local" call, the charges therefor are commonly bulk-billed, and no federal excise tax is applicable thereto. Toll calls, on the other hand, are commonly referred to as "long distance" calls, they are detailed-billed, and at the present time are subject to a ten percent federal excise tax. Toll calls are commonly printed on a separate list which accompanies the usual monthly statement.

Figure 43:
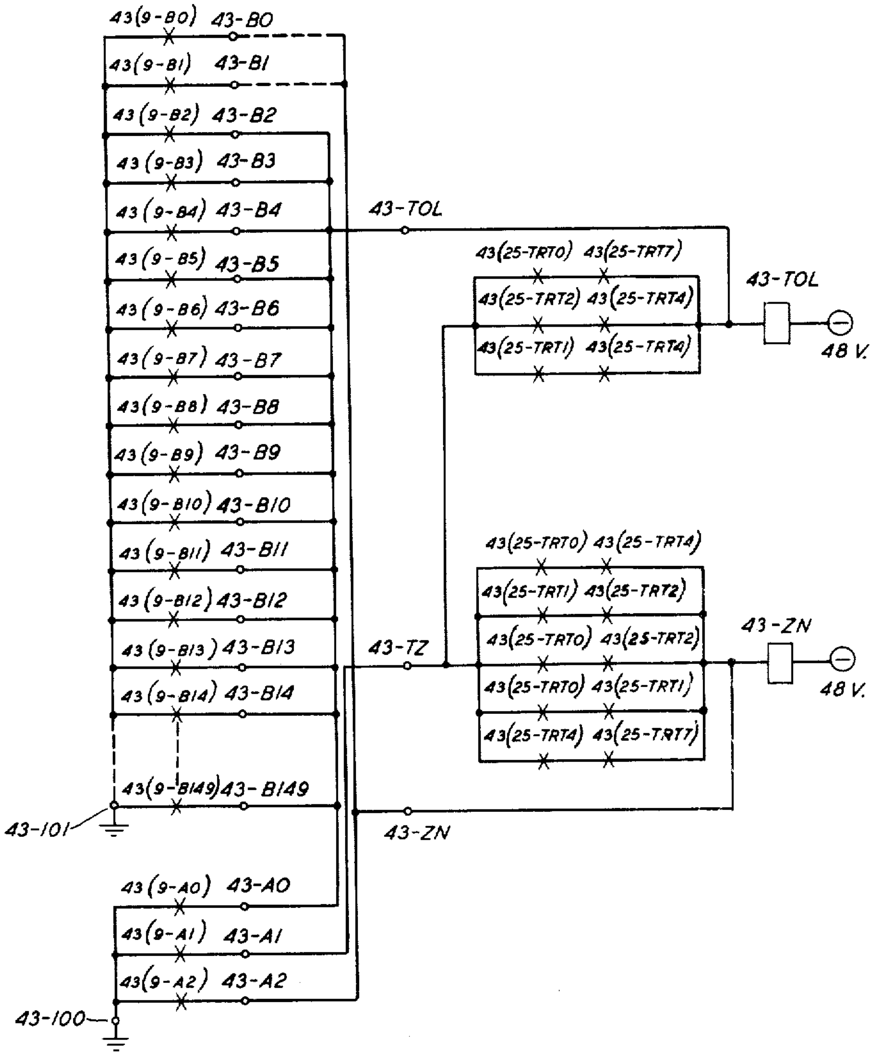

The circuit of FIG. 43 contains two relays, with relay 43–TOL being operated for toll calls, and relay 43–ZN being operated for zone calls. Relay 43–TOL is operated by the application of a ground to terminal 43–TOL, while relay 43–ZN is operated by the application of a ground to terminal 43–ZN. A ground on terminal 43–TZ operates relay 43–TOL for terminating rate treatment tens digits of 5 through 7, and operates relay 43–ZN for terminating rate treatment tens digits of 0 through 4. Terminals 43–A0 through 43–A2, which are grounded by the operation of relays 9–A0 through 9–A2, are selectively cross-connectable to terminals 43–TOL, 43–TZ and 43–TN. The manner in which these two sets of terminals are cross-connected will vary in accordance with the peculiarities of each installation. In the embodiment of FIG. 43, terminal 43–A0 is connected to terminal 43–TOL, thereby indicating that all class A calls terminating in area 0 will be billed as toll calls. Terminal 43–A2 is connected to terminal 43–ZN. This indicates that all class A calls terminating in area 2 will be billed as zone calls. Terminal 43–A1 is connected to terminal 43–TZ. This indicates that all class A calls terminating in area 1 and having a terminating rate treatment tens digit of 0 through 4 will be billed as zone calls, while all such calls having a terminating rate treatment tens digit of 5 through 7 will be billed as toll calls.

It has been explained how relay 9–A0 was operated for the call currently being described. Therefore, a path may be traced at this time from ground on terminal 43–100, through make contacts 43(9–A0), terminal 43–A0, terminal 43–TOL, to the winding of relay 43–TOL to operate it.

Figure 21:
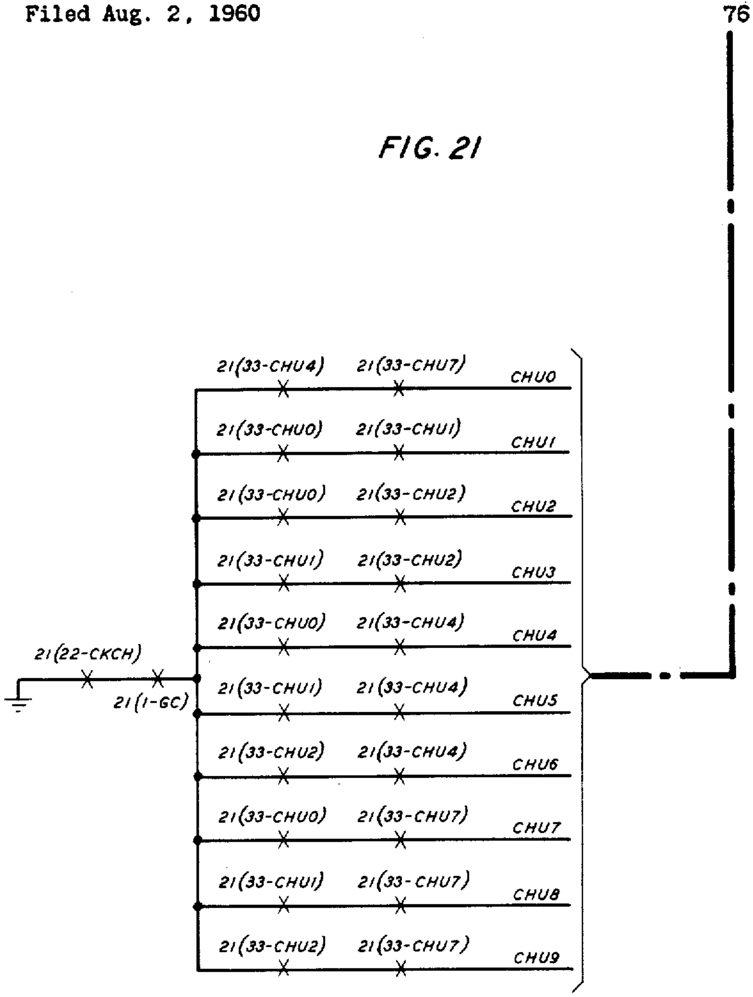

The charging information for class A calls is transmitted to the sender by the circuits of FIGS. 16 and 21. A path may be traced at this time from ground on terminal 16–100, through make contacts 16(9–A0) 16(43–TOL) to input conductor CHT2 of the sender. The ground on this conductor functionally represents a charge rate tens digit of 2. A path on FIG. 21 may be traced at this time from ground on make contacts 21(22–CKCH), 21(1–GC), 21(33–CHU1), 21(33–CHU4), to input conductor CHU5 of the sender. The ground on this conductor represents a charge rate units digit of 5. The grounds on conductors CHT2 and CHU5 together represent a charge rate of 25, which according to the preceding table represents a toll call having an initial charge of thirty cents. For calls to a class A area billed on a zone basis, relay 43–ZN would have been operated instead of relay 43–TOL, and conductor CHT0 to the sender would be grounded.

Summarizing the class A call which has been described, a subscriber in area 201 having the telephone number CR3–6012 and located in originating zone 25 called a subscriber in area 212 having the phone number WA6–1023. Area 212 is also class A area 0 for this particular installation. It was first described how the terminating office code translator of FIG. 34 and the magnetic core translator circuits of FIGS. 35 through 40 derived the terminating rate treatment digits of 09 during the first translation. It was then described how the terminating rate treatment translator of FIG. 34 and the same magnetic core translator derived a charge units digit of 5 during the second translation. Finally, it was described how the circuits of FIGS. 16 and 21 were effective to transmit the charge rate digits of 25 to the sender for this particular call.

Once the sender has received the charge rate digits, or has received a ground on lead VC or TBL due to incorrect dialing or trouble, as hereinbefore described, it opens its contact 17 on FIG. 1 to release relay 1–RP0, which in turn releases relay 1–RC0. The release of this relay releases relay 1–GC which, in turn, releases all operated relays in the charge rater, so that it may serve other waiting senders.

All the output terminals of translator 34–100 which are associated with working offices are similarly connected to jumpers which are threaded through the coil field. Only the jumper associated with working office code 926(WA6) has been shown, in order to minimize the complexity of the drawings. The output terminals of translator 34–100, which represent office codes denied in all three terminating areas are connected to terminal 34–DNC. This terminal, in turn, is connected to a jumper which is selectively threaded through the coil field so that it will derive a terminating rate treatment of 91 as manifested by the operation of relays 25–TRT2, 25–TRT7, 26–TRU0 and 26–TRU1.

All the output terminals of translator 34–100, which represent office codes vacant in all three areas, are connected to terminal 34–VTC. This terminal, in turn, is connected to a jumper which is threaded through the coil fields so as to derive a terminating rate treatment of 90 as manifested by the operation of relays 25–TRT2, 25–TRT7, 26–TRU4, and 26–TRU7. If an office code is denied or vacant in only one or two areas, but working in the other area, the jumper connected to the output terminal representing this code will then be wired so as to derive the desired terminating rate treatment for the working area and the digits associated with a denied or vacant code for the class A areas in which the code is vacant or denied.

As already mentioned, a vacant terminating office code effects the derivation of the terminating rate treatment digits 90 and completes a path on FIG. 16 from ground on terminal 16–102, through make contacts 16(25–TRT2), 16(25–TRT7, 16(26TRU4) and 16(26–TRU7), to input conductor VTC of the sender. Similarly, a denied terminating office code effects the derivation of a terminating rate treatment of 91 and completes a path on FIG. 16 from ground on terminal 16–102, make contacts 16(25–TRT2), 16(25–TRT7), 16(26–TRU0), 16(26–TRU1), to input conductor DNC of the sender. A ground on either input conductor VTC or DNC is effective to initiate whatever circuit actions it may be desired to have the sender take in connection with the dialing of a vacant or denied terminating office code, and to release the charge rater as previously described, without making the second translation.

*3.0 Class B calls*

The operation of the circuit for the processing of a class B call is described in this section. FIG. 69 discloses the geographical relationship between offices for a typical class B call. Specifically, FIG. 69 discloses a tandem area and two distant terminating areas. The tandem area contains a plurality of local offices and a single tandem office which may serve, on an originating basis, calls originating in any of these local offices and directed to terminating offices in other areas. FIG. 69 shows only a single local office in the tandem area circle in order to minimize the complexity of the drawings.

A class B call is one wherein the location of the called office within its area may have an appreciable bearing on the overall distance of the call. The charge rates for class B call are computed in the following manner: (1) a basic charge is derived in accordance with the minimum distance between the originating tandem area and the terminating area, (2) a terminating increment is derived which is dependent upon the location of the called office within its N.P. area with respect to the originating tandem area, and, (3) an originating increment is derived which is dependent upon the location of the originating office within its tandem area with respect to the called area. The desired charge rate is determined by totaling these three factors.

A call from Newark, New Jersey, to Rockford, Illinois, might be termed a class B call and the charge rate for it would then be derived as follows. A basic charge would be established for all calls between the numbering plan area which includes Rockford, Illinois and the tandem area in which Newark is located. A terminating increment would then be determined in accordance with the distance of Rockford from the eastern border of its numbering plan area. An originating increment would next be determined in accordance with the distance Newark is from the western border of its tandem area. The total charge rate for the call would then be determined by adding together the basic charge, the terminating increment and the originating increment.

It may be seen from FIG. 69 that the originating increment for a particular calling office is not a fixed number but instead is variable in accordance with the direction of the terminating area with respect to the originating tandem area. For example, the originating increment is 5 for a call from the local office shown in the tandem area of FIG. 69 to terminating area 1. The originating increment areas represented by the solid curved lines are applicable to calls directed to terminating area 1. On the other hand, the originating increment is 1 for a call from the same office to an office in terminating area 2. This is shown by the originating increments represented by the dashed lines within the tandem area.

The terminating increment for a particular called office is similarly not a fixed number but instead may vary in accordance with the direction of the originating office. Thus, the terminating office shown in terminating area 1 has a terminating increment of 5 for a call from the local office in the disclosed tandem area. However, since this particular terminating office in area 1 is located in the right-hand portion of its area, a call from an office in a tandem area located to the right of terminating area 1 would have a different and probably smaller terminating increment for calls to this same office in terminating area 1.

The class B call about to be described assumes that subscriber in N.P. area 201 (a portion of the state of New Jersey) having a telephone number CR3–6012 and located in originating zone 25 calls a subscriber in national area 913 (a portion of the state of Kansas) having the telephone number WA6–1023. Also, area 913 is designated as class B area 2. The significance of this designation is explained later. It should be noted that the calling area, calling number, originating zone and called number are identical to that of the class A call previously described. The only difference between the two calls is that, in the present one, the call office is located in national area 913 rather than 212. The assumption of similar call data simplifies the following description of a class B call over that which would be necessary if a completely different set of data were used.

The basic charge for this call is dependent upon the minimum distance between the tandem area in which the calling subscriber is located and area 913, a portion of the state of Kansas. Next, a terminating increment is derived which is based upon the location of the called office in the state of Kansas with respect to the originating tandem area. Next, an originating increment is derived which is dependent upon the location of the calling office in the originating tandem area with respect to the terminating area. Finally, the basic charge, the originating increment and the terminating increment are added to determine the total charge rate.

*3.01 Receipt of input data*

Let is be assumed that sender 0 is serving this particular class B call and that, in so doing, it seizes the presently disclosed charge rater. This being the case, relays 1–RP0, 1–RC0, and 1–GC on FIG. 1 are all operated, as previously described in connection with the class A call, as the charge rater is seized. Once sender 0 has seized the charge rater, it transmits information thereto pertaining to the originating zone number and the first six digits dialed by the calling party. Since the present call is a 10-digit call, the first six digits dialed are 913–WA6. These are registered in the terminating code register of FIG. 2 by the operation of relays 2–TA2, 2–TA7, 2–TB0, 2–TB1, 2–TC1, 2–TC2, 2–TD2, 2–TD7, 2–TE0, 2–TE2, 2–TF2, and 2–TF4. The originating zone digits 25 are registered in the originating zone register of FIG. 2 by the operation of relays 2–OZT2, 2–OZU1 and 2–OZU4. All of these register relays are operated over circuits similar to those described for the class A call.

*3.02 Input data check circuits*

The relay 3–CK1, the check relay for the terminating code register of FIG. 2, is operated over the make contacts of the two operated relays and the break contacts of the three unoperated relays in each relay group of the terminating office code register in a manner similar to that already described in connection with class A calls. Similarly, relay 3–CK2, the check relay for the originating zone register, is operated, as previously described, provided that the proper number of relays in each relay group of the originating zone register are operated.

*3.03 Call classification*

The present call is a 10-digit call and, therefore, a path to operate relay 4–AC in FIG. 4 may be traced from ground, through make contacts 4(1–GC), 4(3–CK1), 4(2–TB0), and 4(2–TB1) to the winding of relay 4–AC. The operation of relay 4–AC manifests the dialing of a 10-digit area code call.

*3.04 Terminating area translation*

Remembering that the terminating area for the present call is 913, a path on FIG. 5 of the terminating area code translator may be traced from input terminal 5–100, through make contacts 5(2–TB1), 5(2–TB0), 5(2–TA2), 5(2–TA7), terminal 5–91, make contacts 5(2–TC1), 5(2–TC2) to output terminal 5–913 which represents a translation for terminating area code 913.

A path on FIG. 8 may now be traced from ground on terminal 8–103, through make contacts 8(1–GC), 8(3–CK1), 8(4–AC), through the terminating area code translator 8–101 as described in connection with FIG. 5, to its output terminal 8–913.

It was described in connection with class A calls how the output terminals of terminating area code translator 8–101 which represent class A calls are selectively cross-connected to terminals 8–A0, 8–A1, and 8–A2 to operate relays 9–A0, 9–A1 and 9–A2 in accordance with the particular area to which each class A call is directed. In a similar manner, all output terminals of this translator representing class B terminating areas are selectively cross-connected to terminals 8–B0 through 8–B149 to operate relays 9–B0 through 9–B149 in accordance with the particular area to which each class B call is directed.

The group of relays 9–B0 through 9–B149 provides facilities for 150 different class B areas. This many class B relays are required since most calls from any particular switching center to other national areas will be class B calls. The reason for this may be explained as follows: There are a thoretical maximum of 152 different national area codes since the first digit thereof is restricted to the digits 2 through 9, the second digit to 0 or 1, and the third to the digits 0 through 9, less those having the digit 1 in the second and third positions.

$$(8\times2\times10=160-8=152)$$

Of these 152 N.P. areas, only three can be class A areas. Although the number of class C areas for each installation cannot be stated precisely, it is obvious that they will not be too great in number, i.e., probably ten at the most since not more than this number of areas can meet the distance requirements of a class C area, namely, that it must be sufficiently remote from the originating tandem area that the precise location of the called office within the terminating area has little bearing on the over-all distance of the call. There may be only one or two such areas, or possibly none at all, with reference to tandem areas centrally located with respect to the entire country. Therefore, since only three areas can be classified as class A areas, it is apparent that the bulk of the national areas will be classified as class B areas and, hence, 150 relays are provided on FIG. 9. Such relays and associated equipment in excess of the requirements for a specific installation may be omitted therefrom.

Assuming there are 150 class B areas, each of these will be arbitrarily assigned a number from 0 through 149 and, the output terminals on translator 8–101 representing such areas will be cross-connected to operate individual ones of relays 9–B0 through 9–B149. In short, a call directed to any class B area will effect the operation of its associated relay 9–B–. It has been assumed that terminating area 913 for the call now being described is designated class B area 2 and therefore terminal 8–913 of translator 8–101 will be connected to terminal 8–B2. This being the case, the previously traced path terminating on output terminal 8–913 of translator 8–101 may be extended to terminal 8–B2 and from there to the winding of relay 9–B2 to operate it. The operation of this relay indicates that the present call is directed to class B terminating area 2.

A path to operate relay 22–CKB may now be traced from ground on terminal 22–100, through make contacts 22(1–GC), through break contacts 22(9–B0) and 22(9–B1), make contacts 22(9–B2), through break contacts 22(9–B3) through 22(9–B149) to the winding of relay 22–CKB to operate it. This relay operates provided that one, and only one, of relays 9–B0 through 9–B149 are operated.

*3.05 Terminating office code translation*

The circuit of FIG. 23 provides a two-out-of-five to one-out-of-ten translation for the B and C (second and third) digits of the terminating office code. The terminating office code for the present call is WA6 which represents the digits 926. The B digit of 2 for this office code, which is stored in two-out-of-five code form by the terminating office code register of FIG. 2, is translated by the left-hand column of contacts and relays on FIG. 23 and effects the operation of relay 23–B2. The path over which this relay operates may be traced as follows: ground on terminal 23–100, break contacts 23(22–CKA), make contacts 23(22–CKB), 23(1–GC), 23(4–AC), 23(2–TE0) and (23(2–TE2) to the winding of relay 23–B2 to operate it. The C digit of 6 for the terminating office code is also stored in two-out-of-five code form in the terminating office code register of FIG. 2. This digit is translated from a two-out-of-five to a one-out-of-ten code form by the right-hand column of contacts and relays on FIG. 23 to effect the operation of relay 23–C6. The path over which this relay operates may be traced as follows: ground on terminal 23–101, break contacts 23(22–CKA), make contacts 23(22–CKB), 23(1–GC), 23(4–AC), 23(2–TF2) and 23(2–TF4) to the winding of relay 23–C6 to operate it.

The circuit of FIG. 45 translates the terminating office code and, in so doing, completes a path therethrough in the following manner: input terminal 45–100, make contacts 45(2–TD2), 45(2–TD7), terminal 45–D9, make contacts (45(23–B2), terminal 45–92, make contacts 45(23–C6), to output terminal 45–926 which represents a complete translation for terminating office code WA6.

Figure 45:
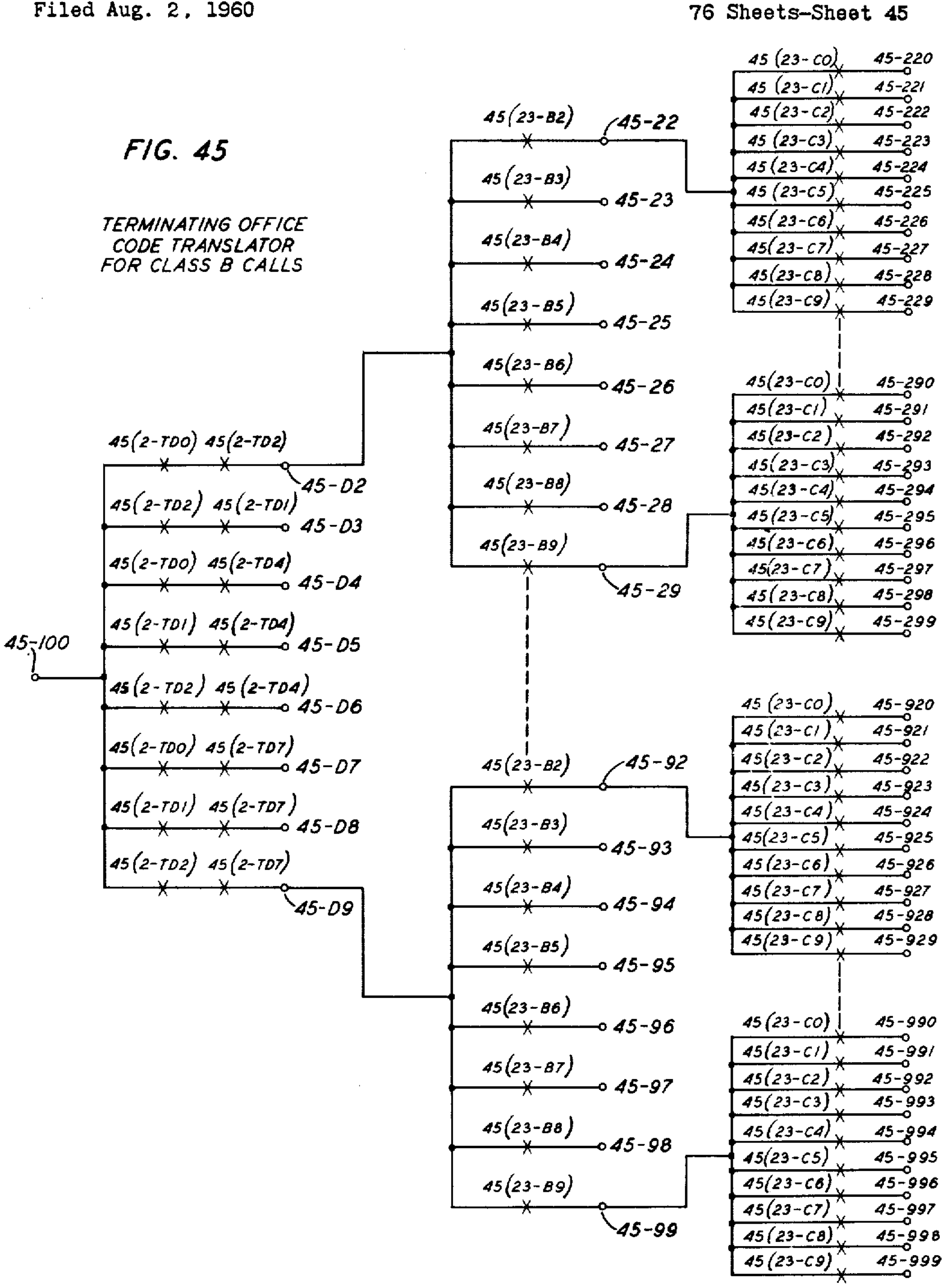
Figure 47:
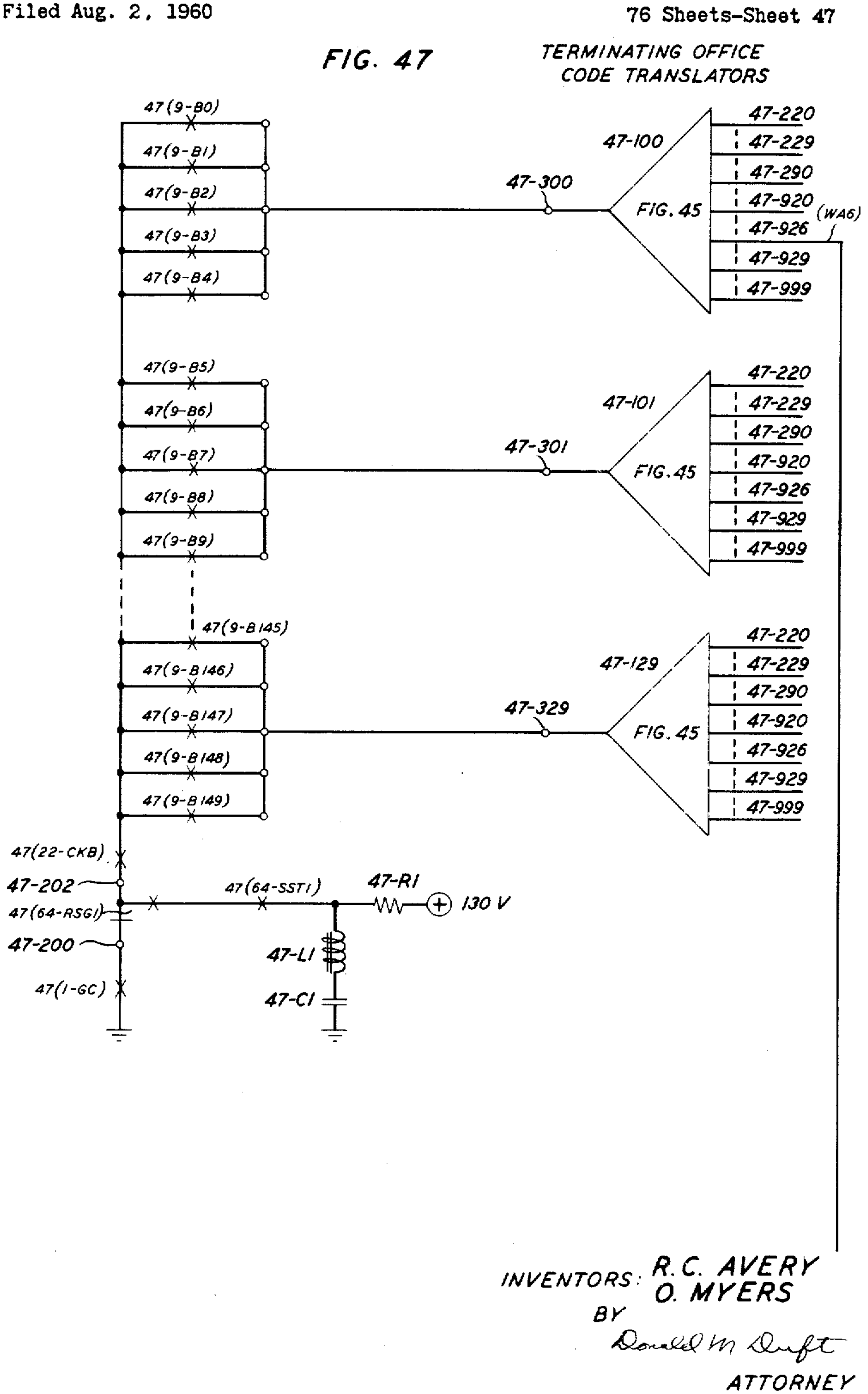

FIG. 47 discloses thirty triangles 47–100 through 47–129 (only three of which are shown) with each functionally representing a separate terminating office code translator as shown in detail on FIG. 45. Each such translator on FIG. 47 has its input connected to make contacts on five of relays 9–B0 through 9–B149. Specifically, the contacts of relays 9–B0 through 9–B4 are connected to the input of translator 47–100; the contacts of relays 9–B5 through 9–B9 are connected to translator 47–101, while the contacts of relays 9–B145 through 9–B149 are connected to translator 47–129. The contacts of relays 9–B10 through 9–B144 together with the translators associated therewith are not shown in detail on FIG. 47.

It has already been stated that relay 1–GC operated as the charge rater was seized. Therefore, the ground on make contacts 47(1–GC) may be extended therethrough, through break contacts 47(64–RSG1), make contacts 47(22–CKB), 47(9–B2), to terminal 47–300 and the input of the terminating office code translator 47–100. The ground on terminal 47–300 may be further extended through the translator to its output terminal 47–926 as explained in connection with FIG. 45.

*3.06 The coil field—First translation*

The output terminals of the thirty translators 47–100 through 47–129 are connected to wire jumpers which are selectively threaded through the coil field shown on FIGS. 49 through 58. Only the jumper connected to output terminal 47–926 of translator 47–100 is shown on the drawings in order to minimize their complexity. However, it is to be understood that in its commercial embodiment each and every output terminal of these translators may be connected to a jumper.

Figure 61:
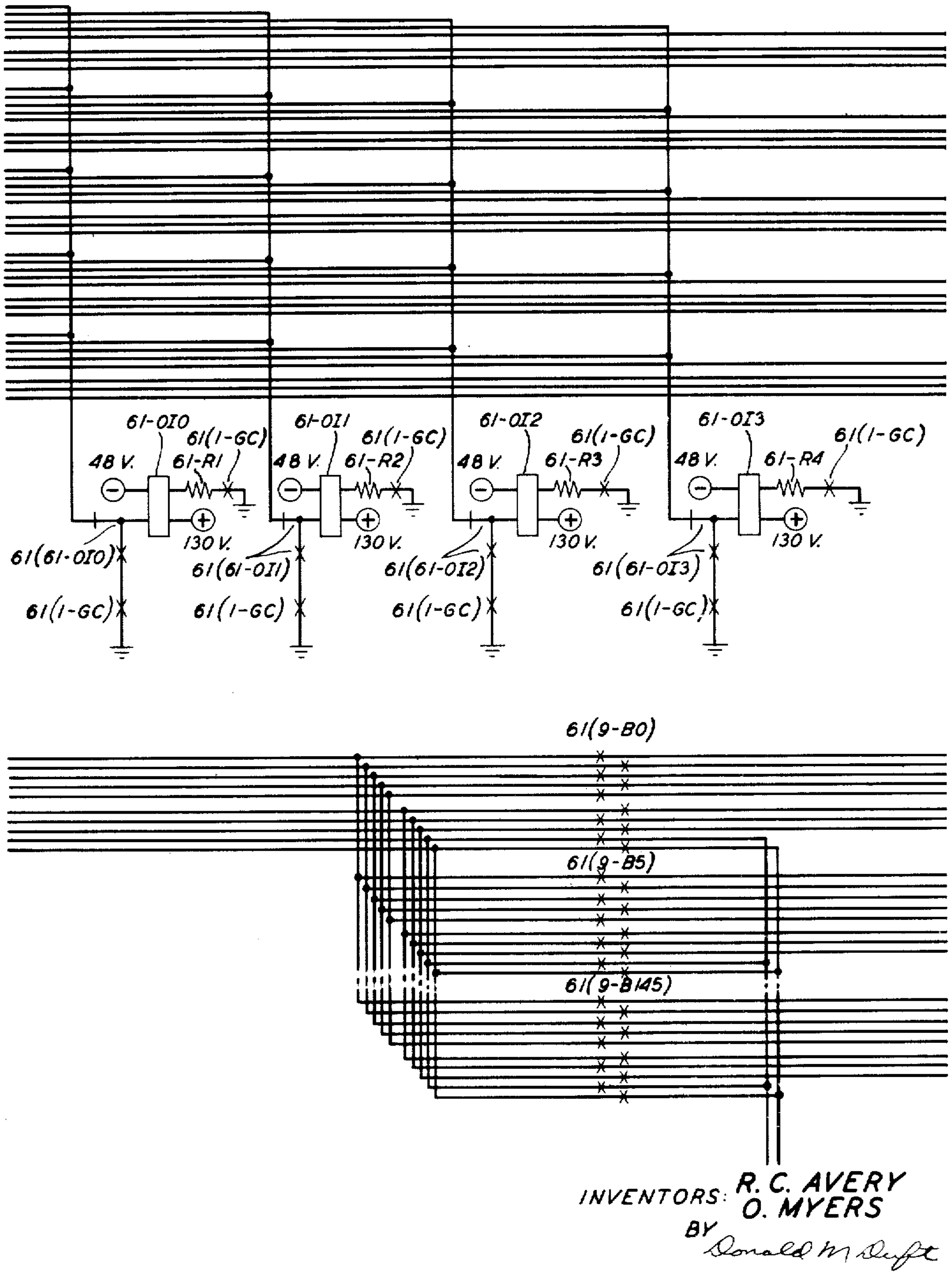

The coil field contains 50 coils divided into five sets of ten coils each with each coil representing one of digits 0 through 9. The outputs of the coil field are connectable by contacts on FIGS. 61 through 63 of relays 9–B0 through 9–B149, to output terminals on FIGS. 65, 66 and 67 which, in turn, are selectively cross-connected, as later described, to the terminating increment relays 66–TI0 through 67–TI7. These relays represent terminating increment values of 0 through 7, respectively.

Figure 49:
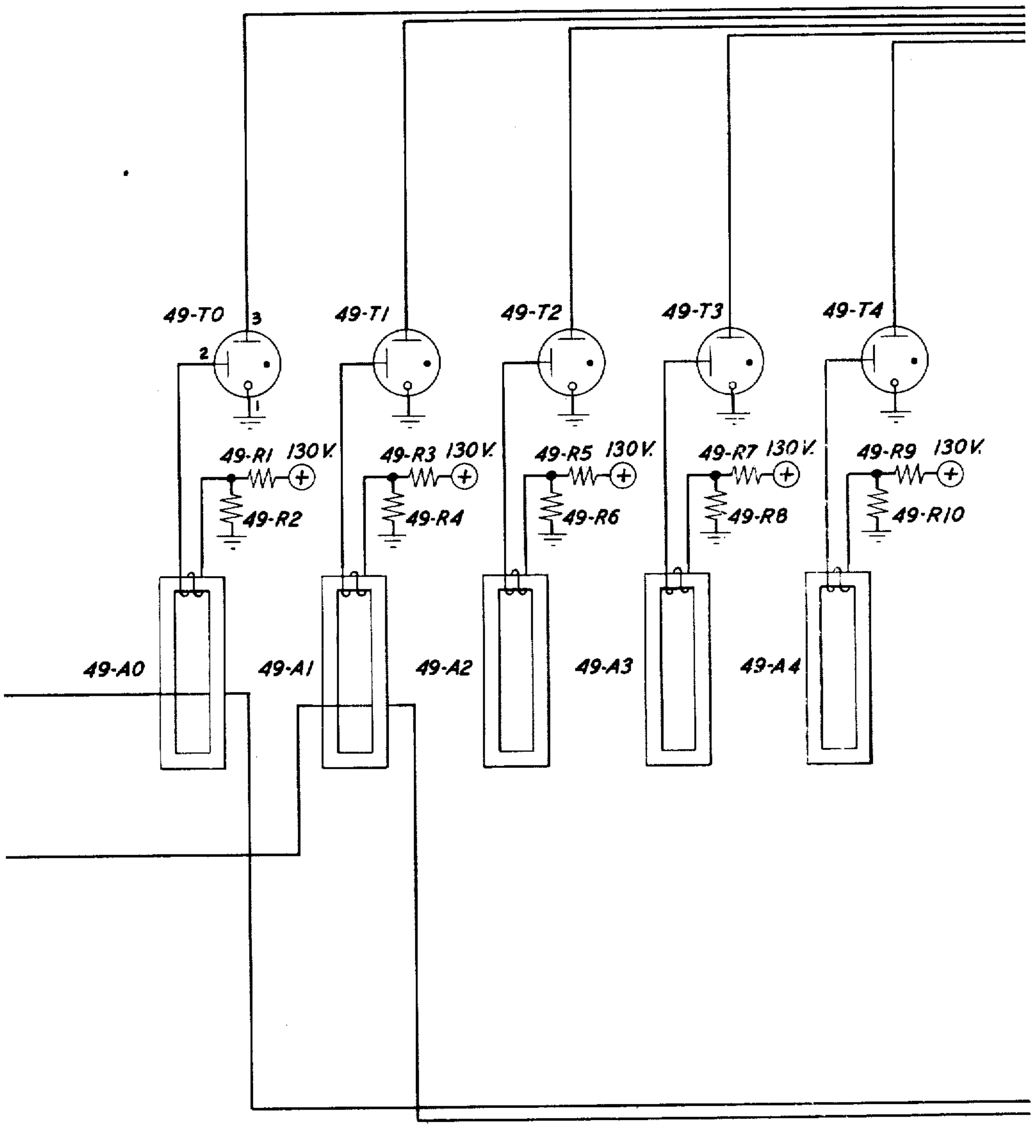
Figure 50:
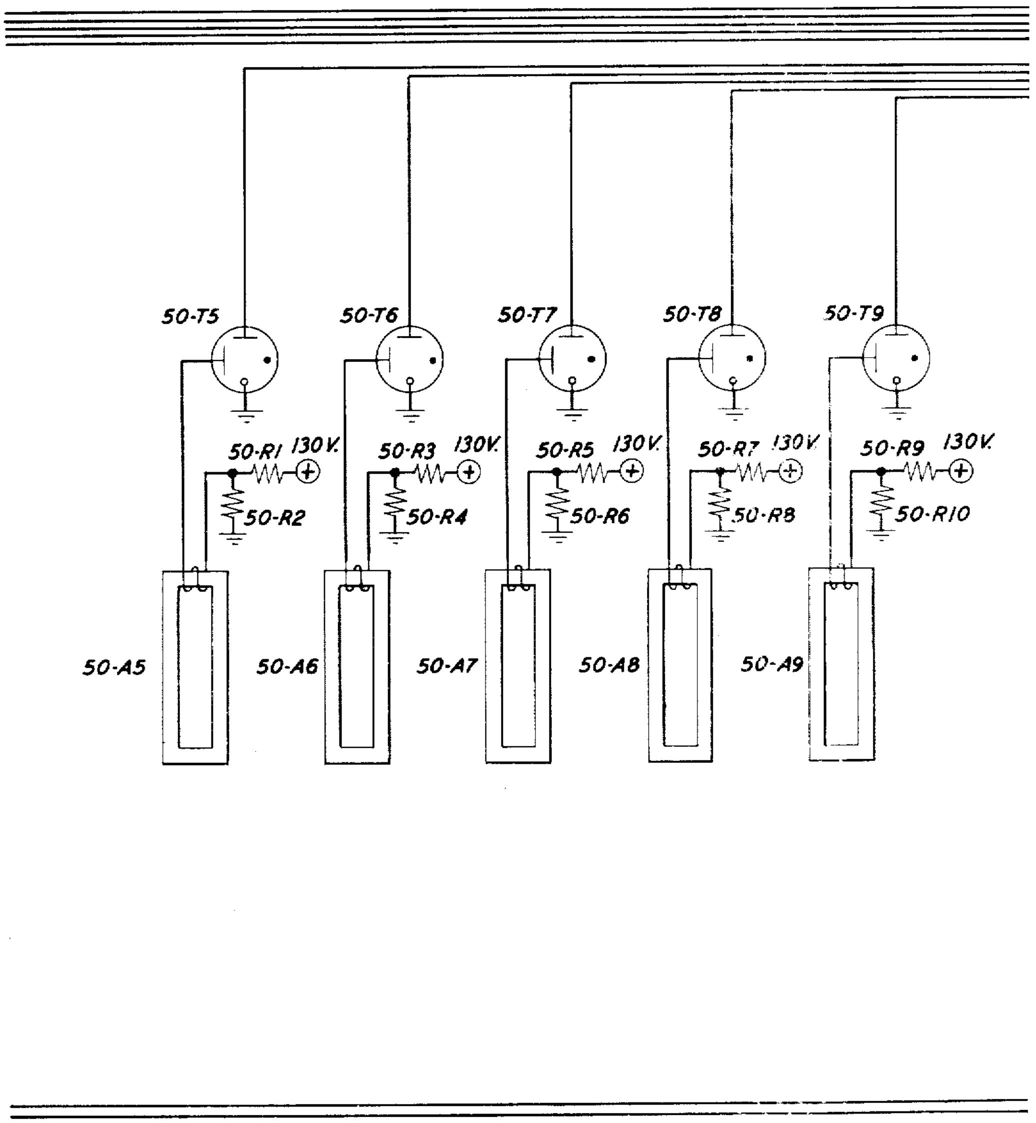

The relationship between the terminating office code translators on FIG. 47, the jumpers, the coil field on FIGS. 49 through 58, and relays 66–TI0 through 67–TI7 is similar to the corresponding circuits already described for class A calls and shown on FIGS. 25 through 41. Specifically, the relationship is such that the output terminal of each translator is effective to induce a surge current in its associated jumper which, in turn, attempts to fire the cold cathode tubes of all the coils through which it is threaded. However, as before, a tube can be fired across its main gap only when a positive potential is applied to its main anode. During this translation, the positive potentials for the cold cathode tubes are supplied through the windings of relays 63–VTC, 63–DNC, and 66–TI0 through 67–TI7. The positive potentials from the windings of these relays are connectable to the main anodes of the cold cathode tubes by contacts on FIGS. 61 through 63 of relays 9–B0 through 9–B149. Each 9–B– relay, when operated, connects these positive potentials to only ten of the fifty tubes in the coil field. For example, the ten tubes on FIGS. 49 and 50 are connectable to the positive potentials on the windings of these relays by the contacts on FIG. 61 of relay 9–B0, 9–B5, and every fifth such relay through relay 9–B145. Similarly, each of the other groups of ten tubes each are conectable to the positive potentials on the windings of the same relays by contacts on FIGS. 62 and 63 of other 9–B– relays.

Only one of the relays 9–B0 through 9–B149 may be operated at any one time and, therefore, only the main anodes of the ten cold cathode tubes associated therewith will have positive potentials applied thereto. It has been assumed, for example, that relay 9–B2 is operated for the current call. This being the case, the positive potentials from the windings of relays 63–VTC, 63–DNC, 66–TI0 through 67–TI7 are connected through contacts 62(9–B2) to the main anodes of the ten tubes shown on FIGS. 53 and 54. The main anodes of the other tubes have no potential on them at this time. As a result, a surge of current through a jumper is effective at this time to fire only its associated tube on FIG. 53 or 54. In short, a surge of current through a jumper does not succeed in firing all the tubes associated with the jumper, but instead, fires only a single tube depending upon which one of relays 9–B0 through 9–B149 is operated.

It should be appreciated at this point that output terminal 47–926 of translator 47–100 represents a translation for office code 926 (WA6) in all of class B areas 0 through 4 since the input of this translator is connected to the contacts of relays 9–B0 through 9–B4. Similarly, the output terminals 47–926 on the other translators represent a translation for the office code 926 in the five class B areas associated therewith. Referring only to translator 47–100 together with the contacts of its associated relays 9–B0 through 9–B4, it may be seen that the main anodes of tubes 49–T0 through 50–T9 are connectable to the terminating increment output relays by make contacts on FIG. 61 of relay 9–B0. Similarly, the main anodes of tubes 51–T0 through 52–T9 are connectable to the terminating increment output relays by contacts of FIG. 62 of relay 9–B1. The main anodes of tubes 53–T0 through 54–T9 are connectable to the terminating increment output relays by contacts on FIG. 62 of relay 9–B2. In a similar manner, the outputs of tubes 55–T0 through 56–T9 and 57–T0 through 58–T9, respectively, are connectable to the terminating increment output relays by the contacts on FIGS. 62 and 63 of relays 9–B3 and 9–B4, respectively. In other words, the contacts of the same 9–B– relay which is effective to energize the input of translator 47–100 on FIG. 47 is also effective to interconnect the outputs of only a particular set of ten coils of the coil field to relays 63–VTC, 63–DNC, and 66–TI0 through 67–TI7 so that a subsequent surge of current over a jumper associated with this class B area is effective to derive the terminating increment associated therewith and enter this value in the terminating increment relays 66–TI0 through 67–TI7. The purpose of relays 63–VTC and 63–DNC is described later.

The previously described ground on output terminal 47–926 of translator 47–100 is transmitted over the jumper connected thereto which is threaded through the following coils: 49–A1, 51–B4, 54–C6, 56–D7 and 58–E9. The other end of this jumper is connected to terminal 64–100 and the winding of relay 64–RSG1. Relay 64–RSG1 is operated by the ground on the jumper and in operating closes a holding path for itself through make contacts 64(64–RSG1) and 64(1–GC) to ground. Relay 64–RSG1 in operating closes a path to operate relay 64–SST1 from ground, through make contacts 64(1–GC), 64(64–RSG1), to the winding of relay 64–SST1.

Condenser 47–C1 is normally charged to a positive 130-volt potential through inductance 47–L1 and resistor 47–R1. The combined operation of relays 64–RSG1 and 64–SST1 disconnects direct ground from terminal 47–202 and completes a path to discharge condenser 47–C1 through inductance 47–L1, make contacts 47(64–SST1), 47(64–RSG1), 47(22–CKB), 47(9–B2), through the terminating office code translator 47–100, through the jumper connected to its output terminal 47–926, to the holding ground on terminal 64–100. The surge current through this jumper attempts to fire the cold cathode tube of every coil through which it is threaded. However, only the set of coils on FIGS. 53 and 54 has the main anodes of its tubes connected to relays 63–VTC, 63–DNC and 66–TI0 through 67–TI7 at this time via the contacts of relay 9–B2 and, thus, only the tubes of this group can be fired. Since this jumper is only threaded through coil 54–C6 in this group of ten coils, only tube 54–T6 fires at this time. The main anode 3 of tube 54–T6 is connected through break contacts 59(22–OTK) and make contacts 62(9–B2) to output terminal 66–B2–6 on FIG. 66.

Since the designation of this terminal is somewhat complicated, a brief description may be in order. The digits 66 indicate that the terminal is found on FIG. 66. The B2 portion of the designation indicates that the terminal is associated with class B area 2. The –6 portion of the designation indicates that the terminal represents an output from the number 6 coil in the coil group to which it is connectable. This terminal is contained in the group of terminals designated 66–B2–0 through 66–B2–7 which are connectable by contacts on FIG. 62 of relay 9–B2 to the outputs of coils 53–C0 through 54–C7, respectively. There are a plurality of such terminal groups on FIGS. 65, 66 and 67, with each group representing an individual class B area and being connectable by contacts on FIGS. 61 through 63 of one of relays 9–B0 through 9–B149 to the outputs of an associated coil group.

Figure 65:
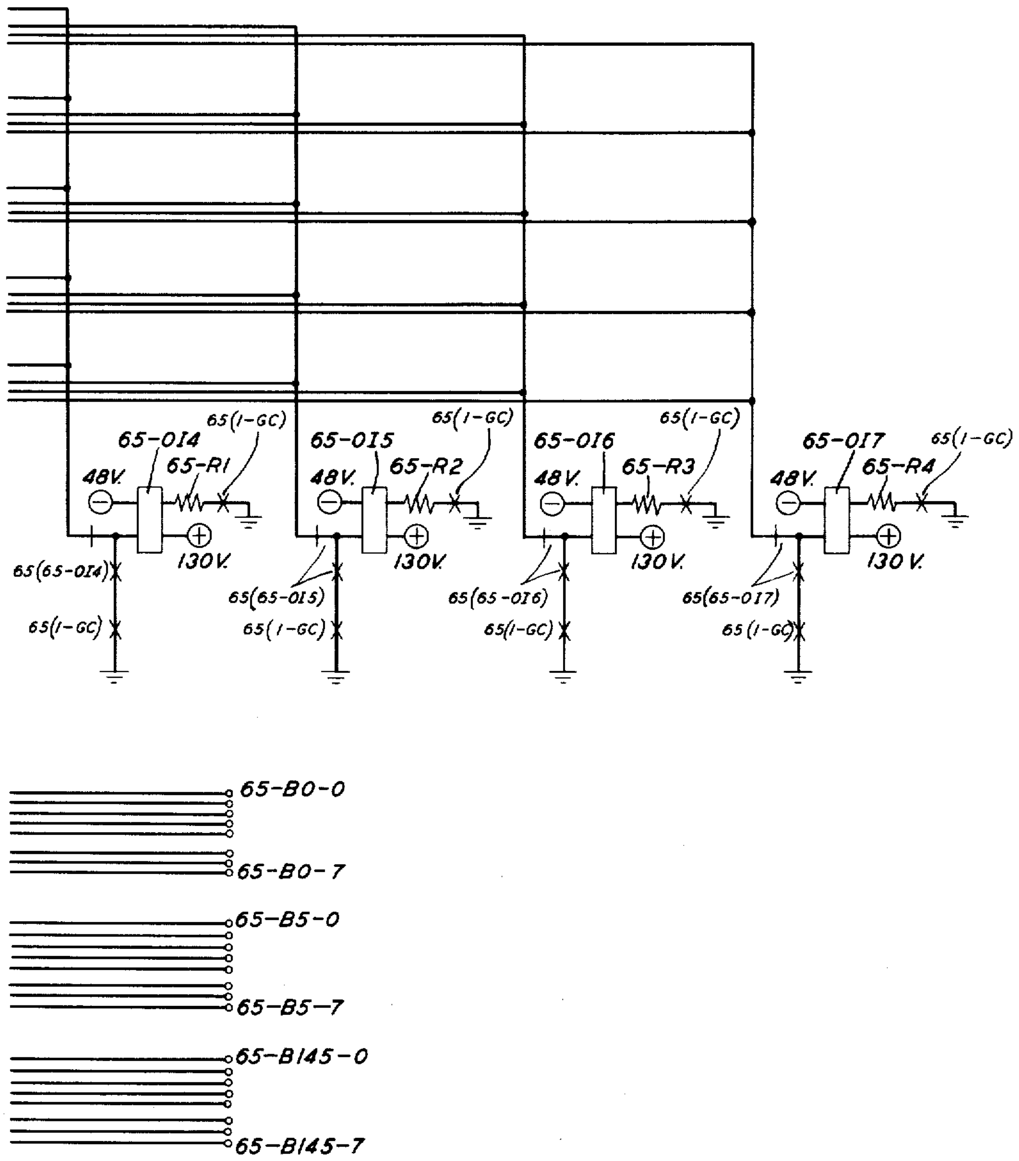
Figure 66:
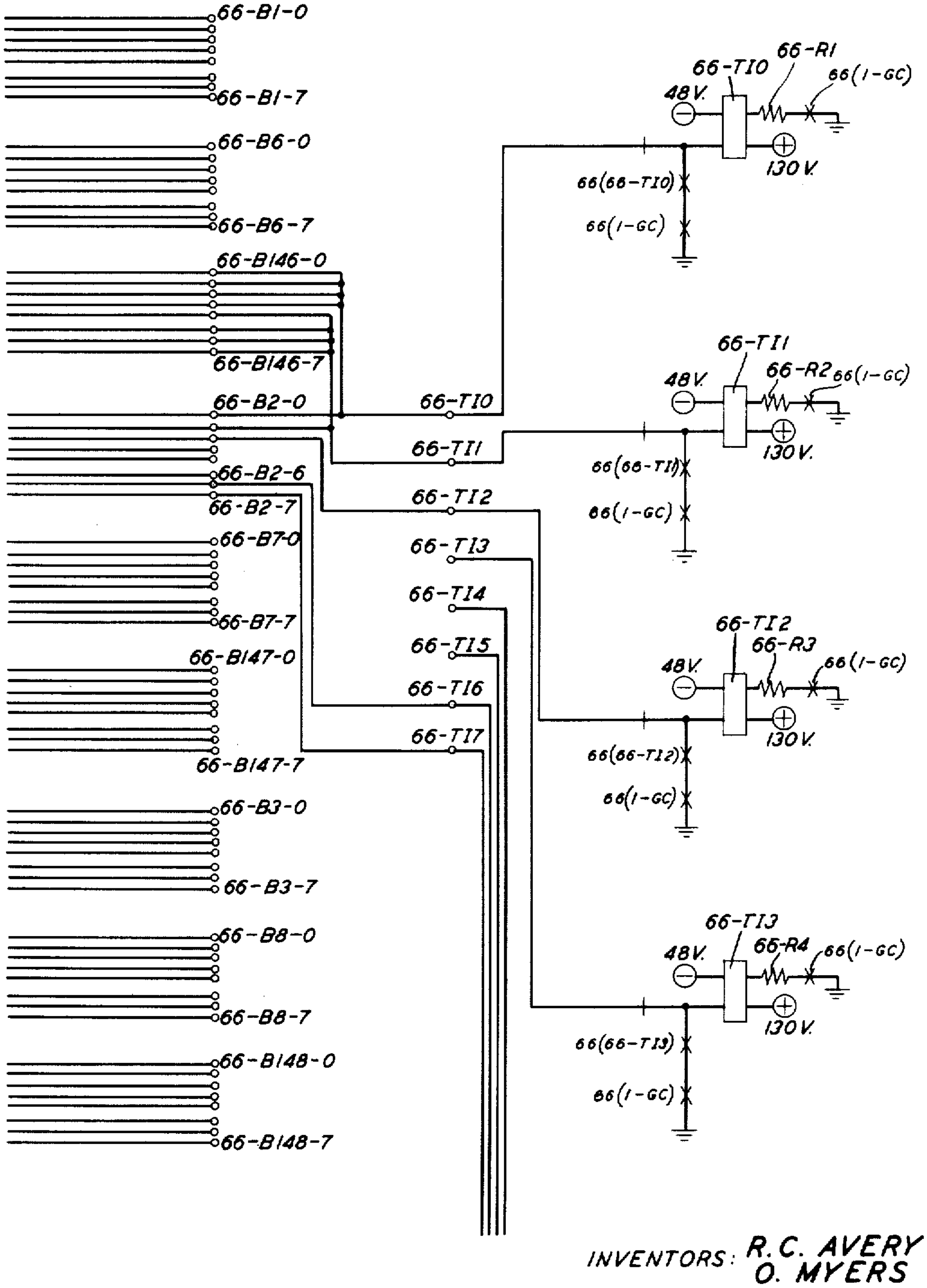

Referring to the terminals on FIG. 66 which are associated with class B area 2, it may be seen that terminal 66–B2–0 is connected to terminal 66–TI0 and the winding of terminating increment relay 66–TI0, while the remaining terminals in the same group, such as 66–B2–6, are connected to operate a correspondingly designated terminating increment relay 66–TI–. Thus, terminal 66–B2–6 is cross-connected to operate relay 67–TI6. It is expected that most of the other groups of terminals on FIGS. 65 through 67 will be similarly connected. Cross-connections of this type would be used for each class B area sufficiently large so that it may be divided into eight terminating increments for charging purposes.

However, there are other types of cross-connections possible when the size of the class B area is such that it would not be feasible to divide it into eight terminating increment areas. Specifically, some terminating class B areas such as, for example, area 617 which presently represents the city of Boston and its suburbs, are so small geographically that it may be suitable for charging purposes to only have two terminating increments for such areas.

Figure 51:
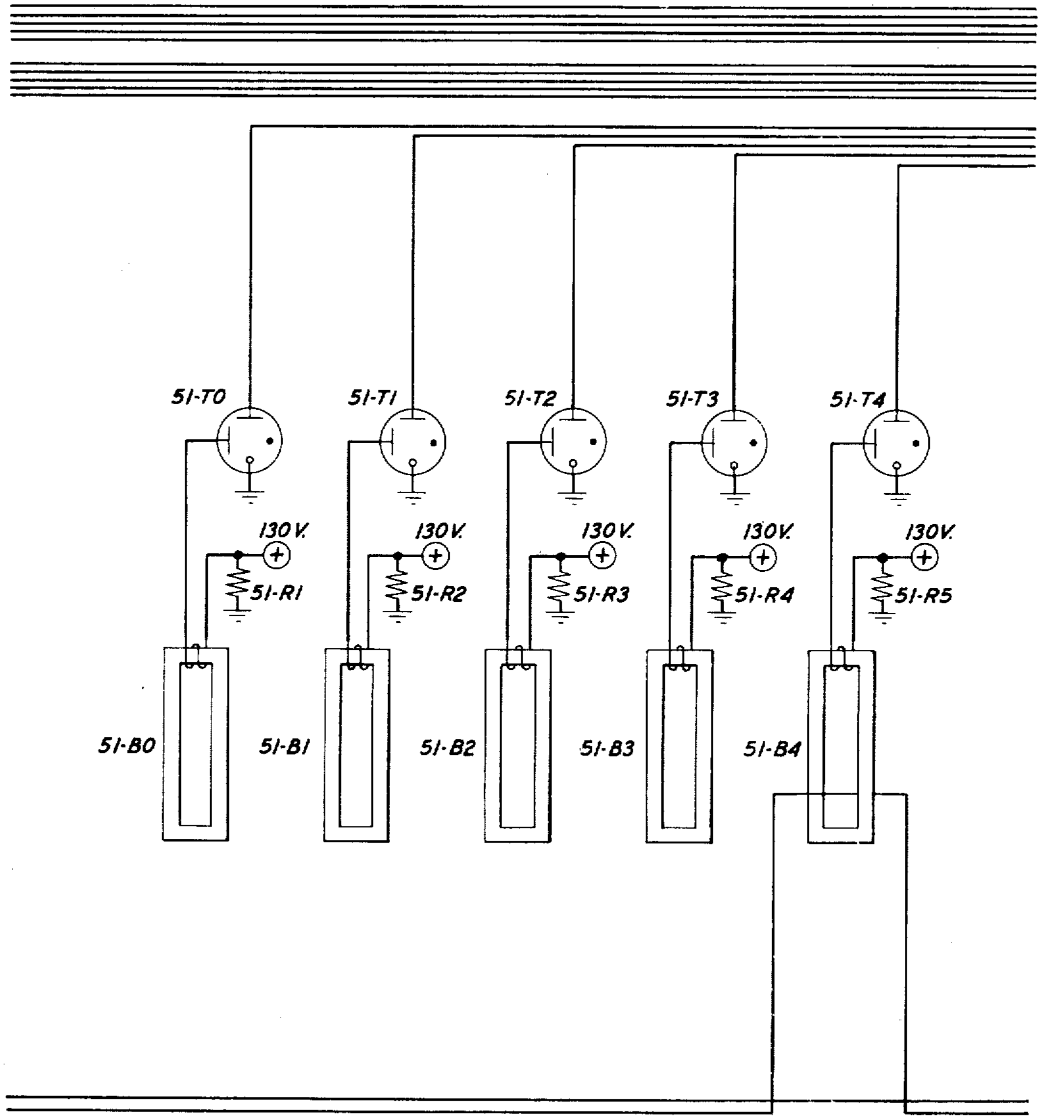
Figure 52:
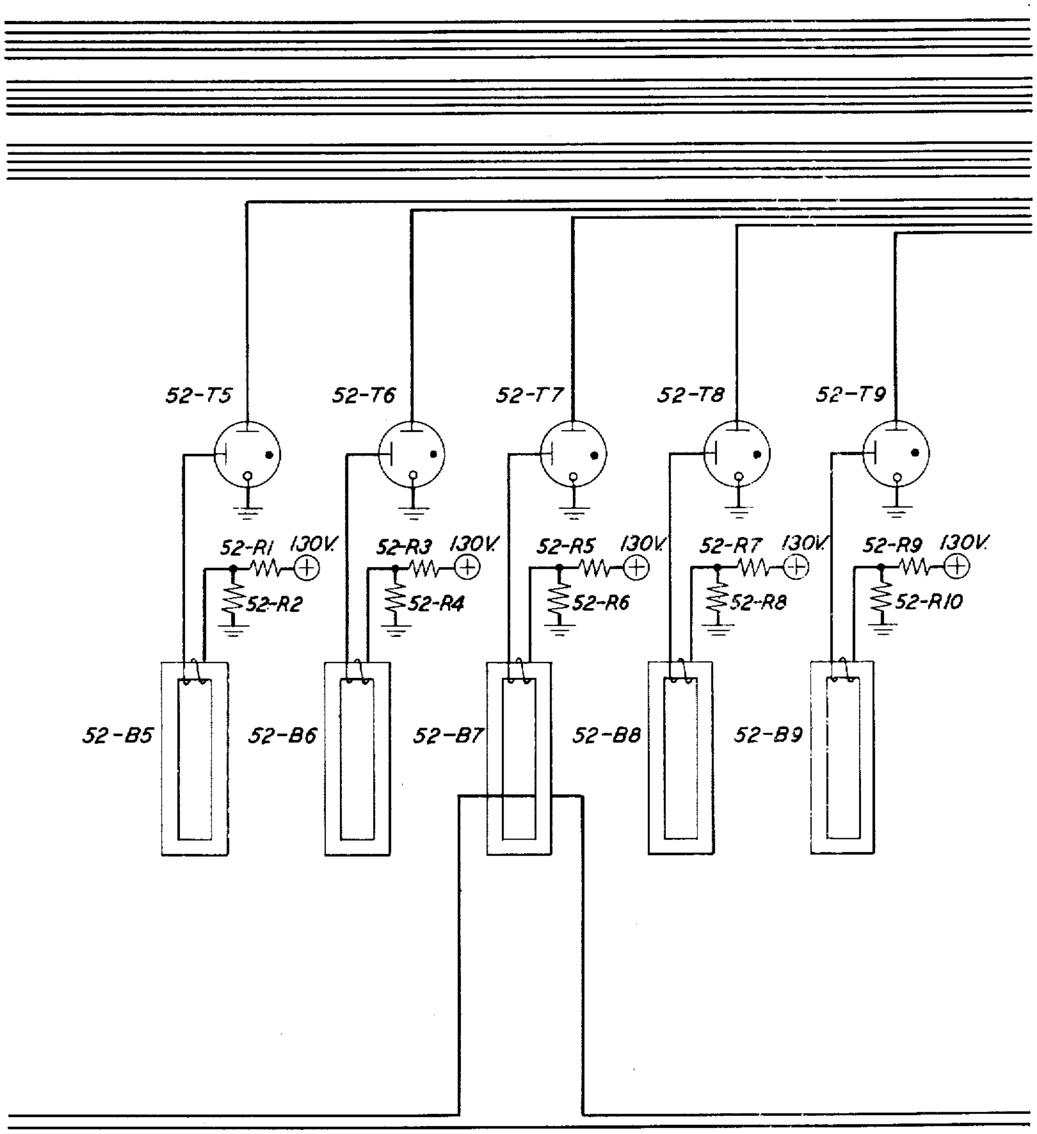
Figure 53:
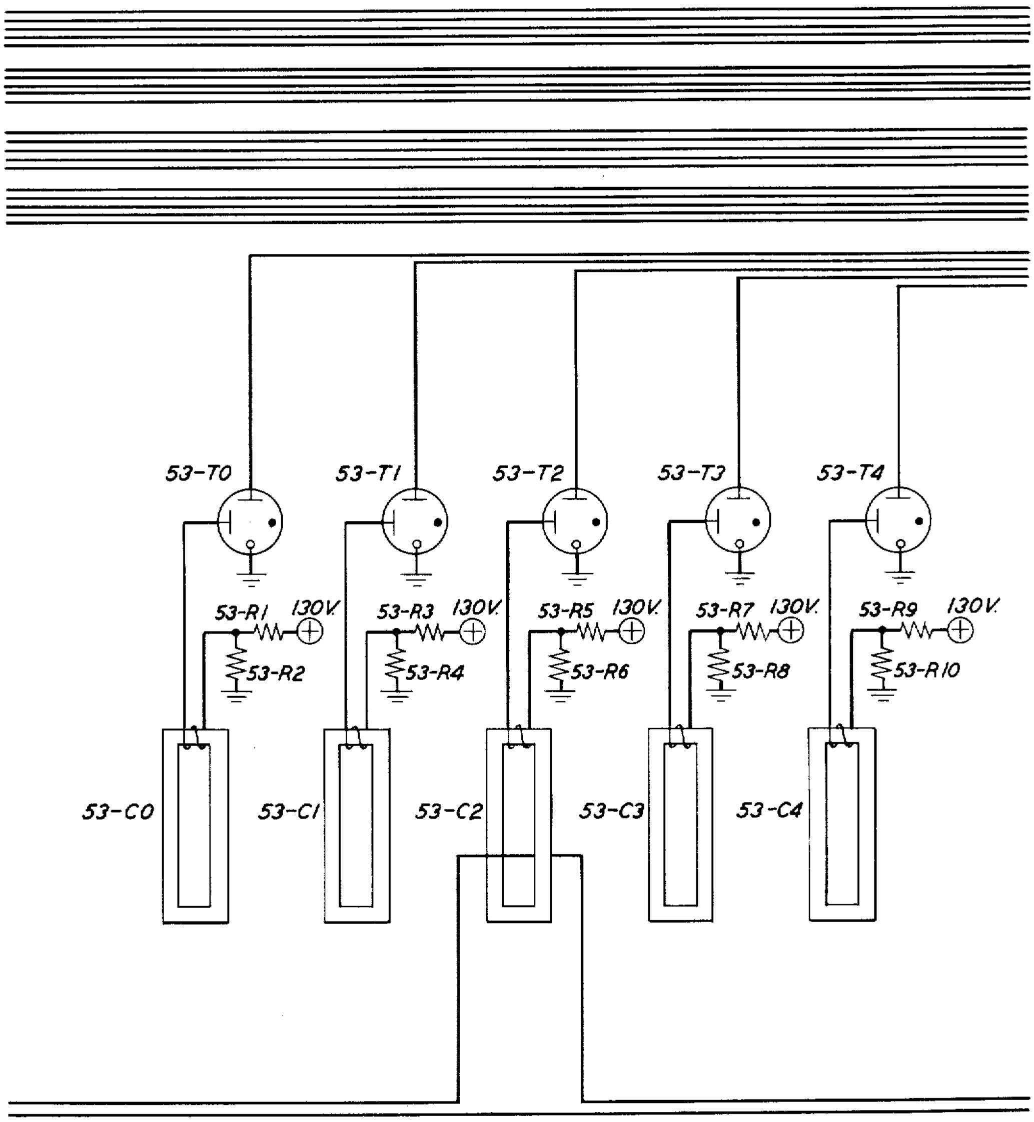
Figure 54:
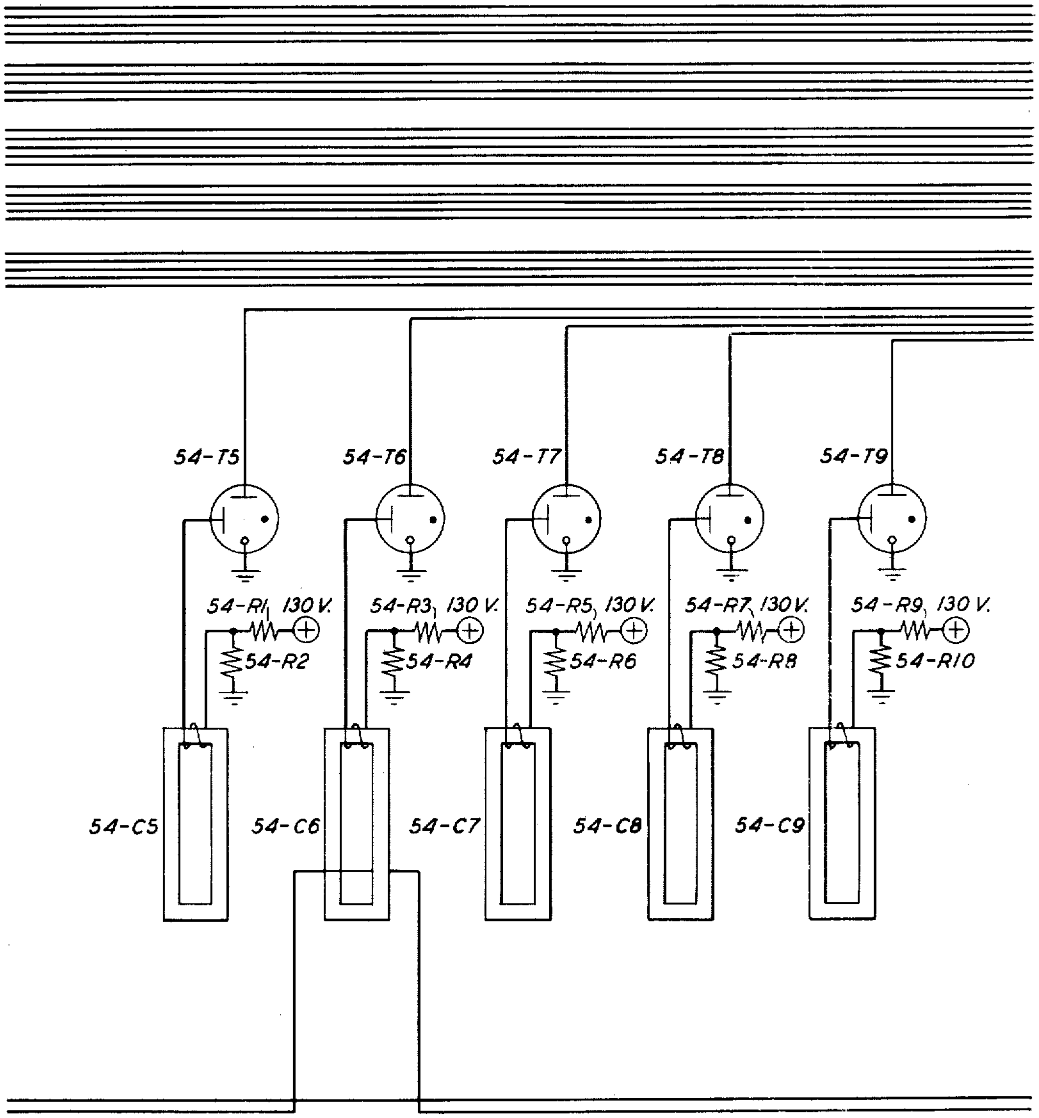
Figure 55:
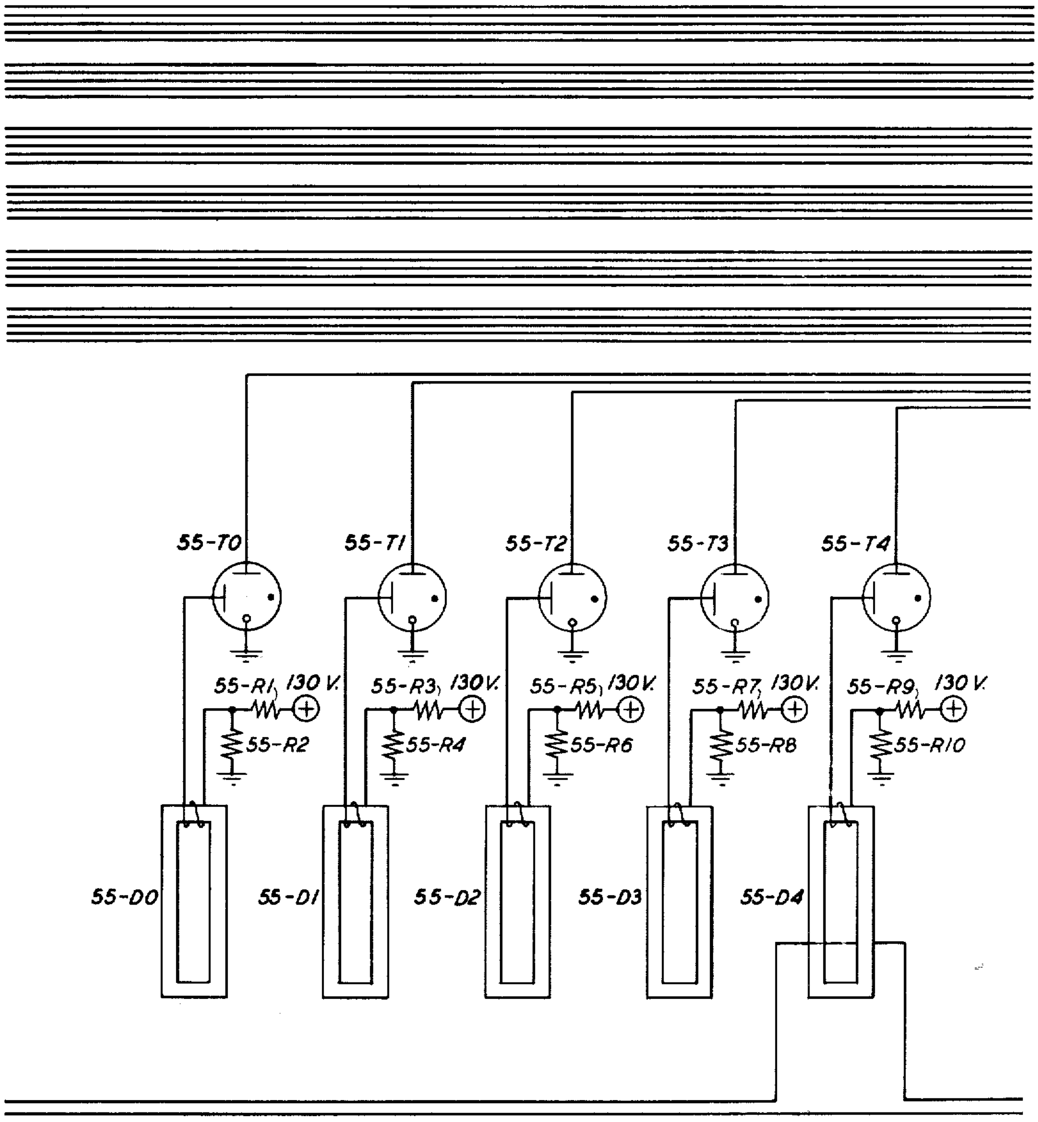
Figure 56:
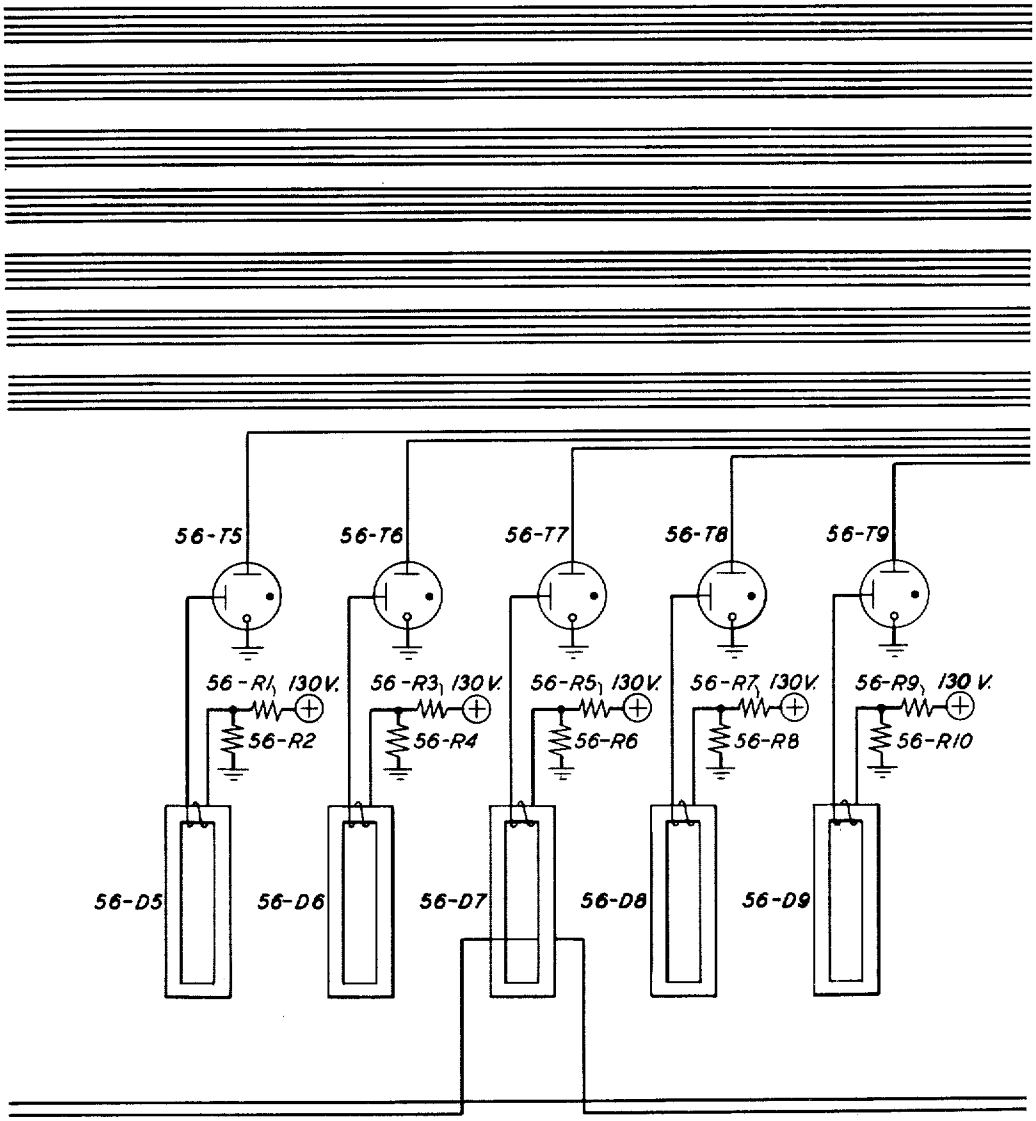
Figure 57:
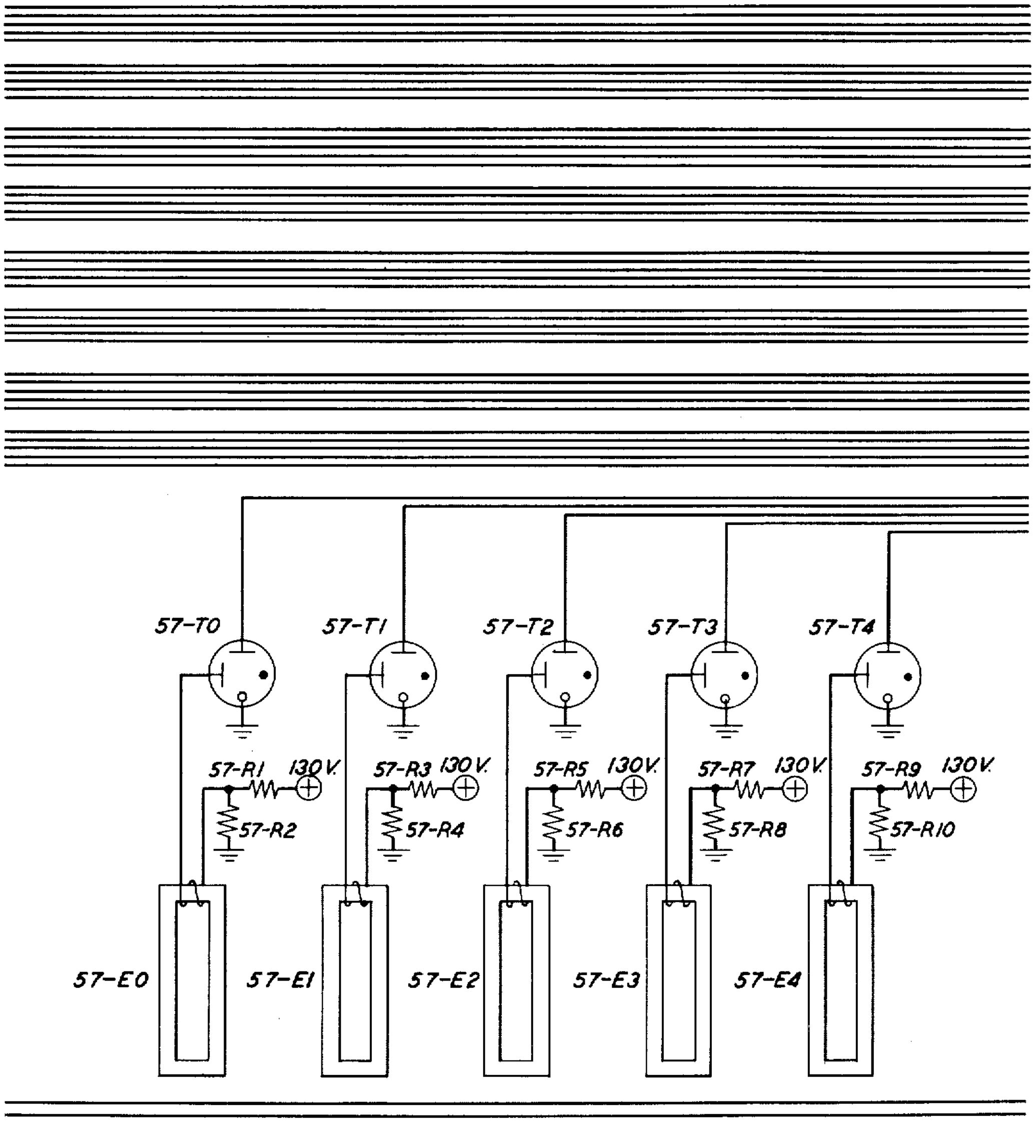
Figure 58:
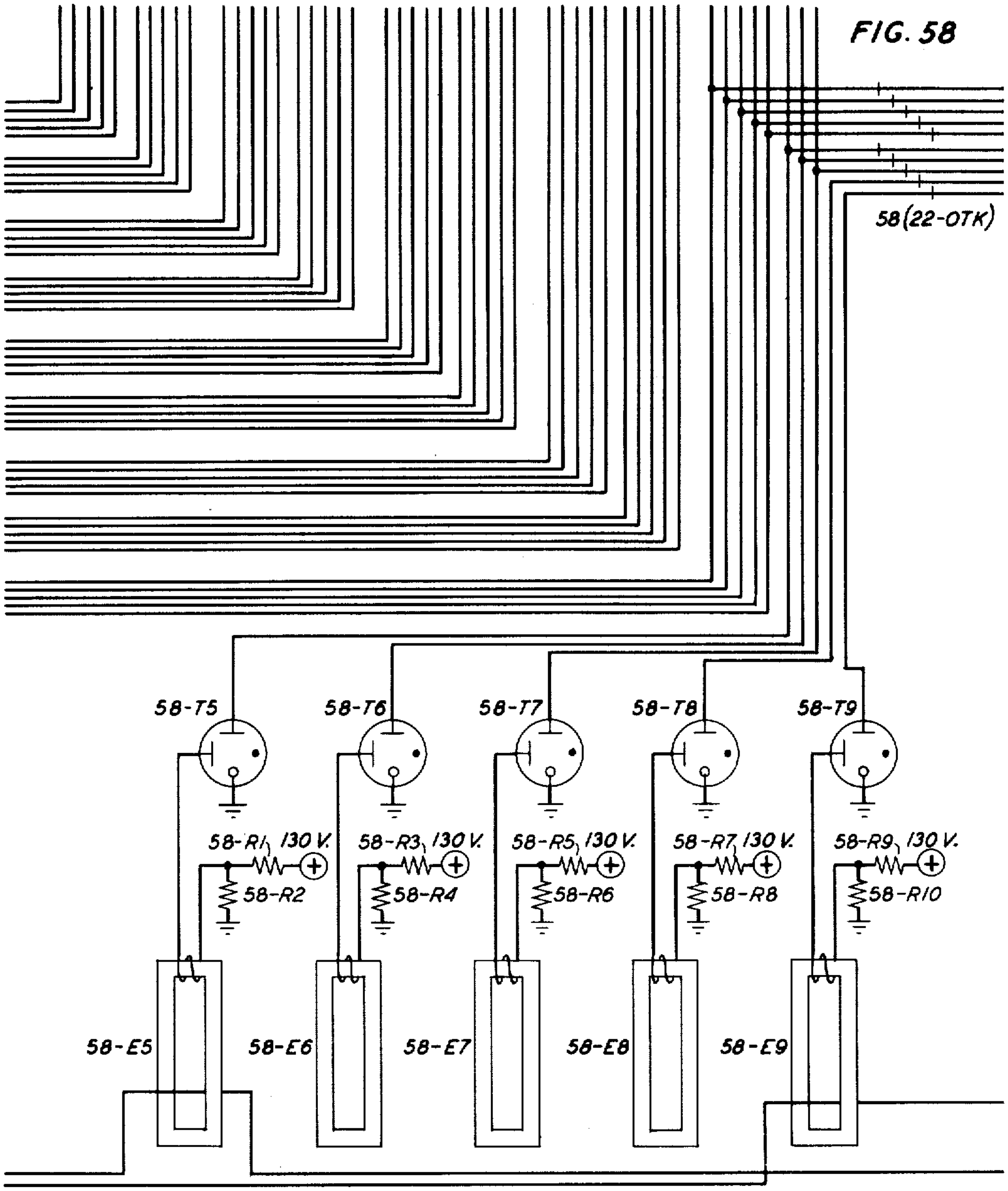
Figure 59:
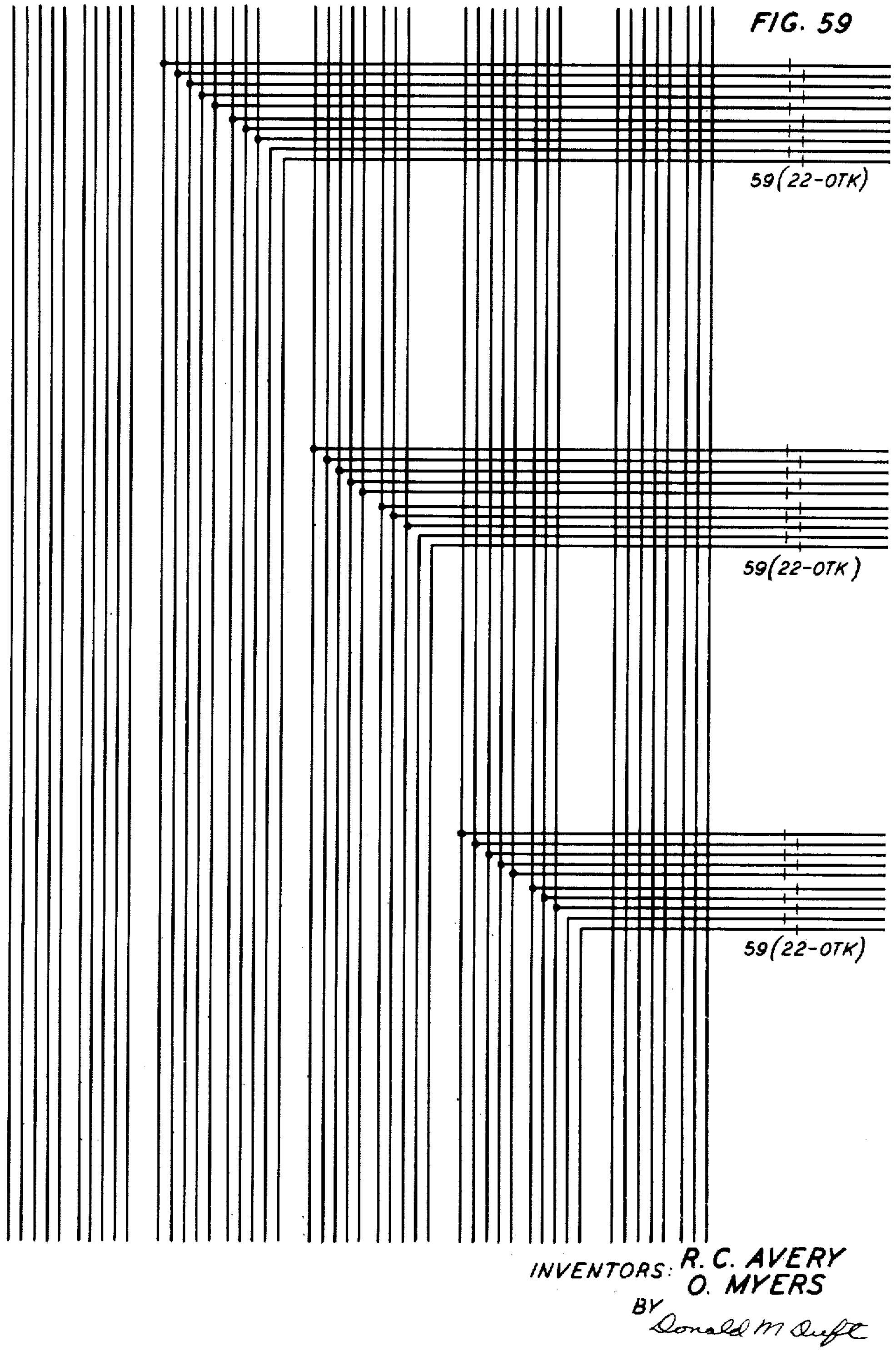
Figure 60:
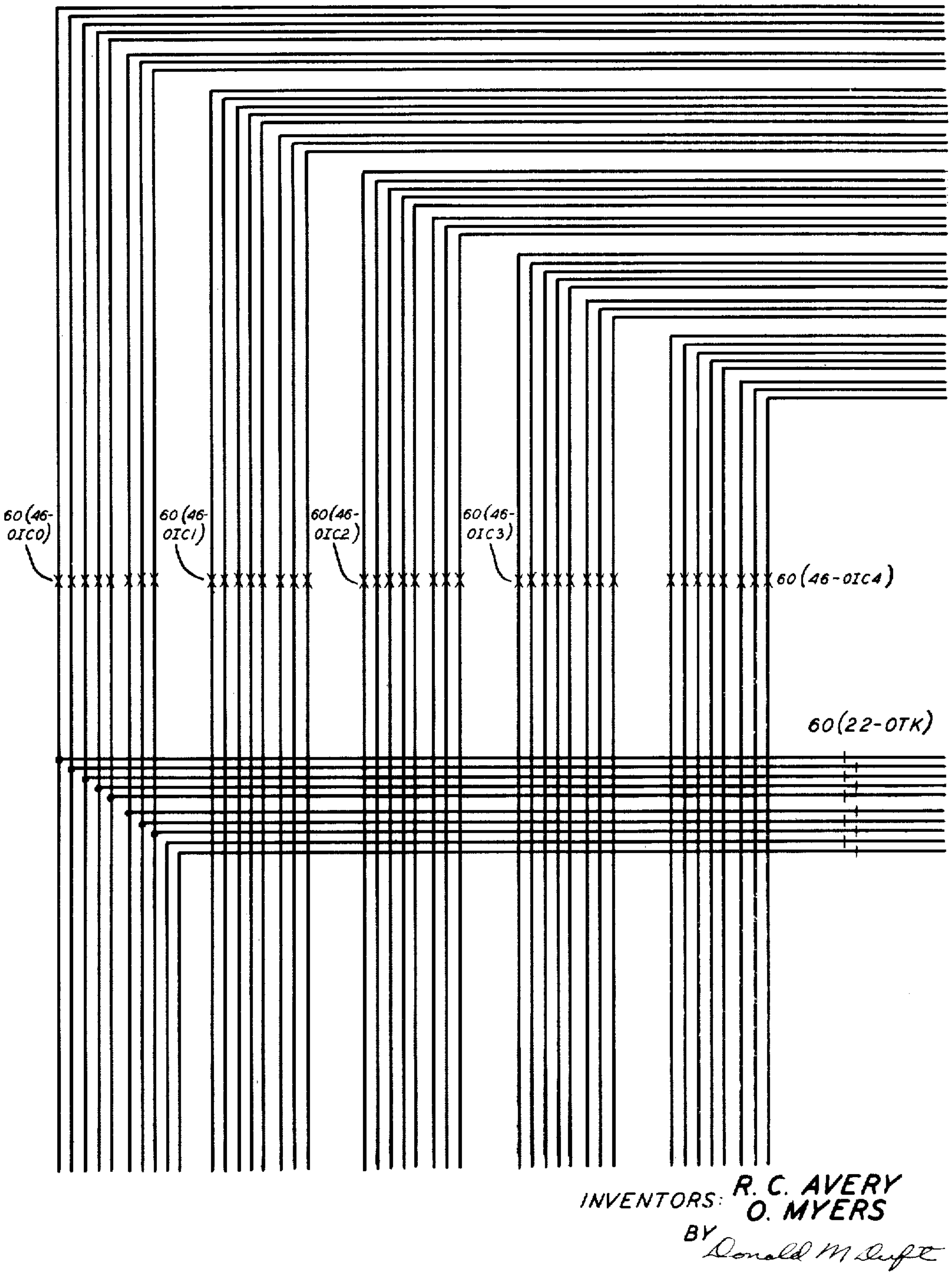
Figure 62:
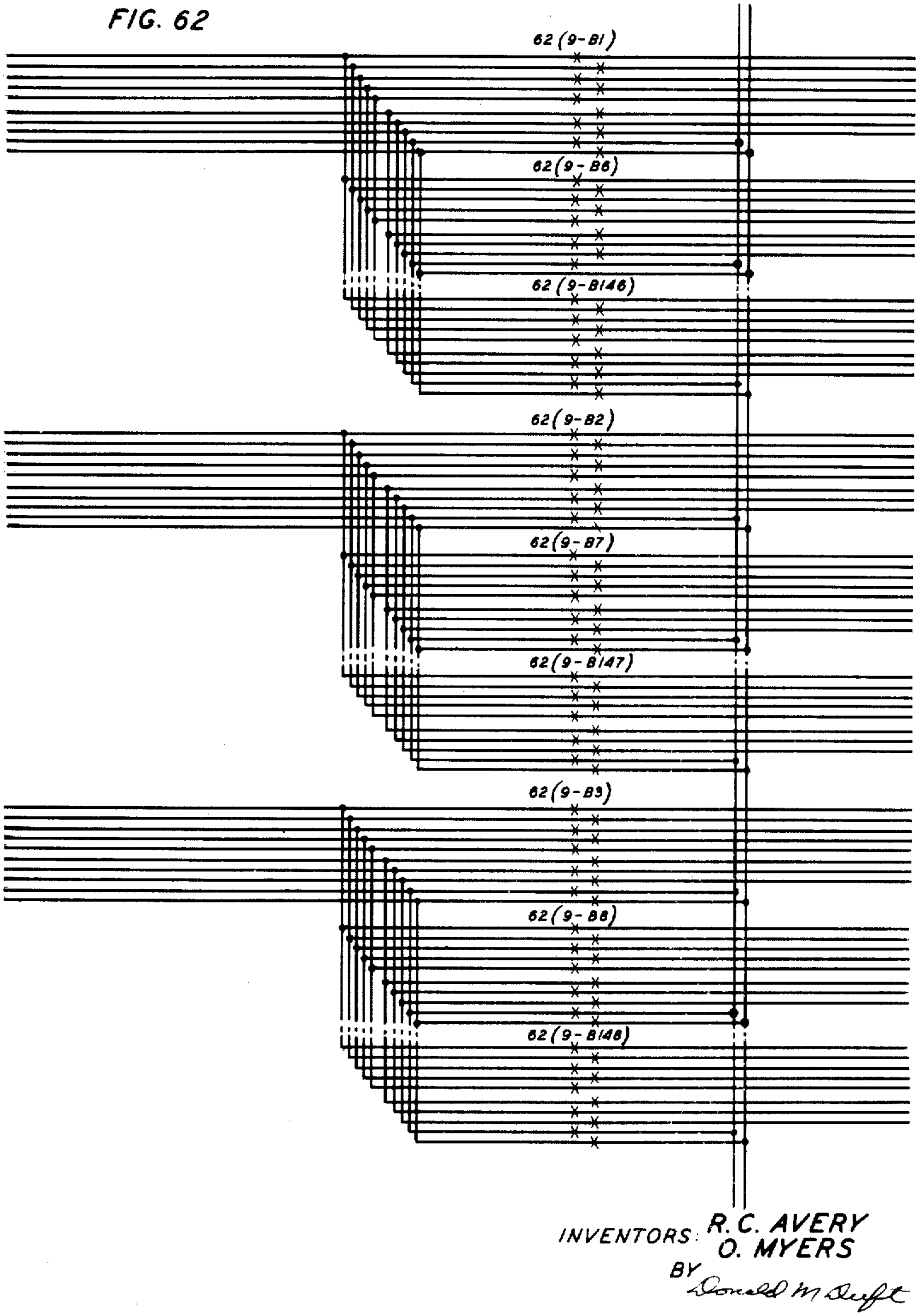
Figure 63:
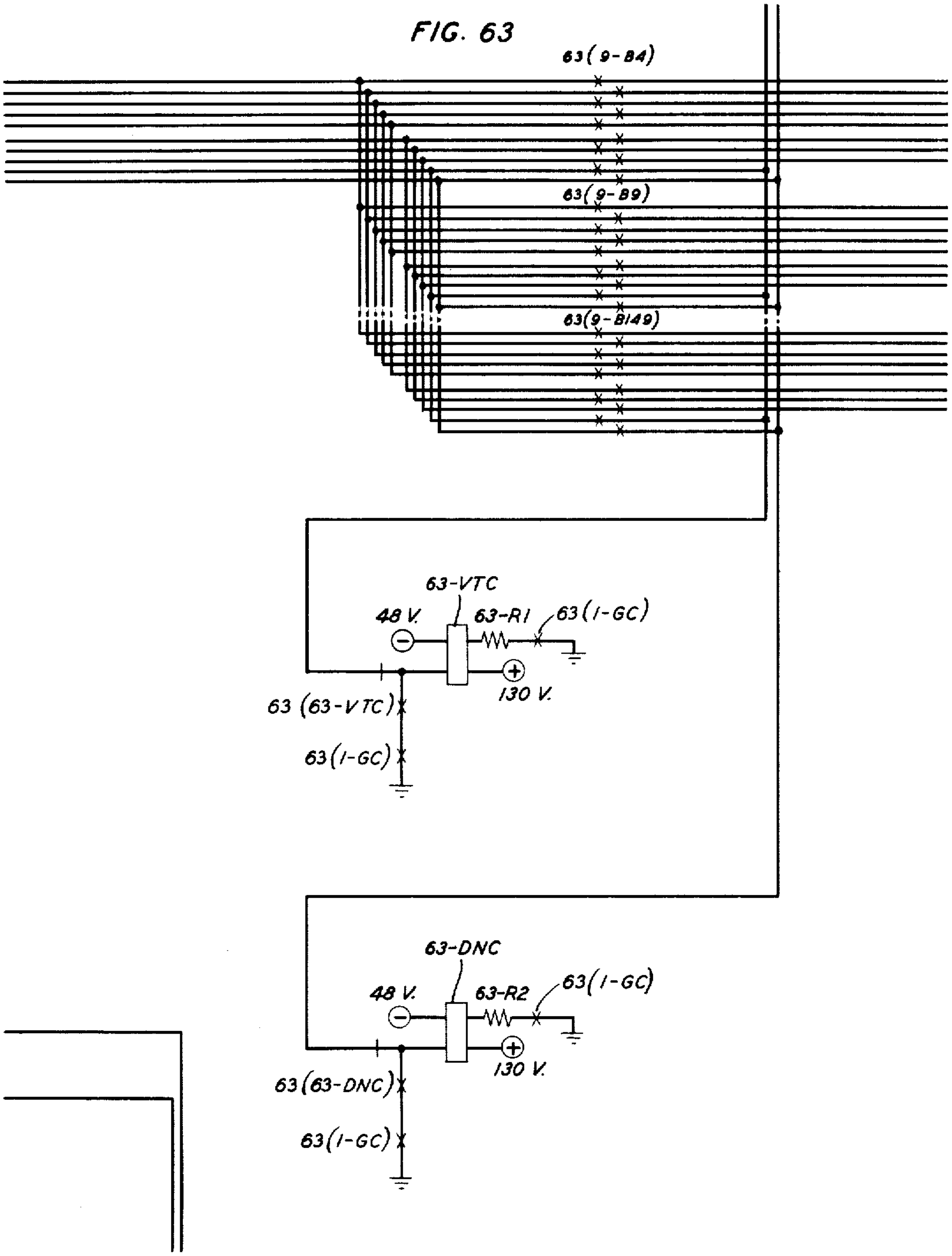
Figure 64:
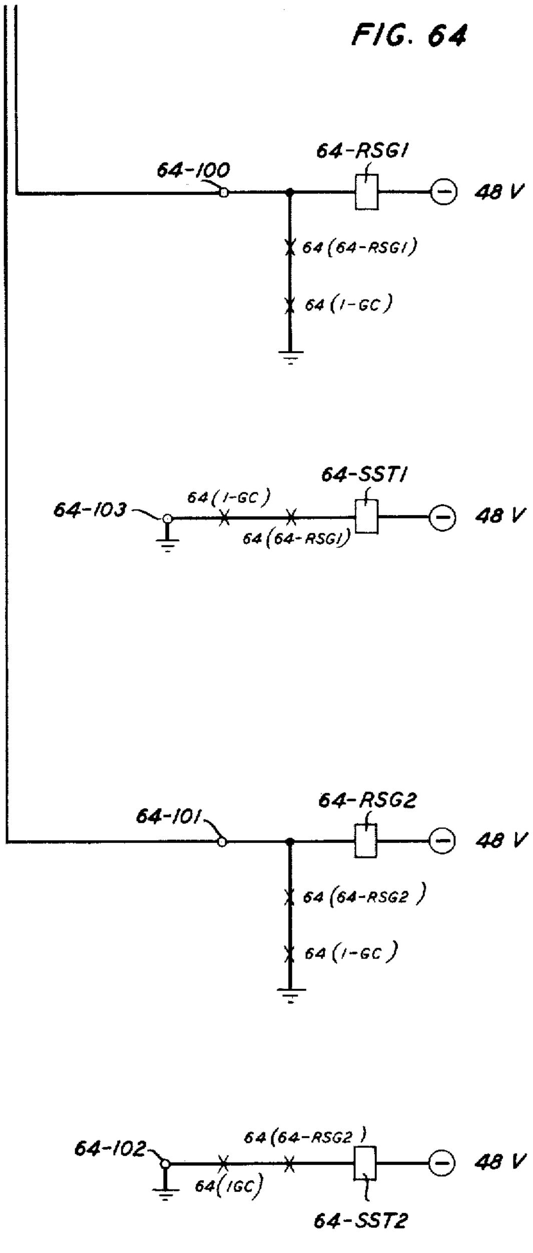

Forgetting the presently described call for the moment in order to describe this condition in somewhat greater detail, let it be assumed that class B area 146 represents national area 914 for which calls thereto will have only terminating increments 0 and 1. Referring to FIGS. 62, 51 and 52, it may be seen that the terminating increment for class B area 146 will be derived by jumpers threaded through the coils on FIGS. 51 and 52 when relay 9–B146 is operated. Since this class B area will have only terminating increments 0 and 1, all jumpers representing working office codes in this area, of necessity, would normally have to be threaded through coils 51–B0 or 51–B1 in order to derive the terminating increments 0 and 1, respectively. The same set of ten coils is also associated with class B areas 1, 6, 11, 16, 21, 26, 31 . . . 141 and therefore, the jumpers representing working office codes in all of these areas will be threaded through various coils in the same group. The commercial embodiment of these coils is of limited size and, as a result, a limited number of jumpers can be threaded therethrough. Thus, the jumper capacity of coils 51–B0 and 51–B1 might well be exceeded if all the jumpers for class B area 146 had to be threaded therethrough in addition to the normal quantity of jumpers which will be threaded therethrough for the other class B areas associated with the same coil group.

Congestion of this type may be avoided by the following procedure. The jumpers representing working office codes in class B area 146 (national area 914) may be threaded through any of coils 51–B0 through 51–B3 for a terminating increment of 0 or coils 51–B4 through 52–B7 for a terminating increment of 1. Next, the output terminals 0 through 3 on FIG. 66 associated with class B area 146 are strapped and connected to operate terminating increment relay 66–TI0 while terminals 4 through 7 are strapped and, in turn, connected to terminating increment relay 66–TI1. Thus, when relay 9–B146 is operated, the firing of any of tubes 51–T0 through 51–T3 will derive a terminating increment of 0 while the firing of any of tubes 51–T4 through 52–T7 will derive a terminating increment of 1. This arrangement permits the jumpers for the working office codes in class B area 146 to be threaded through a greater number of coils on FIGS. 51 and 52 and, thus, prevents the overloading of the jumper capacity of any one coil. Similar strapping of terminals and assignment of coils may be made for terminating increment ranges of 0 through 3, 0 through 4, et cetera.

Returning now to the class B call being described, it has been explained how the surge current over the jumper connected to terminal 47–926 of translator 47–100 effects the discharge of the tube 54–T6. It was further explained how the main anode of tube 54–T6 is connected through break contacts 59(22–OTK) and make contacts 62–9–B2 to output terminal 66–B2–6. This terminal is cross-connected to terminal 66–TI6 and from there is connected to relay 67–TI6. The discharge current supplied to tube 54–T6 by relay 67–TI6 operates the relay which closes a locking path for itself through make contacts 67(67–TI6) and 67(1–GC) to ground. This relay operates in a minimum of time due to the forward bias through the current in its upper winding and make contacts 67(1–GC).

Figure 67:
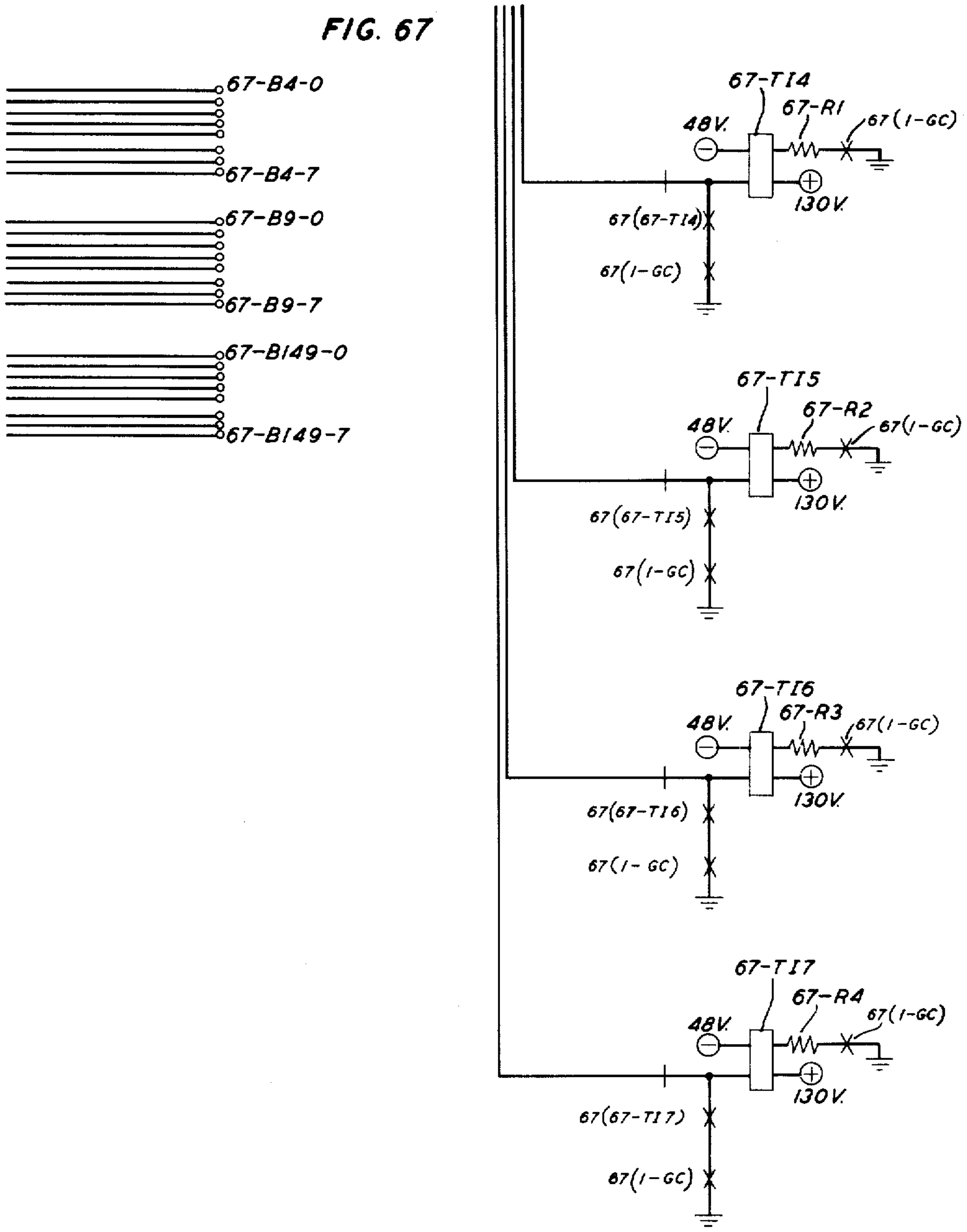

In its commercial tmbodiment all of the class B area output terminals on FIGS. 65 through 67 would be cross-connected as desired to terminals 66–TI0 through 66–TI7. However, in order to minmize the complexity of the drawings, only the terminals associated with class B areas 2 and 146 have the details of their cross-connections shown.

Relays 63–VTC and 63–DNC are associated with vacant terminating office codes and denied office codes, respectively. Relay 63–VTC is conectable by the contacts on FIGS. 61 through 63 of relays 9–B0 through 9–B149 to the tube in each coil group representing the digit 8. Accordingly, if a jumper connected to an output of any terminating office code translator on FIG. 47 represents an office code vacant in one or more class B areas, the jumper is threaded through the number 8 coil in the group associated with the particular area in which the code is vacant. A subsequent current surge over the jumper for a call to an area in which its code is vacant is effective to operate relay 63–VTC. Similarly, relay 63–DNC is associated with denied terminating office codes, it is connectable to the number 9 coil in each group, and the jumpers representing denied office codes in one or more areas are threaded through the number 9 coil in the coil groups representing such areas to effect the operation of relay 63–DNC. Relay VTC, if operated, locks through make contacts 63(63–VTC) and 63(1–GC) to ground, whereas relay DNC locks through make contacts 63(63–DNC) and 63(1–GC).

The operation of relay 63–VTC closes a path on FIG. 16 from ground on terminal 16–101, through make contacts 16(63–VTC) to the VTC input of the sender. The ground on this input notifies the sender that a vacant terminating office code has been dialed. The operation of relay 63–DNC closes a path on FIG. 16 from ground on terminal 16–101, through make contacts 16(63–DNC) to the DNC input of the sender notifying it that a denied terminating office code has been dialed. The sender, in turn, may be arranged to effect whatever circuit actions may be desired in connection with the dialing of vacant or denied terminating office codes, and it releases the charge rater as previously described, without making the second translation.

Upon the operation of relay 67–TI6 as already described, a path is closed on FIG. 22 from ground on terminal 22–101, through make contacts 22(1–GC), break contacts of relays 66–TI0 through 66–TI3, break contacts of relays 67–TI4 and 67–TI5, make contacts 22(67–TI6), break contacts 22(67–TI7), to the winding of relay 22–OTK. The operation of this relay signifies that one, and only one, of the terminating increment relays has operate.

In summary, insofar as the first translation for class B calls is concerned, it may be seen that the terminating area and terminating office codes dialed by the subscriber have effected the derivation of a terminating increment of 6 by means of the coil translator shown on FIGS. 49 through 67.

*3.07 Originating zone translation*

The next step in the processing of a class B call is the derivation of the originating increment. As already explained, the magnitude of this quantity is dependent upon the location of the calling office within the tandem area and with respect to the direction of the terminating area. The circuit operations associated with this function are described in this section.

Figure 46:
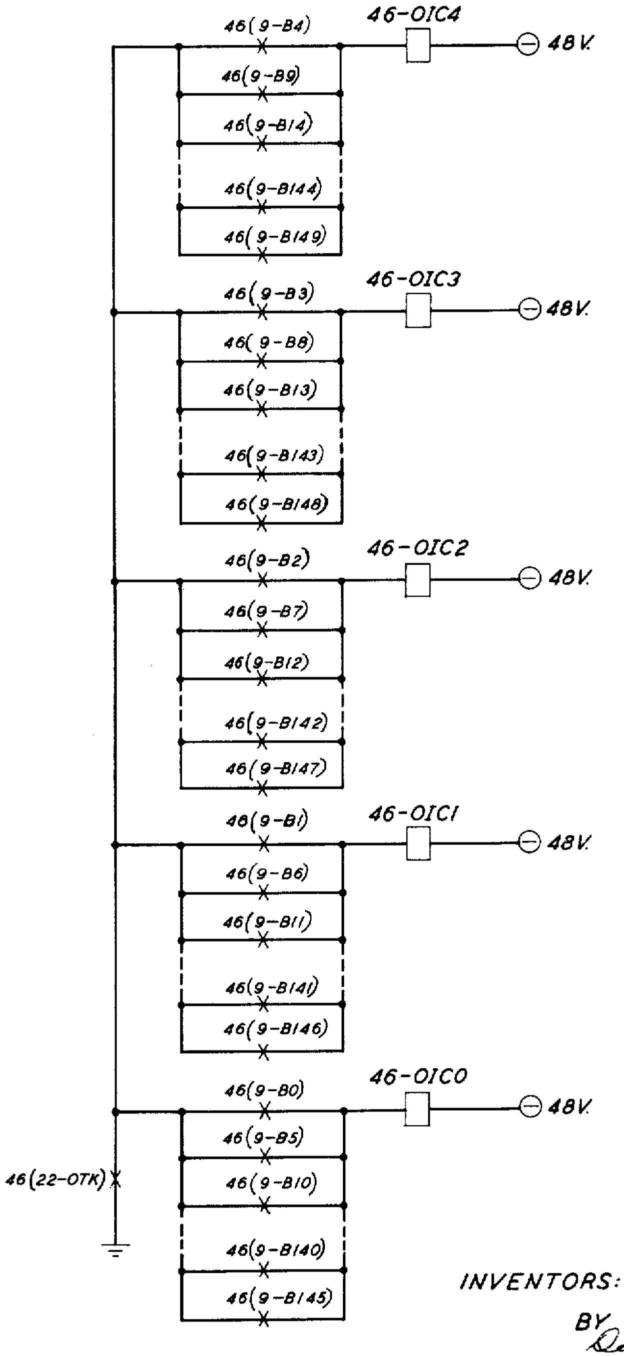

The operation of relay 22–OTK closes a path on FIG. 46 from ground, through make contacts 46(22–OTK), 46(9–B2) to the winding of relay 46–OIC2 to operate it. It may be seen on FIG. 46 that each OIC relay is associated with certain class B areas by virtue of make contacts on relays 9–B0 through 9–B149. This arrangement enables each class B area to which a call is directed to effect the operation of its associated OIC relay on FIG. 46. For example, the operation of relay 9–B2 operates relay 46–OIC2. As will be seen in the following description, the operation of any 46–OIC relay, such as for example, relay 46–OIC2, interconnects the output of an associated one group of coils in the coil field with the register relays used in this translation to effect the derivation of the desired originating increment.

Since the originating zone for the present call is 25, a path may be traced at this time on FIG. 7 from input terminal 7–100, through make contacts 7(2–OZU1), 7(2–OZU4) and 7(2–OZT2) to output terminal 7–25 which represents a translation for originating zone 25.

Figure 48:
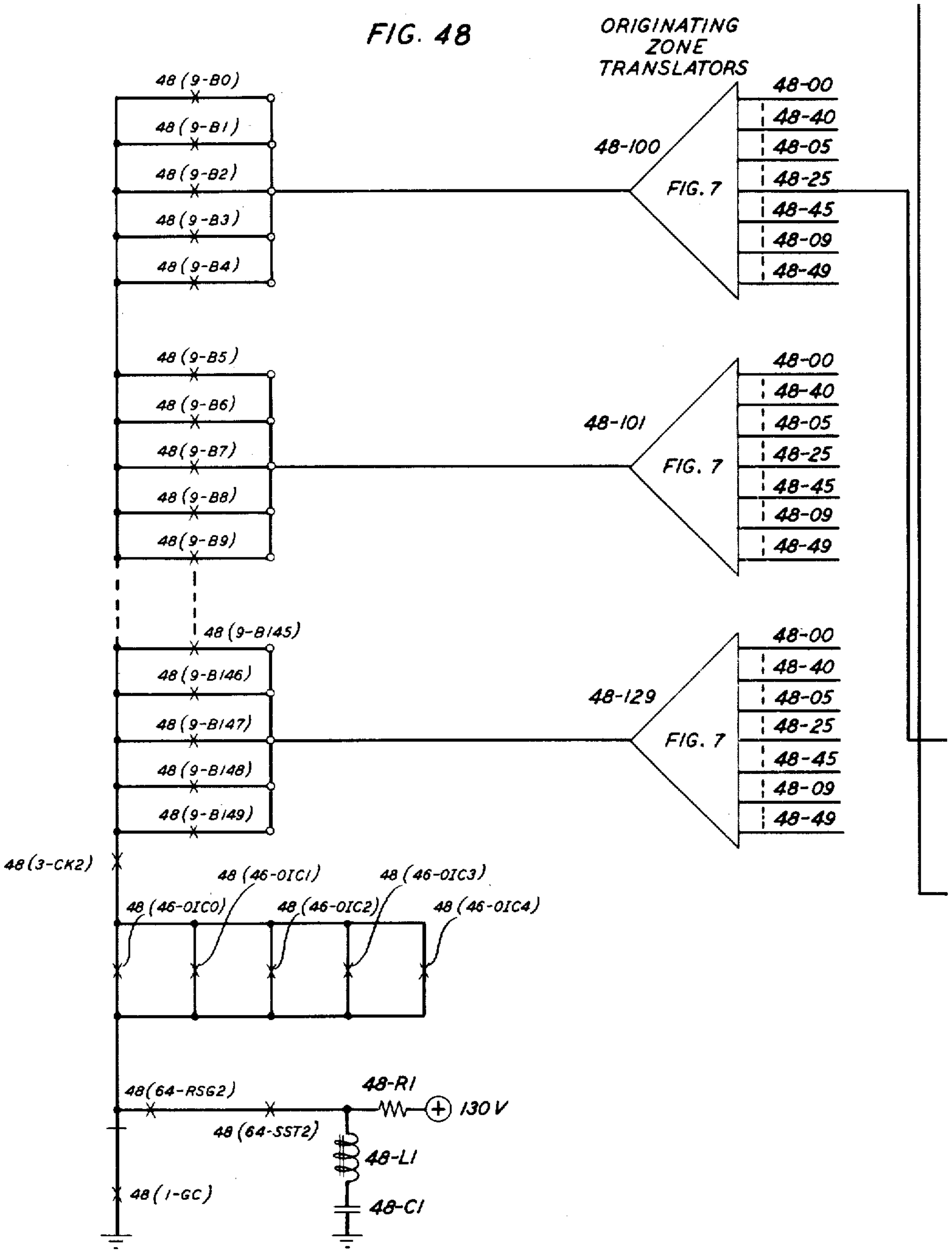

FIG. 48 discloses thirty triangles designated 48–100 through 48–129 (only three of which are shown) with each functionally representing an originating zone translator as shown in detail on FIG. 7. Each translator on FIG. 48 has its input connected to make contacts on five of relays 9–B0 through 9–B149. Specifically, the contacts of relays 9–B0 through 9–B4 are connected to translator 48–100; the contacts of relays 9–B5 through 9–B9 are connected to translator 48–101 while the contacts of relays 9–B145 through 9–B149 are connected to translator 48–129.

It has already been stated the relay 1–GC operated as the charge rater was seized, therefore, the ground on make contacts 48(1–GC) may be extended through break contacts 48(64–RSG2), make contacts 48(46–OIC2), 48(3–CK2), and 48(9–B2) to the input of translator 48–100. The ground on the input of the translator may be extended therethrough in the manner described in connection with FIG. 7 to output terminal 48–25 which represents a translation for originating zone 25 in all of class B areas 0 through 4.

*3.08 The coil field—Second translation*

The output terminals of the thirty translators 48–100 through 48–129 are connected to jumpers which are selectively threaded through the coil field shown on FIGS. 49 through 58. Only the jumper connected to output terminal 48–25 of translator 48–100 is shown on the drawings in order to minimize their complexity. However, in its commercial embodiment, each and every output terminal may be connected to a jumper. The jumper connected to terminal 48–25 is threaded through coils 49–A0, 52–B7, 53–C2, 55–D4 and 58–E5 to terminal 64–101 and the winding of relay 64–RSG2. The operation of this relay by the jumper ground closes a holding path for itself through make contacts 64(64–RSG2) and 64(1–GC) to ground. The operation of this relay also completes a path on FIG. 64 from ground on terminal 64–102, through make contacts 64(1–GC) and 64(64–RSG2) to the winding of relay 64–SST2 to operate it.

Condenser 48–C1 is normally charged to a positive 130-volt potential through inductance 48–L1 and resistor 48–R1. The combined operation of relays 64–SST2 and 64–RSG2 completes a path to discharge condenser 48–C1 through inductance 48–L1, make contacts 48(64–SST2), 48(64–RSG2), 48(46–OIC2), 48(3–CK2) and 48(9–B2), through the originating zone translator 48–100 to its output terminal 48–25, through the jumper connected thereto to the holding ground on terminal 64–101. The surge current over this jumper induces an output potential in the coils through which it is threaded. These output potentials, in turn, attempt to fire the cold cathode tubes associated therewith.

Of all the coils through which this jumper is threaded, only the tube associated with coil 53—C2 has a positive potential on its main anode at this time since only relay 46–OIC2 out of all the 46–OIC relays is now operated. Therefore, only this tube can currently be fired across its main gap. A path may now be traced from the main anode of tube 53–T2, through make contacts 60(46–OIC2), through break contacts 61(61–OI2) to the winding of relay 61–OI2 to operate it. This relay in operating completes a holding path for itself through make contacts 61(61–OI2) and 61(1–GC) to ground. The operation of this relay manifests an originating increment of 2 for the call.

The operation of relay 61–OI2 completes a path on FIG. 22 to operate relay 22–OIK from ground on terminal 22–104, through make contacts 22(1–GC), break contacts 22(61–OI0) and 22(61–OI1), make contacts 22(61–OI2) through break contacts on relays 61–OI3 through 65–OI7 to the winding of relay 22–OIK. The operation of this relay signifies that one, and only one, of the originating increment relays on FIGS. 61 and 65 have operated.

*3.09 The charge rate adder*

Figure 11:
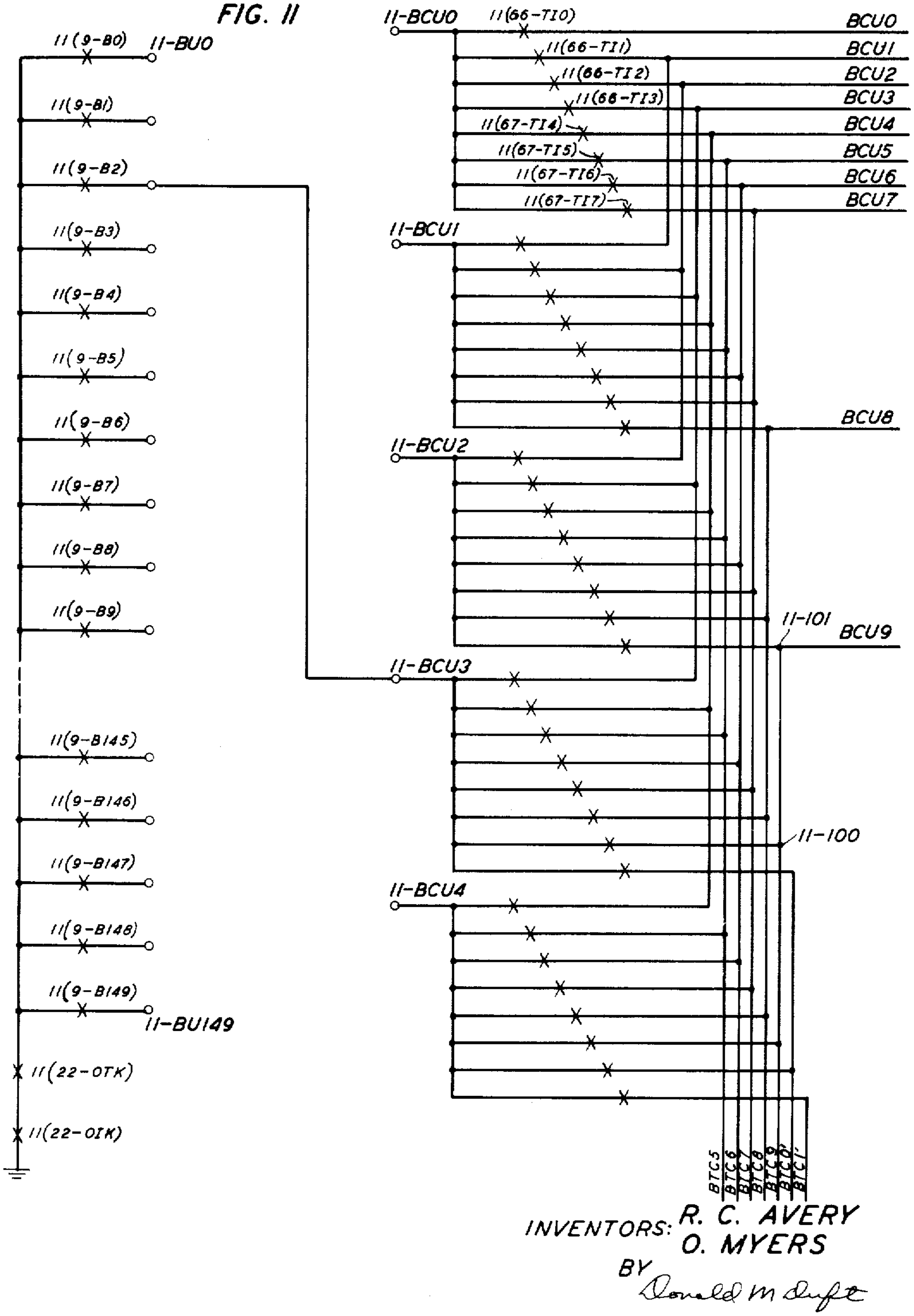
Figure 12:
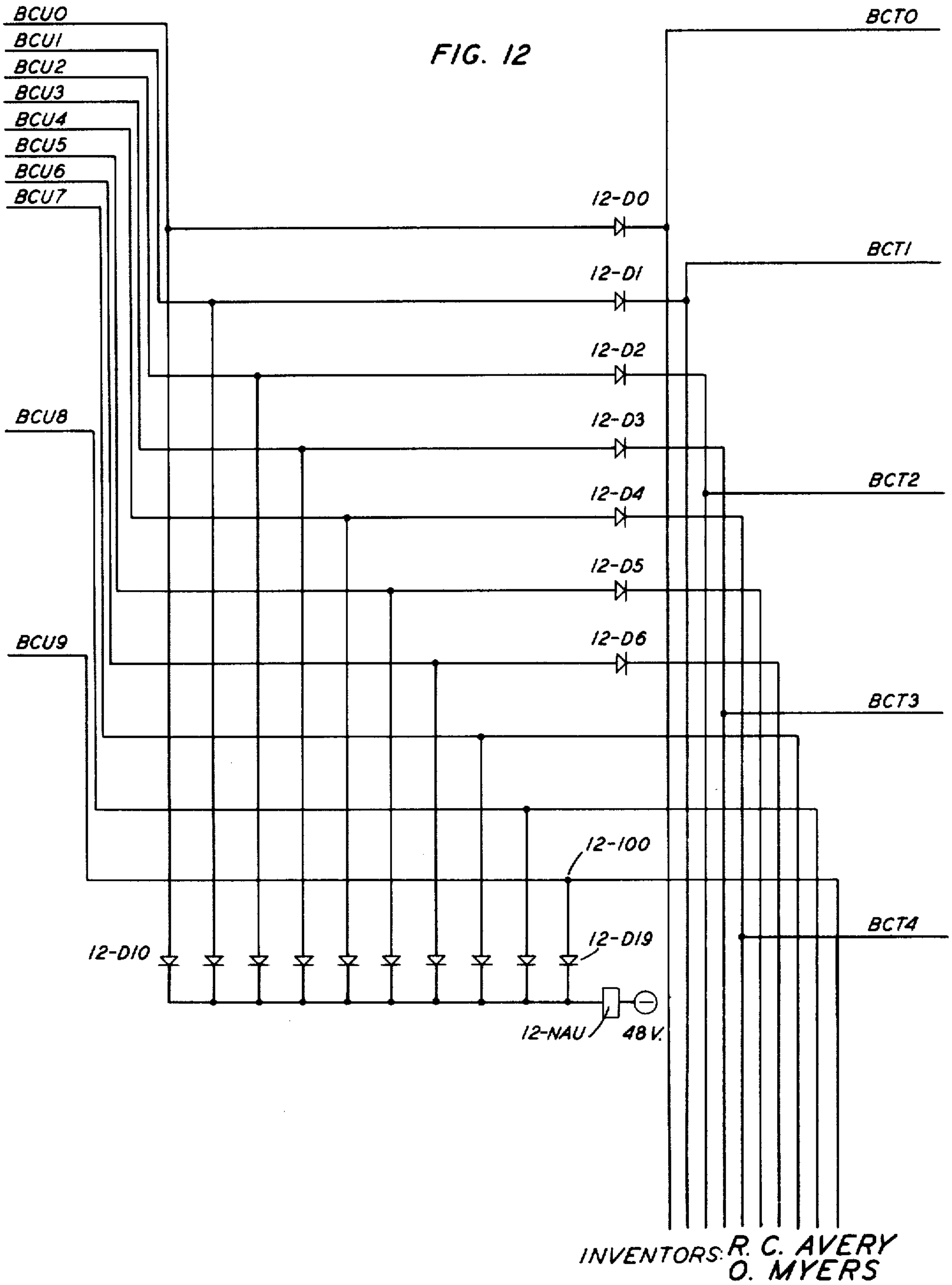
Figure 13:
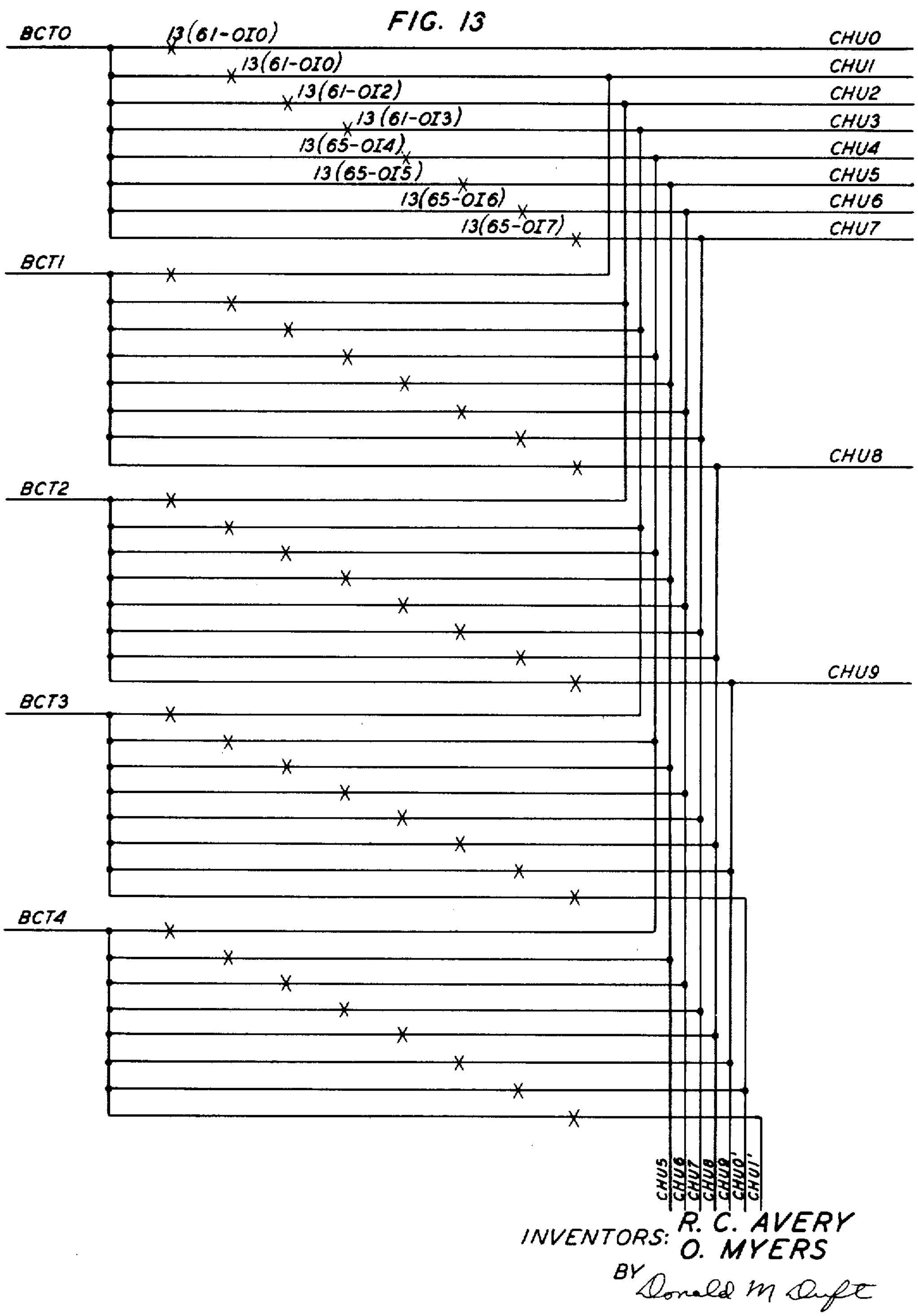
Figure 14:
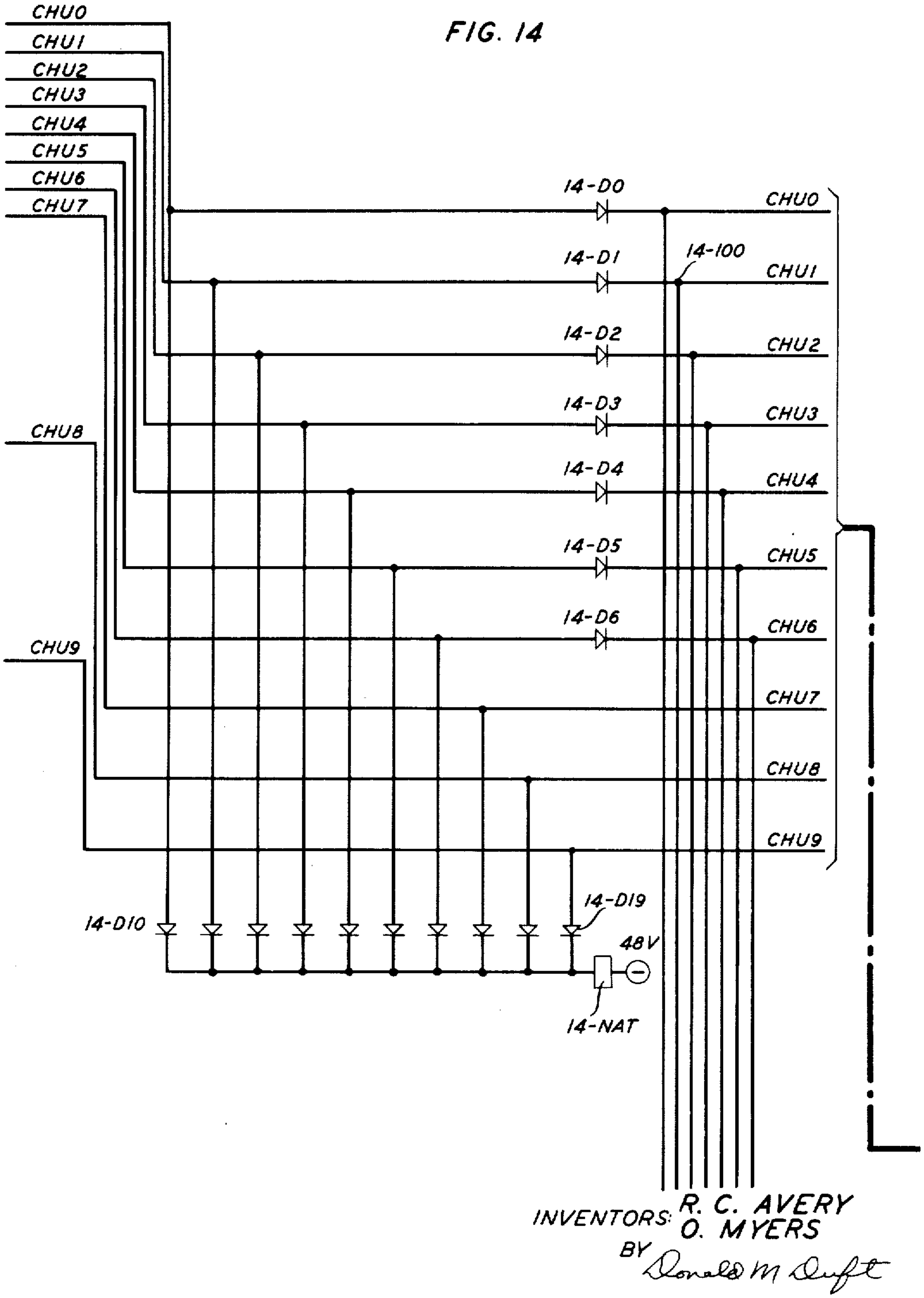
Figure 17:
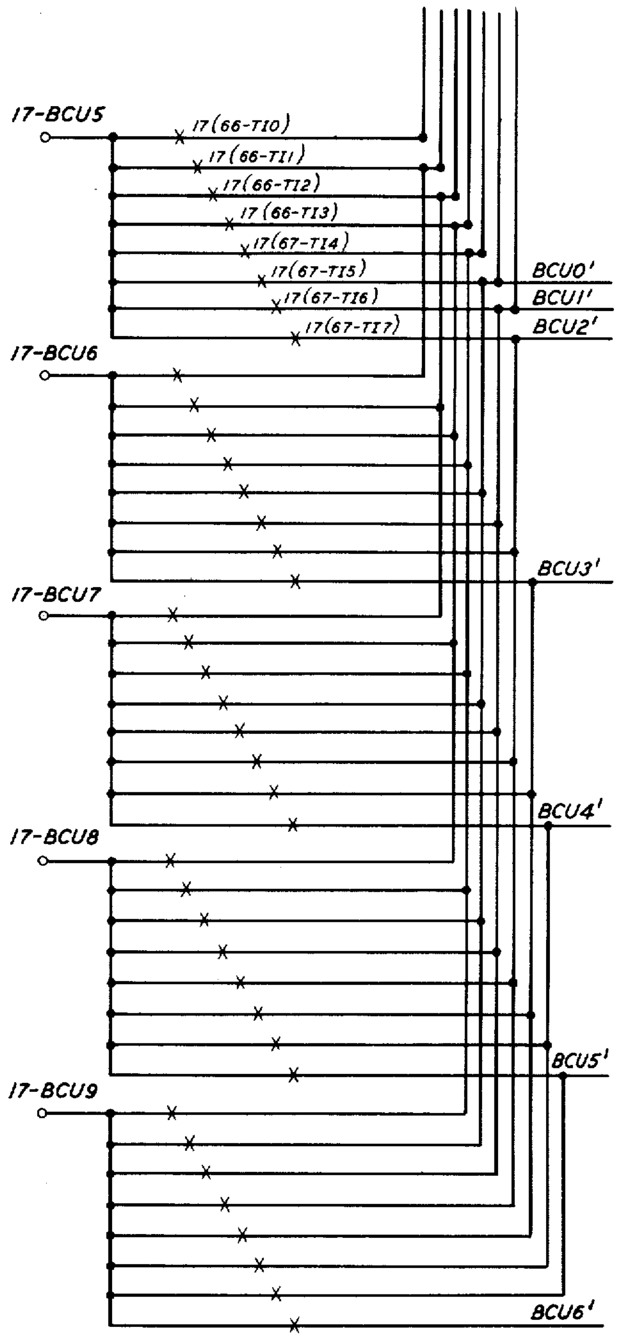
Figure 18:
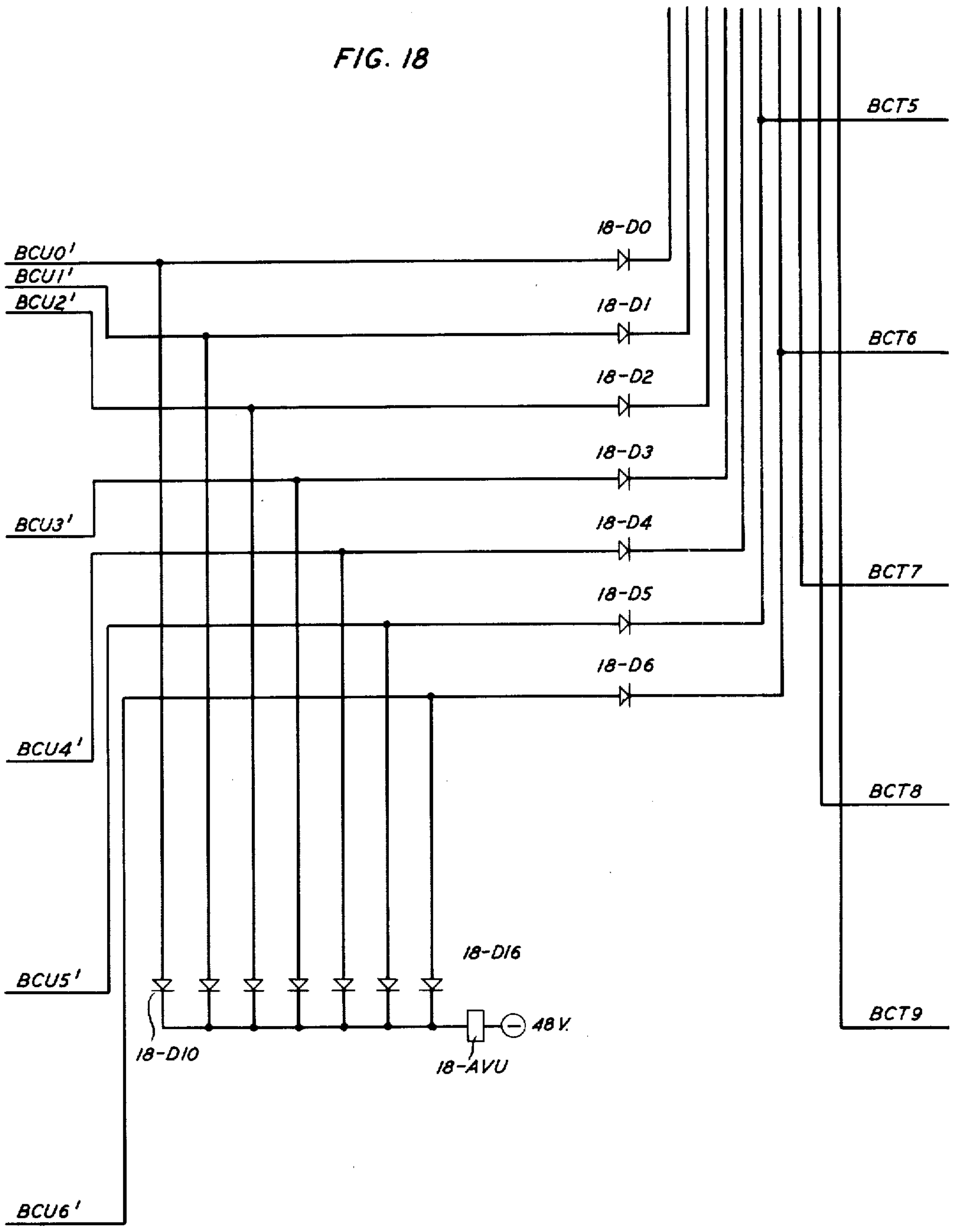
Figure 19:
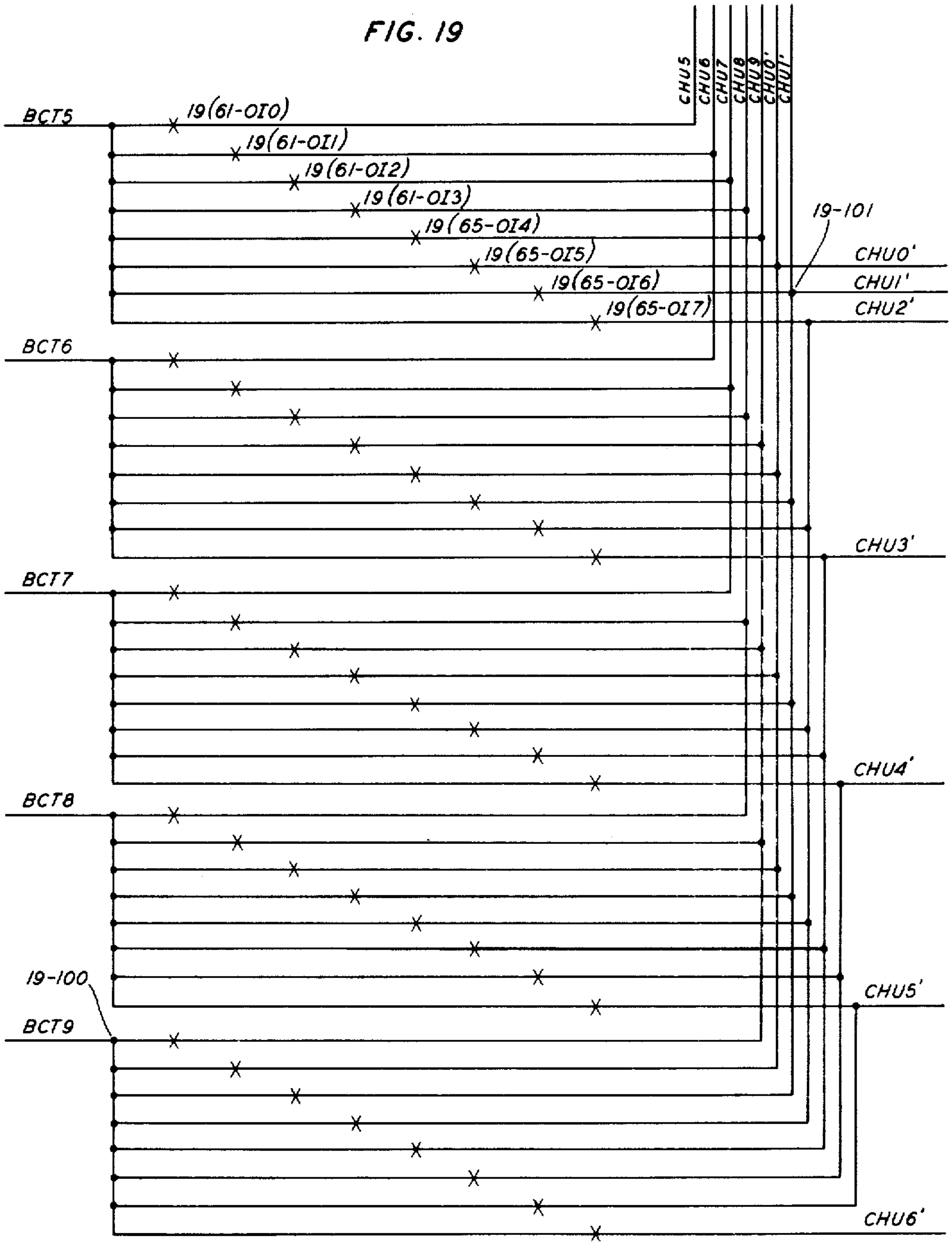
Figure 20:
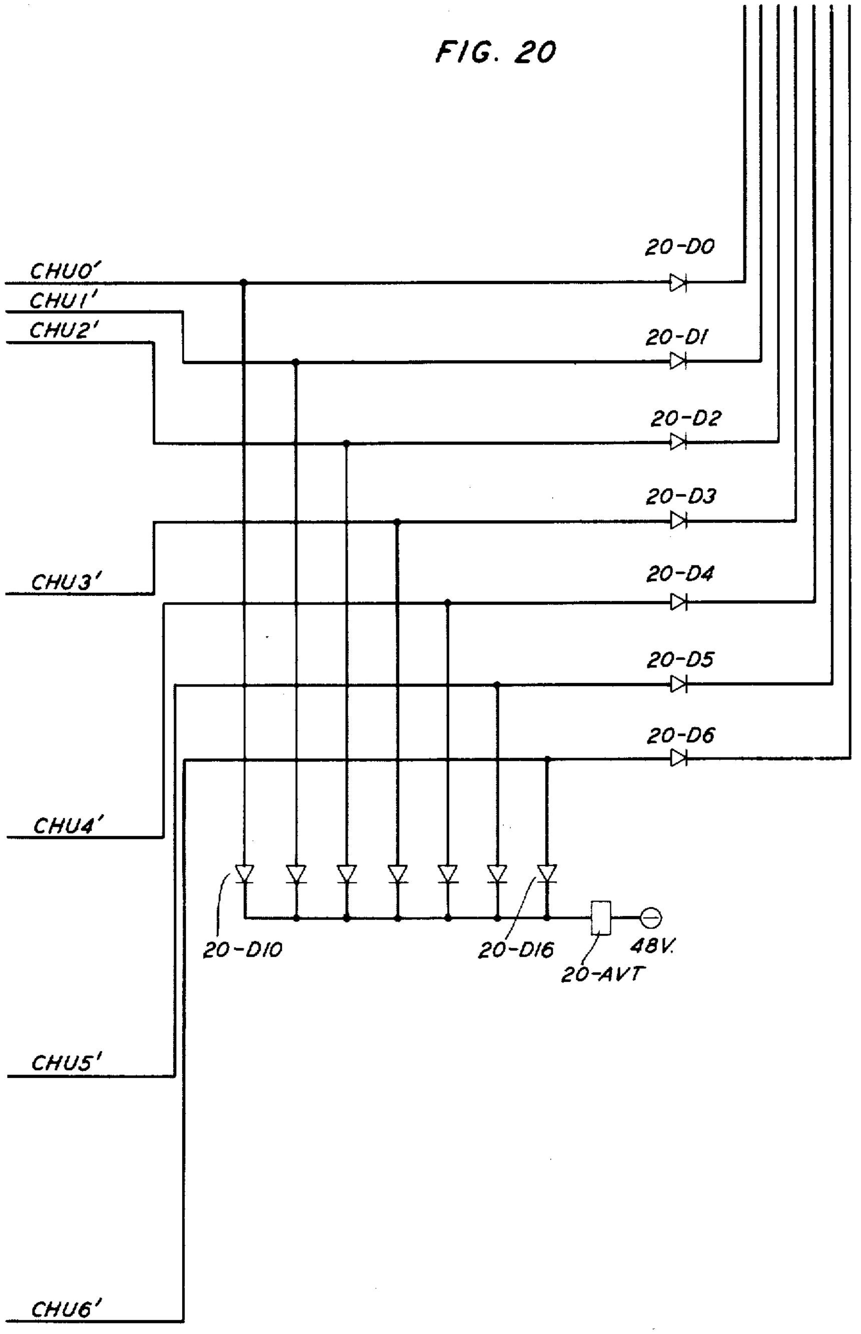

The circuit operations described so far have derived a terminating increment of 6 and an originating increment of 2 for the present call. The circuit operations described in this section add these two incremental values to the basic charge rate in order to determine the total charge rate for the call. This addition is performed by the charge rate adder shown on FIGS. 11 through 20. Let it be assumed that the basic charge rate for this call is 43. This basic charge rate represents the charge rate for the minimum distance between area 913 (a portion of the state of Kansas) and the originating tandem area in the state of New Jersey. The units digit of the basic charge rate is supplied to the adder by the circuits on FIGS. 11 and 17. Specifically, the contacts on FIG. 11 of relays 9–B0 through 9–B149 are cross-connected to the input terminals on FIGS. 11 and 17 in accordance with the units digit of the basic charge rate for calls to the class B area represented by each 9–B– relay. For example, since the basic charge rate for calls to class B are a 2 is 43, the contacts 11(9–B2) are cross-connected to terminal 11–BCU3, which represents a basic charge units digit of 3. The cross-connections for the other contacts are not shown in order to minimize the complexity of the drawings.

The ground on make contacts 11(22–OIK) may be extended through make contacts 11(22–OTK) and 11(9–B2) to terminal 11–BCU3. This terminal is, in turn, connected to the contacts on FIG. 11 of each of terminating increment relays 66–TI0 through 67–TI7. Since a terminating increment of 6 was derived for the present call the ground on terminal 11–BCU3 may now be extended through make contacts 11(67–TI6) to terminal 11–100. The ground on terminal 11–100 may be extended to terminal 11–101 which is connected to the wire having the functional designation BCU9 which represents a charge rate units digit of 9 and which was obtained by adding the basic charge units digit of 3 to the terminating increment of 6.

The ground on terminal 11–101 extends to terminal 12–100 and from there through diode 12–D19 to operate relay 12–NAU. The operation of this relay functionally indicates that the sum of the basic charge rate units digit and the terminating increment (3+6=) does not exceed 9 and, therefore, no carry digit is required. The ground on terminal 12–100 may also be extended over the conductor BCT9 to terminal 19–100. From there, the ground may be further extended through make contacts 19(61–OI2) for an originating increment of 2, to terminal 19–101 which is connected to a conductor designated CHU1′. This designation indicates that the charge rate units digit is a 1 and that a carry of 1 should be added to the tens digit. The ground on terminal 19–101 may be extended over conductor CHU1′ and through diode 20–D11 to the winding of relay 20–AVT to operate it. The operation of this relay indicates that a carry digit of 1 should be transferred to the tens order. The ground on conductor CHU1′ may also be extended through diode 20–D1 to terminal 14–100 which is connected to conductor CHU1. The designation of this conductor represents a charge rate units digit of 1. The ground on this conductor is extended over sheets 15, 16 and 10 to the CHU1 input of the sender. The ground on this input signifies to the sender that the charge rate units digit for the call is 1.

Figure 15:
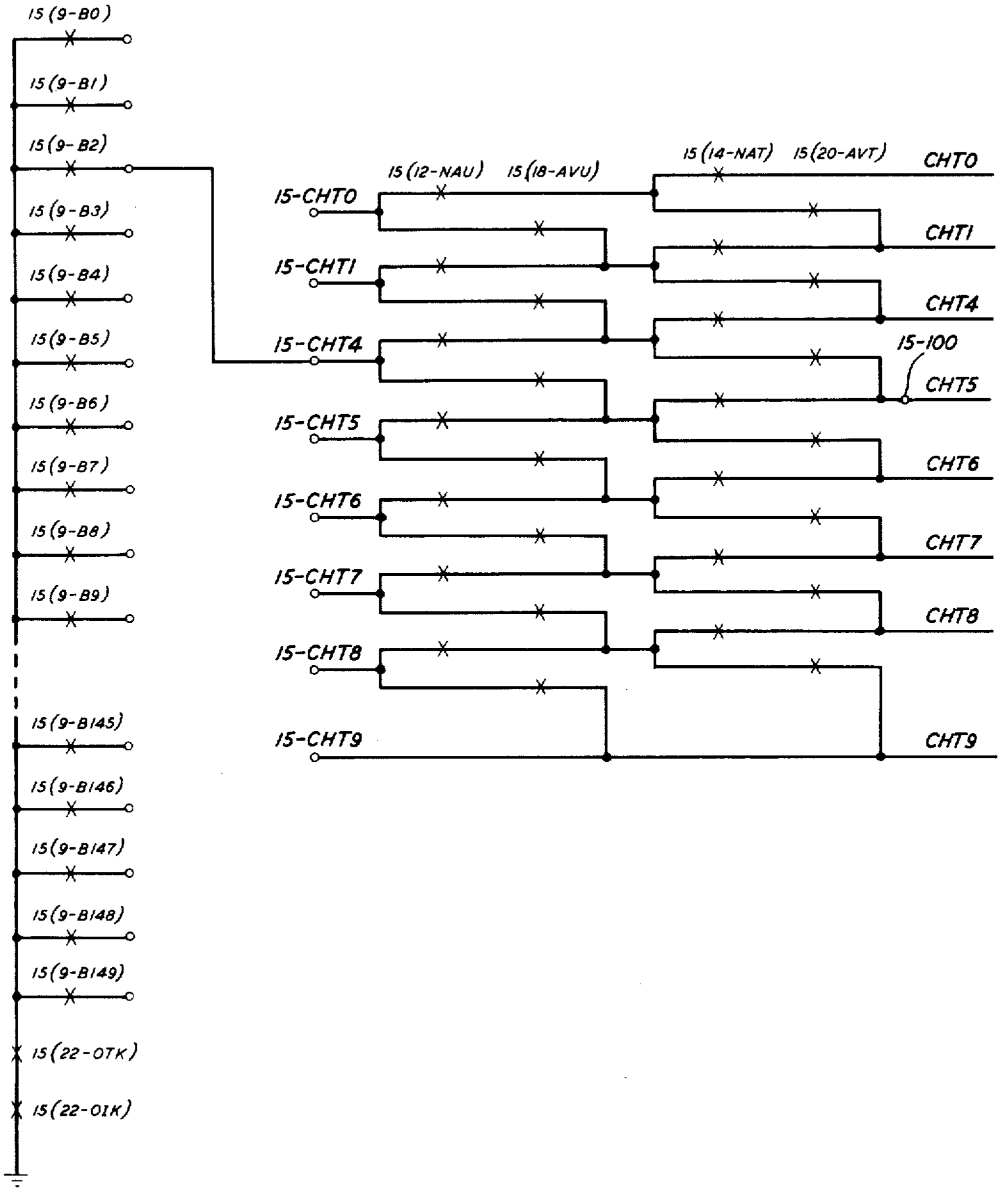

The tens digit of the basic charge rate is supplied to the charge rate adder by the circuit of FIG. 15. The contacts of each relay 9–B0 through 9–B149 are cross-connected as desired to the tens digit input terminals 15–CHT0 through 15–CHT9. However, only the cross-connection from contacts 15(9–B2) are shown on the drawings. The basic charge rate for the present call to class B area 2 was assumed to be 43. Therefore, the contacts of relay 9–B2 are cross-connected to terminal 15–CHT4. The ground on make contacts 15(22–OIK) may be extended through make contacts 15(22–OTK) and 15(9–B2) to terminal 15–CHT4 which represents a basic charge rate tens digit of 4. The ground on this terminal may be further extended through make contacts 15(12–NAU), and 15(20–AVT) to terminal 15–100 which is connected to conductor CHT5. The ground on this conductor is extended over FIG. 16 to the input conductor CHT5 of the sender on FIG. 10. The ground on this conductor signifies a charge rate tens digit of 5.

Summarizing, the charge rate adder has applied a ground to input conductors CHT5 and CHU1 of the sender which together manifest a charge rate of 51 for the presently described call to office WA6 in national area 913 (class B area 2). This total charge rate was obtained by adding an originating increment of 2 and a terminating increment of 6 to the basic charge rate of 43. From the table in section 2.08 it may be seen that a charge rate of 51 represents a toll call having an initial charge of $1.60.

Once the sender receives this information, it releases the charge rater which, in turn, releases all relays therein in the manner previously described.

For increments other than those hereinabove assumed, it will be seen that operation of relay 66–TI0 does not change the basic charge, whereas operation of a relay 66–TI1 through 67–TI7 adds an equivalent value thereto, by changing the units lead correspondingly and by advancing the tens lead when a carry digit is required. Relays 61–OI0 through 65–OI7 function in a similar manner with respect to the sum of the basic charge and the terminating increment. Relays 12–NAU and 18–AVU are associated with the terminating increment, relay 12–NAU being operated when a carry digit is not required for this increment, and 18–AVU being operated when it is required. Relays 14–NAT and 20–AVT perform similar functions with respect to the originating increment.

One of relays 43–TOL and 43–ZN is operated for class B calls by application of ground to terminal 43–TOL or 43–ZN by the 9–B– relay operated. Relay 43–TOL, by means of its make contacts 16(43–TOL) connects conductors CHT0 and CHT1 from the adder to conductors CHT2 and CHT3, respectively, to the sender, whereas relay 43–ZN, by means of its make contacts 16(43–ZN), closes these conductors without change. This is done so that the operator may distinguish between toll and zone calls in which one of these conductors is involved.

*Section 4.0 Class C calls*

Figure 70:
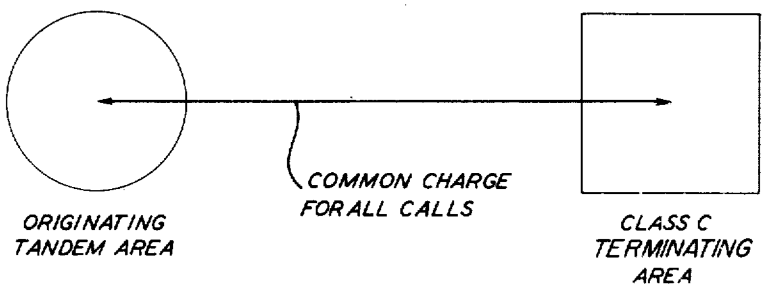
Figure 73:
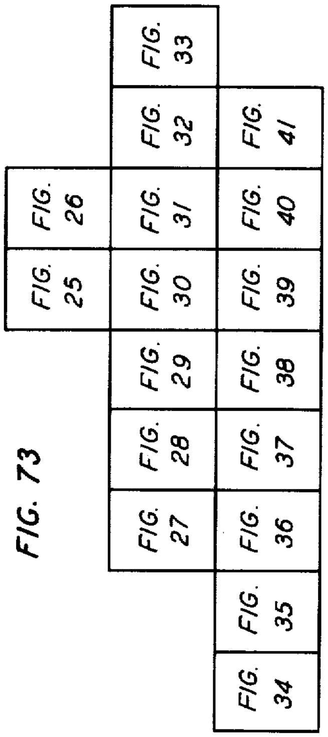
FIG. 73 illustrates how FIGS. 25 through 41 should be arranged with respect to each other.
Figures 72, 74:
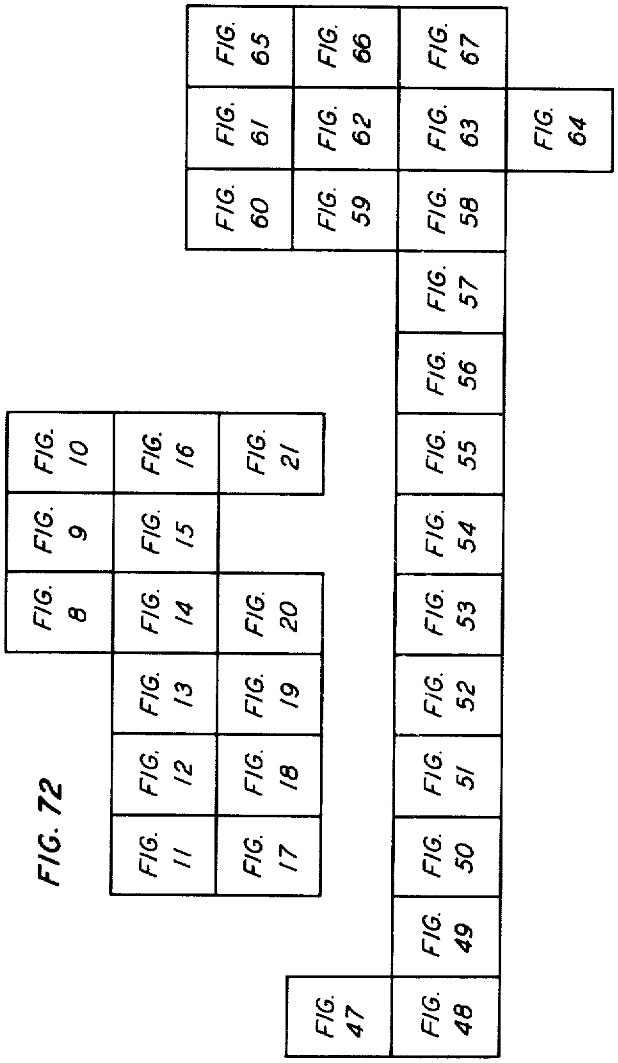
FIG. 72 illustrates how FIGS. 8 through 21 should be arranged with respect to each other.
FIG. 74 illustrates how FIGS. 47 through 67 should be arranged with respect to each other.
Figure 71:
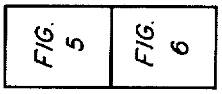
FIG. 71 illustrates how FIGS. 5 and 6 should be arranged with respect to each other.

The circuit operations described in this section disclose the operation for the circuit in processing a class C call. FIG. 70 illustrates one possible geographical relationship between offices for class C calls. It will be recalled that the charge rates for class C calls are determined solely from the terminating area code without regard to the terminating office code or the originating zone. Functionally, this indicates that all calls from a particular originating office to a given class C area will have the same charge rate regardless of the location of the called office within the terminating area, and regardless of the location of the calling office within the originating tandem area. A billing procedure of this type is justified since class C areas are initially defined as being those in which the location of the terminating office has little bearing on the over-all distance of the call. Therefore, a charging procedure of this type can be economically justified on the basis that a uniform charging rate for all calls to such an area results in sufficient equipment saving to the telephone company which justifies any possible loss of revenue.

In accordance with the proposed method, all calls from New York city to any offices within a terminating area in the state of California might be termed class C calls and would have the same charge rate. The same procedure could be used on calls from New York city to other distant areas where the precise location of the called office within the called area will have little effect on the over-all distance of the call. For example, all calls from New York city to terminating areas in any of the Pacific states such as Oregon, Washington, California and some of the far western states, if desired, could be classified as class C calls since the precise location of the called office in any of these areas would have little bearing on the distance from New York city.

In order to illustrate the operation of the circuit for a class C call, let it be assumed that once again a subscriber in New Jersey (area 201) having the telephone number CR3–6012 (originating zone 25) calls a subscriber in national area 213 (a portion of the state of California) having the directory number WA6–1023. It should be noted that the calling subscriber has the same office code and directory number as in the previously described class B call and, also, the called office code and number is the same. The only difference between the two is in the terminating national area which is 213 for the present call. The assumption of similar called data facilitates the description over that which would be required if a completely new set of data were to be used.

Let is once again be assumed that sender 0 is serving this call and in so doing seizes the presently disclosed charge rater. This being the case, the sender will transmit the terminating code and originating zone information to the register circuit of FIG. 2 which will operate the corresponding relays in response to the receipt of such information. Inasmuch as the circuit operations associated with the seizure of the charge rater and the entry of the information into the circuits of FIG. 2 have already been described in detail in connection with both the class A and class B calls, it is not believed necessary to repeat again this detailed information. Instead, it is believed sufficient to state that relays 1–RP0, 1–RC0 and 1–GC operate in the manner before described as sender 0 seizes the charge rater. Also, the terminating area code 213, the terminating office code 926(WA6) and the originating zone 25 is registered in the circuit of FIG. 2 in a manner similar to that previously described, by the operation of relays 2–TA0, 2–TA2, 2–TB0, 2–TB1, 2–TC1, 2–TC2, 2–TD2, 2–TD7, 2–TE0, 2–TE2, 2–TF2, 2–TF4, 2–OZT2, 2–OZU1 and 2–OZU4. Next, relays 3–CK1 and 3–CK2 operate provided the proper number of relays are operated in each relay group of FIG. 2. Next, relay 4–AC operates as previously described to indicate that the current call is an area code call.

Referring now to the terminating code translator shown on FIGS. 5 and 6 a path may now be traced from its input terminal 5–100 through make contacts 5(2–TB1), 5(2–TB0), 5(2–TA0), 5(2–TA2), terminal 5–21, make contacts 5(2–TC1) and 5(2–TC2) to its output terminal 5–213 which represents a translation for terminating area 213.

FIG. 8 functionally discloses two of the terminating area code translators whose details are contained on FIGS. 5 and 6. A path may be traced from ground on both terminals 8–104 and 8–103 through make contacts 8(1–GC), 8(3–CK1), and 8(4–AC) to the input terminals 8–105 and 8–106, respectively, of translators 8–100 and 8–101, respectively. The ground on the input of each translator may be further extended to its output terminal 8–213 as described in connection with FIG. 5. The output terminals of these two translators which represent class C terminating areas are selectively cross-connected to conductors CHT0 through CHT9 and CHU0 through CHU9 of the sender which conductors represent the charge rate tens and charge rate units inputs. Specifically, the output terminals of translator 8–100 which represent class C areas are cross-connected to the charge tens conductors CHT0 through CHT9 while the class C area output terminals of translator 8–101 are connected to the charge rate units conductors CHU0 through CHU9. It should be noticed that some of the output terminals of translator 8–101 are connected to terminals 8–B0 through 8–B149 and 8–A0 through 8–A2 which are associated with class B and class A calls in a manner already described. In its commercial embodiment every working national area code would normally be connected to one of the class A, B or C input terminals of FIG. 8. However, only those connections are shown on FIG. 8 which are necessary to illustrate the principles of the invention. No extra connections are shown in order to minimize the complexity of the drawings.

Returning to terminal 8–213, on each translator it may be seen that this terminal of translator 8–101 is cross-connected to conductor CHU9 while the corresponding terminal of translator 8–100 is connected to conductor CHT6. Therefore, the ground on each of these terminals is transmitted over the conductors connected thereto and then to the sender to signify a charge rate of 69. It may be seen from the chart in section 2.08 that the charge rate 69 represents a toll call having an initial charge of $2.50.

Once the sender has received this information it will release the charge rater which, in turn, will release all relays therein in the manner previously described. Summarizing, it may be seen that the derivation of charge rates for class C areas is relatively simple in that the desired charge rate is obtained directly from the terminating area information. This expedient reduces the complexity of the necessary equipment and make economically feasible the application of uniform charge rates to all distant areas in which the precise location of the called office in the distant area has little bearing on the overall distance of the call.

It is to be understood that the above-described arrangements are but illustrative of the application of the principles of the invention. Numerous other arrangements may be devised by those skilled in the art without departing from the spirit and scope of the invention. For example, the present disclosure shows the charge rate computer as an integral part of a telephone system in which it receives input information from, and transmits the computed charge rates to, an item of common control switching equipment designated the sender.

There are many other ways in which the charge rate computer could be advantageously used in the telephony industry. For example, it has already been discussed how the AMA tapes, which are prepared by perforating equipment at the central offices in connection with the completion of calls, are processed at centrally located accounting centers in order to compute the charges for the calls represented by the data on the tapes. Since the information currently perforated on these tapes does not include the charge rates, one of the functions of the accounting center equipment is to compute the charge rate for each call. At the present time, the charge rate computation is a time consuming operation and is performed by machines utilizing perforated cards or the like. The access time of such machines is large since a separate card is required for each possible combination of calling and called offices served by the switching centers whose tapes are processed by a particular accounting center. The presently disclosed charge rate computer could be used at the accounting centers to provide a faster operating and more economical means of deriving charge rates. Specifically, it could be interconnected with the tape reading machines in such a manner that it would receive the originating zone of the calling office, the terminating office code and the terminating area code, when appropriate, for each call and, in response thereto, would derive the charge rate in a manner similar to that already explained. The derived charge rate could then be transmitted to other machines which could utilize the information in any manner that may be desired in connection with the further processing of the tapes.

What is claimed is:

1. The method of deriving the charge rate for telephone calls between offices grouped into different geographical areas comprising; receiving information for each call pertaining to the calling and called offices including the geographical area of their situs, computing a basic charge rate from said information in accordance with the minimum distance between the calling and called areas, computing a terminating incremental charge rate from said information in accordance with the location of the called office within its area, computing an originating incremental charge rate from said information in accordance with the location of the originating office within its area, and adding the basic charge rate and said incremental charge rates.

2. The method of deriving the charge rate for telephone calls between offices grouped into different geographical areas comprising; receiving information for each call pertaining to the calling and called offices including the geographical area of their situs, computing a basic charge rate from said information in accordance with the minimum distance between the calling and called areas, computing a terminating incremental charge rate from said information in accordance with the location of the called office within its area with respect to the direction of the calling office, computing an incremental charge rate from said information in accordance with the location of the originating office within its area with respect to the direction of the called office, and adding the basic charge rate and said incremental charge rates.

3. A computer for determining charge rates on calls between calling and called offices wherein said offices are grouped into geographical areas and wherein each area may comprise a plurality of offices; means for transmitting to said computer on each call information identifying the geographical area in which the called office is situated, the location of the called office within its area, and the location of the calling office within its area; means in said computer responsive to the receipt of said information for deriving a first portion of the charge rate for each call in accordance with the minimum distance between the calling and called areas, and means in said computer further responsive to the receipt of said information for deriving the remainder of the charge rate for each call in accordance with the location of the calling and called offices in their areas.

4. The combination recited in claim 3 together with means for totalizing said first portion and said remainder to obtain the total charge rate applicable to each call.

5. In a computer for determining charge rates on calls between calling and called offices wherein said offices are grouped into geographical areas each of which may contain a plurality of offices; means for transmitting to said computer on each call information identifying the geographical area in which the called office is situated, the location of the called office within its area, and the location of the calling office within its area; means responsive to the receipt of information pertaining to the area of the called office for deriving a basic charge rate in accordance with the minimum distance between the calling and called areas; means responsive to the receipt of said information pertaining to the location of the called office within its area for deriving a terminating incremental charge rate; means responsive to the receipt of said information pertaining to the location of the calling office within its area for deriving an originating incremental charge rate and means for totaling said basic charge rate and said incremental charge rates to derive the charge rate.

6. In a computer for determining charge rates on calls between calling and called offices wherein said offices are grouped into geographical areas each of which may contain a plurality of offices; means for transmitting to said computer on each call information identifying the geographical area in which the called office is situated, the location of the called office within its area, and the location of the calling office within its area; means responsive to the receipt of information pertaining to the area of the called office for deriving a basic charge rate in accordance with the minimum distance between the calling and called areas; means responsive to the receipt of information pertaining to the location of the called office within its area for deriving a terminating incremental charge rate based on the location of the called office within its area with respect to the direction of the calling office; means responsive to the receipt of information pertaining to the location of the calling office within its area for deriving an originating incremental charge rate in accordance with the location of the calling office within its area with respect to the direction of the called office; and means for totaling said basic and said incremental charge rates to derive the charge rate for each call.

7. In a computer for determining charge rates on calls between calling and called offices wherein said offices are grouped into geographical areas each of which may contain a plurality of offices; means for transmitting to said computer on each call a called area code, a called office code, and an originating zone code identifying the location of the calling office within its area; means responsive to the receipt of said called area code for deriving a basic charge rate; means responsive to the receipt of said called office code for deriving a terminating incremental charge rate; means responsive to the receipt of said originating zone code for deriving an originating incremental charge rate; and means for totaling said basic charge rate and said incremental charge rates to derive the total charge rate.

8. In a computer for determining charge rates on calls between calling and called offices wherein said offices are grouped into geographical areas each of which may contain a plurality of offices; means for transmitting to said computer on each call a called area code, a called office code, and an originating zone code identifying the location of the calling office within its are; means including a first translator responsive to the receipt of said called area code for deriving a basic charge rate; means including a second translator responsive to the receipt of said called office code for deriving a terminating incremental charge rate; means including a third translator responsive to the receipt of said originating zone code for deriving an originating incremental charge rate; and means for totaling said basic charge rate and said incremental charge rates to derive the total charge rate.

9. In a computer for determining charge rates on calls between calling and called offices wherein said offices are grouped into geographical areas each of which may contain a plurality of offices; means for transmitting to said computer on each call a called area code, a called office code, and an originating zone code signifying the location of the calling office within its area; means responsive to the receipt of said called area code for deriving a basic charge rate in accordance with the distance between the calling and called areas; means responsive to the receipt of said called office code for deriving a terminating incremental charge rate based on the location of the called office within its area with respect to the direction of the calling office; means responsive to the receipt of said originating zone code for deriving an incremental charge rate in accordance with the location of the calling office within its area with respect to the direction of the called office; and means for totaling said basic and said incremental charge rates to derive the charge rate for each call.

10. In a computer for determining charge rates on calls between calling and called offices wherein said offices are grouped into geographical areas each of which may contain a plurality of offices; means for transmitting to said computer on each call a called area code, a called office code and an originating zone code signifying the location of the calling office within its area; means including a first translator responsive to the receipt of said called area code for deriving a basic charge rate in accordance with the minimum distance between the calling and called areas; means including a second translator responsive to the receipt of said called office code for deriving a terminating incremental charge rate based on the location of the called office within its area with respect to the direction of the calling office; means including a third translator responsive to the receipt of said originating zone code for deriving an incremental charge rate in accordance with the location of the calling office within its area with respect to the direction of the called office; and means for totaling said basic and said incremental charge rates to derive the charge rate for each call.

11. The method of deriving the charge rates for telephone calls between called offices grouped into different geographical areas each of which is represented by a called area code and calling offices grouped into different geographical areas with the location of each calling office in an area being represented by an originating zone code, comprising; receiving information for each call including the originating zone code together with the called area and office codes, computing a basic charge rate from the received called area code information, computing a terminating incremental charge rate from the received called office and called area code information; computing an incremental charge rate from the received originating zone and called area code information, and adding the basic charge rate and said incremental charge rates.

12. The method of deriving the charge rates for telephone calls between offices grouped into different geographical areas comprising; receiving information for each call pertaining to the calling and called offices including the geographical area of their situs, computing a basic charge rate from the received information pertaining to the calling and called areas, computing a terminating incremental charge rate from the received information pertaining to the called office, and the called area, computing an originating incremental charge rate from the received information pertaining to the originating office and the called area, and adding the basic charge rate and said incremental charge rates.

13. In a computer for determining charge rates for calls between calling and called offices with said offices being grouped into geographical areas each of which may contain a plurality of offices;

means for transmitting to said computer on each call information pertaining to the called area, the called office, and the location of the calling office within its geographical area;

means for deriving charge rates by a first procedure comprising means for translating the called area and called office information with respect to the calling office information;

means for deriving charge rates by a second procedure comprising, means for deriving a basic charge rate dependent upon the distance between the geographical areas in which the calling and called offices are located;

means for deriving an originating and terminating incremental charge rate dependent upon the location of each office in its geographical area, and means for adding said basic and said incremental charge rates;

means for deriving charge rates by a third procedure comprising means for translating only information pertaining to the called office; and means in said computer responsive to the receipt of the called area information on each call for determining the procedure to be used in deriving the charge rate therefor.

14. The combination recited in claim 13 together with means responsive to the operation of said procedure determining means for deriving the charge rate applicable to each call.

15. In a computer operable in accordance with a plurality of procedures for deriving charge rates for calls between calling and called offices in response to the receipt of information on each call pertaining to the calling office, the called area and the called office;

a first means for deriving said charge rates comprising, means for first translating said called area information with respect to said called office information to obtain a terminating rate treatment, and means subsequently operative for translating said terminating rate treatment with respect to said calling office information;

a second means for deriving said charge rates comprising, means for translating said called area information to obtain a basic charge rate based upon the distance between the geographical areas in which the calling and called offices are located, means for translating said called area information with respect to said called office information to obtain a terminating incremental charge rate based upon the location of said called office in its geographical area, means for translating said called area information with respect to said calling office information to obtain an originating incremental charge rate based upon the location of said calling office in its geographical area, and means for adding said basic and said incremental charge rates;

a third means for deriving said charge rates comprising means for translating only the called area information; and means in said computer operative upon the receipt of called area information on each call for determining whether said first, second, or third means is to be utilized in deriving the charge rate for the call.

16. The combination recited in claim 15 together with means responsive to the operation of said determining means for deriving the charge rate applicable to each call.

References Cited by the Examiner

UNITED STATES PATENTS

| | | | |
|---|---|---|---|
| 2,273,165 | 2/42 | Wright | 179—7.1 |
| 2,352,492 | 6/44 | Ostline | 179—7.1 |
| 2,721,898 | 10/55 | Lomax | 179—7.1 |
| 2,916,552 | 12/59 | Wolf | 179—9 |
| 2,955,163 | 10/60 | Ostline et al. | 179—7.1 |
| 2,965,718 | 12/60 | Avery | 179—18 |
| 2,984,704 | 5/61 | Terry et al. | 179—7.1 |
| 3,007,004 | 10/61 | Shook | 179—18 |
| 3,102,166 | 8/63 | Berch et al. | 179—7.1 |

ROBERT H. ROSE, *Primary Examiner.*

L. MILLER ANDRUS, WALTER L. LYNDE, *Examiners.*